US008650306B2

(12) United States Patent
Pouchak

(10) Patent No.: US 8,650,306 B2
(45) Date of Patent: Feb. 11, 2014

(54) INTEROPERABLE NETWORK PROGRAMMABLE CONTROLLER GENERATION SYSTEM

(75) Inventor: Michael A. Pouchak, Saint Anthony, MN (US)

(73) Assignee: Honeywell International Inc., Morristown, NJ (US)

( * ) Notice: Subject to any disclaimer, the term of this patent is extended or adjusted under 35 U.S.C. 154(b) by 818 days.

(21) Appl. No.: 11/923,471

(22) Filed: Oct. 24, 2007

(65) Prior Publication Data

US 2009/0113037 A1   Apr. 30, 2009

(51) Int. Cl.
*G06F 15/16* (2006.01)

(52) U.S. Cl.
USPC .......................................... 709/227; 709/228

(58) Field of Classification Search
USPC ............... 709/217, 230; 700/9, 85; 712/29; 717/173, 178, 114, 167
See application file for complete search history.

(56) References Cited

U.S. PATENT DOCUMENTS

| | | | |
|---|---|---|---|
| 4,654,653 A | 3/1987 | Brindle et al. | |
| 4,723,513 A | 2/1988 | Vallett et al. | |
| 4,784,580 A | 11/1988 | Takata et al. | |
| 4,793,800 A | 12/1988 | Vallett et al. | |
| 5,449,319 A | 9/1995 | Dushane et al. | |
| 5,479,812 A | 1/1996 | Juntunen et al. | |
| 5,605,280 A | 2/1997 | Hartman | |
| 5,778,368 A | 7/1998 | Hogan et al. | |
| 5,989,020 A | 11/1999 | Glass et al. | |
| 6,008,805 A | 12/1999 | Land et al. | |
| 6,272,400 B1 | 8/2001 | Jankins et al. | |
| 6,330,806 B1 | 12/2001 | Beaverson et al. | |
| 6,428,312 B1 | 8/2002 | Smelcer et al. | |
| 6,453,687 B2 | 9/2002 | Sharood et al. | |
| 6,536,678 B2 | 3/2003 | Pouchak | |
| 6,549,826 B1 | 4/2003 | Pouchak et al. | |
| 6,615,404 B1 | 9/2003 | Garfunkel et al. | |
| 6,619,951 B2 | 9/2003 | Bodnar et al. | |
| 6,694,926 B2 | 2/2004 | Baese et al. | |
| 6,745,085 B2 | 6/2004 | Pouchak | |
| 6,832,120 B1 | 12/2004 | Frank et al. | |
| 6,934,862 B2 | 8/2005 | Sharood et al. | |
| 7,120,908 B1 | 10/2006 | Klimchynski | |
| 7,124,163 B2 | 10/2006 | Geofroy et al. | |
| 2003/0158975 A1 | 8/2003 | Frank et al. | |
| 2003/0159129 A1 | 8/2003 | Frank et al. | |
| 2004/0144849 A1 | 7/2004 | Ahmed | |
| 2004/0221163 A1* | 11/2004 | Jorgensen et al. | 713/182 |
| 2004/0238653 A1 | 12/2004 | Alles | |
| 2005/0230490 A1 | 10/2005 | Pouchak et al. | |

OTHER PUBLICATIONS

Utah State University (USU, Feb. 11, 2003) How to Compile and Run fishsim, pp. 1-2.*
Casas et al. (Intel Strategic CAD Labs, Jan. 1999) "Logic Verification of Very Large Circuits Using Shark", sections 1 and 8.*

(Continued)

*Primary Examiner* — Peling Shaw
(74) *Attorney, Agent, or Firm* — Seager Tufte & Wickhem LLC.

(57) ABSTRACT

An interoperable controller operation system having a command module or processor, and input and output interfaces. The command module may have an application that is fixed, configurable or programmable. The module may be changeable on the fly. The input and/or output interfaces may be changeable on the fly. The module or processor may have a memory or be connected to one. The processor and/or memory may contain a function block engine.

17 Claims, 38 Drawing Sheets

(56) References Cited

OTHER PUBLICATIONS

Tridium (2005) "A Comprehensive Software Platform Designed to Create Smart Device Applications", p. 2.*
Echelon, "ShortStack Developer's Kit Model 23400," 3 pages, 2002.
Echelon, "Echelon ShortStack Micro Server Answers to Frequently Asked Questions," pp. 1-5, Apr. 2002.
Echelon, "ShortStack Overview," 12 pages, prior to Nov. 29, 2006.
Echelon, "ShortStack User's Guide, Version 2" 152 pages, Mar. 2002.
Honeywell, "T7770A,B,C,D,E,F,G, Wall Modules, Excel 5000 Open System," pp. 1-4, 1997.
"LonMark Functional Profile: VAV Controller (VAV)," pp. 1-19, 1996.

* cited by examiner

| SimTime | ADD1.y | nvIn3. | Tag1_4. | LIMIT8.y | LIMIT12.y | SQRT8.y | MUL10.y |
|---|---|---|---|---|---|---|---|
| 11 | 17 | 2 | 17 | 10 | 17 | 4.123106 | 8 |
| 21 | 27 | 2 | 27 | 20 | 27 | 5.196152 | 8 |
| 31 | 37 | 2 | 37 | 30 | 37 | 6.082763 | 8 |
| 41 | 47 | 2 | 40 | 40 | 40 | 6.324555 | 8 |
| 51 | 57 | 2 | 40 | 50 | 40 | 6.324555 | 8 |
| 101 | 63 | 2 | 40 | 5 | 40 | 6.324555 | 8 |
| 111 | 17 | 2 | 17 | 10 | 17 | 4.123106 | 8 |
| 121 | 27 | 2 | 27 | 20 | 27 | 5.196152 | 8 |
| 131 | 37 | 2 | 37 | 30 | 37 | 6.082763 | 8 |
| 141 | 47 | 2 | 40 | 40 | 40 | 6.324555 | 8 |
| 151 | 57 | 2 | 40 | 50 | 40 | 6.324555 | 8 |
| 201 | 63 | 2 | 40 | 5 | 40 | 6.324555 | 8 |
| 211 | 17 | 2 | 17 | 10 | 17 | 4.123106 | 8 |
| 221 | 27 | 2 | 27 | 20 | 27 | 5.196152 | 8 |
| 231 | 37 | 2 | 37 | 30 | 37 | 6.082763 | 8 |
| 241 | 47 | 2 | 40 | 40 | 40 | 6.324555 | 8 |

| | A | B | C | D | E | F | G | H | I | J | K | L | M | N | O | P | Q | R | S | T |
|---|---|---|---|---|---|---|---|---|---|---|---|---|---|---|---|---|---|---|---|---|
| 1 | Device Nar | VAVModReheat3 | | | | | | | | | | | | | | | | | | |
| 2 | LoopType | FBName | WrdParamVal(0) | WrdP | WrdP | WrdF | WrdPar | Wrd | Wrd | Wrd | WrdF | WrdParamIO(0) | Wrc | Wrd | Wrd | Wrd | WrdF | Wrdl | Wrd | Wrd |
| 3 | 130 | | 0 | 0 | 0 | 0 | 0 | 0 | 0 | 0 | 0 | 0 | 6 | 0 | 0 | 0 | 0 | 0 | 0 | 0 |
| 4 | 131 | | 0 | 0 | 0 | 0 | 0 | 0 | 0 | 0 | 0 | 1 | 6 | 5 | 0 | 5 | 6 | 6 | 6 | 5 |
| 5 | | 18 OCC_ARB | | | | | | | | | | 1 | 0 | 1 | 1 | 1 | 1 | 1 | 0 | 0 |
| 6 | | 41 TEMP_SPCALC | | | | | | | | | | 1 | 1 | 1 | 1 | 1 | 1 | 0 | 0 | 0 |
| 7 | | 19 TEMP_MODE | | | | | | | | | | 10 | 0 | 0 | 0 | 0 | 0 | 0 | 0 | 6 |
| 8 | 253 | | 0 | 0 | 0 | 0 | 0 | 0 | 0 | 0 | 0 | 10 | 0 | 0 | 0 | 0 | 0 | 0 | 0 | 0 |
| 9 | 253 | | 0 | 0 | 0 | 0 | 0 | 0 | 0 | 0 | 0 | 6 | 0 | 6 | 6 | 6 | 6 | 6 | 6 | 6 |
| 10 | 255 | | 0 | 0 | 0 | 0 | 0 | 0 | 0 | 0 | 0 | 1 | 5 | 0 | 1 | 0 | 0 | 0 | 0 | 0 |
| 11 | | 26 SWITCH | | | | | | | | | | 0 | 0 | 0 | 0 | 0 | 0 | 0 | 0 | 0 |
| 12 | 240 | | 0 | 0 | 0 | 0 | 0 | 0 | 0 | 0 | 0 | 1 | 1 | 1 | 1 | 1 | 1 | 1 | 1 | 1 |
| 13 | 240 | | 0 | 0 | 0 | 0 | 0 | 0 | 0 | 0 | 0 | 0 | 0 | 0 | 0 | 0 | 0 | 0 | 0 | 0 |
| 14 | 240 | | 0 | 0 | 0 | 0 | 0 | 0 | 0 | 0 | 0 | 0 | 1 | 0 | 2 | 0 | 2 | 2 | 2 | 0 |
| 15 | | 1 OR | | | | | | | | | | 1 | 0 | 1 | 0 | 0 | 0 | 0 | 0 | 0 |
| 16 | 240 | | 0 | 0 | 0 | 0 | 0 | 0 | 0 | 0 | 0 | 0 | 0 | 0 | 2 | 0 | 2 | 2 | 2 | 5 |
| 17 | | 8 PID | | | | 3 | 2500 | | | | | 1 | 1 | 1 | 2 | 0 | 0 | 0 | 0 | 0 |
| 18 | 240 | | 0 | 0 | 0 | 0 | 0 | 0 | 0 | 0 | 0 | 0 | 0 | 0 | 0 | 0 | 0 | 0 | 0 | 0 |
| 19 | 240 | | 0 | 0 | 0 | 0 | 0 | 0 | 0 | 0 | 0 | 0 | 0 | 0 | 0 | 0 | 0 | 0 | 0 | 0 |
| 20 | 241 | | 0 | 0 | 0 | 0 | 0 | 0 | 0 | 0 | 0 | 0 | 0 | 0 | 0 | 0 | 0 | 0 | 0 | 0 |
| 21 | 241 | | 0 | 0 | 0 | 0 | 0 | 0 | 0 | 0 | 0 | 0 | 0 | 0 | 1 | 1 | 1 | 1 | 1 | 6 |
| 22 | 241 | | 0 | 0 | 0 | 0 | 0 | 0 | 0 | 0 | 0 | 1 | 1 | 1 | 2 | 2 | 2 | 2 | 2 | 5 |
| 23 | | 1 OR | | | | | | | | | | 0 | 0 | 0 | 0 | 0 | 0 | 0 | 0 | 0 |
| 24 | | 8 PID | | | | 3 | 2500 | | | | | 0 | 0 | 0 | 0 | 0 | 0 | 0 | 0 | 0 |
| 25 | 252 | | 0 | 0 | 0 | 0 | 0 | 0 | 0 | 0 | 0 | 0 | 0 | 0 | 0 | 0 | 0 | 0 | 0 | 0 |
| 26 | 254 | | 0 | 0 | 0 | 0 | 0 | 0 | 0 | 0 | 0 | 9 | 9 | 9 | 9 | 9 | 9 | 9 | 9 | 0 |
| 27 | 241 | | 0 | 0 | 0 | 0 | 0 | 0 | 0 | 0 | 0 | 0 | 0 | 0 | 0 | 0 | 0 | 0 | 0 | 0 |
| 28 | 251 | | 0 | 0 | 0 | 0 | 0 | 0 | 0 | 0 | 0 | 0 | 0 | 0 | 0 | 0 | 0 | 0 | 0 | 0 |
| 29 | 253 | | 0 | 0 | 0 | 0 | 0 | 0 | 0 | 0 | 0 | 9 | 9 | 9 | 9 | 9 | 9 | 9 | 9 | 0 |
| 30 | 240 | | 0 | 0 | 0 | 0 | 0 | 0 | 0 | 0 | 0 | 10 | 0 | 0 | 0 | 0 | 0 | 0 | 0 | 6 |
| 31 | | 36 LIMIT | | 100 | | | | | | | | 1 | 1 | 1 | 1 | 1 | 1 | 1 | 1 | 0 |
| 32 | 253 | | 0 | 0 | 0 | 0 | 0 | 0 | 0 | 0 | 0 | 0 | 2 | 2 | 2 | 2 | 2 | 2 | 2 | 0 |
| 33 | 240 | | 0 | 0 | 0 | 0 | 0 | 0 | 0 | 0 | 0 | 10 | 0 | 0 | 0 | 0 | 0 | 0 | 0 | 6 |
| 34 | 251 | | 0 | 0 | 0 | 0 | 0 | 0 | 0 | 0 | 0 | 5 | 5 | 5 | 5 | 5 | 5 | 5 | 5 | 5 |
| 35 | | 7 VELP | | | | | 0.54 | | | | | 1 | 1 | 1 | 1 | 1 | 1 | 1 | 1 | 1 |
| 36 | 253 | | 0 | 0 | 0 | 0 | 0 | 0 | 0 | 0 | 0 | 10 | 0 | 0 | 0 | 0 | 0 | 0 | 0 | 0 |
| 37 | 240 | | 0 | 0 | 0 | 0 | 0 | 0 | 0 | 0 | 0 | 0 | 0 | 0 | 0 | 0 | 0 | 0 | 5 | 0 |
| 38 | | 35 RATIO | | | | | | | | | | 0 | 0 | 0 | 0 | 0 | 0 | 0 | 0 | 0 |
| 39 | 240 | | 0 | 0 | 0 | 0 | 0 | 0 | 0 | 0 | 0 | 0 | 1 | 1 | 1 | 1 | 1 | 1 | 2 | 0 |
| 40 | 251 | | 0 | 0 | 0 | 0 | 0 | 0 | 0 | 0 | 0 | 0 | 0 | 0 | 0 | 0 | 0 | 0 | 0 | 0 |
| 41 | | 39 OVERIDE | | | | | | | | | | 9 | 0 | 0 | 0 | 0 | 0 | 0 | 1 | 2 |
| 42 | | 39 OVERIDE | | | | | | | | | | 1 | 1 | 1 | 1 | 1 | 1 | 1 | 1 | 5 |
| 43 | | | | | | | | | | | | 1 | 1 | 1 | 1 | 1 | 1 | 1 | 1 | 5 |

ControlLoops.txt

Control Loop Configuration
Cfg File Data
```
12 00 8200 8201 0000 0000 8203 8106 0000 0000 0000 00 00
29 00 8200 8202 8000 0000 0000 0000 8106 8002 8003 00 00
13 00 0000 0000 0000 8001 8002 8003 0000 8004 8107 01 01
1A 00 8107 8006 8204 8205 0000 0000 0000 0000 0000 00 00
01 00 8204 8205 0000 0000 0000 0000 8300 8300 8207 00 01
08 00 8001 8004 8206 8301 8302 8300 8300 8300 8010 00 00
01 00 8006 0000 0000 0000 0000 0000 8300 8300 8206 00 01
08 00 8001 8004 8207 8301 8302 8300 8300 8300 8007 01 00
25 00 8014 8303 8300 8005 0000 0000 0000 0000 0000 00 00
07 00 9002 8109 0000 0000 810A 8009 8108 8008 0000 00 00
24 00 8009 810E 800A 8013 800B 800C 0000 0000 0000 01 00
27 00 0000 0000 0000 810B 0000 0000 8013 8300 800B 00 00
27 00 0000 0000 0000 810C 0000 0000 810E 8300 800A 00 00
0E 00 8010 800C 800F 8013 8208 800D 810A 800E 8014 00 00
1B 00 8107 8011 8011 810F 0000 0000 0000 0000 8012 00 00
1B 00 8107 810D 810D 810F 0000 0000 0000 0000 8013 00 00
19 00 0000 8209 0000 0000 8012 810E 0000 0000 800F 01 00
1A 00 8208 0000 0000 0000 0000 0000 0000 8209 0000 00 00
1B 00 8203 810E 810E 8300 810E 8110 0000 0000 8011 00 00
7F 00 0000 0000 0000 0000 0000 0000 0000 0000 0000 00 00
7F 00 0000 0000 0000 0000 0000 0000 0000 0000 0000 00 00
7F 00 0000 0000 0000 0000 0000 0000 0000 0000 0000 00 00
7F 00 0000 0000 0000 0000 0000 0000 0000 0000 0000 00 00
7F 00 0000 0000 0000 0000 0000 0000 0000 0000 0000 00 00
7F 00 0000 0000 0000 0000 0000 0000 0000 0000 0000 00 00
7F 00 0000 0000 0000 0000 0000 0000 0000 0000 0000 00 00
7F 00 0000 0000 0000 0000 0000 0000 0000 0000 0000 00 00
7F 00 0000 0000 0000 0000 0000 0000 0000 0000 0000 00 00
7F 00 0000 0000 0000 0000 0000 0000 0000 0000 0000 00 00
7F 00 0000 0000 0000 0000 0000 0000 0000 0000 0000 00 00
7F 00 0000 0000 0000 0000 0000 0000 0000 0000 0000 00 00
7F 00 0000 0000 0000 0000 0000 0000 0000 0000 0000 00 00
7F 00 0000 0000 0000 0000 0000 0000 0000 0000 0000 00 00
7F 00 0000 0000 0000 0000 0000 0000 0000 0000 0000 00 00
7F 00 0000 0000 0000 0000 0000 0000 0000 0000 0000 00 00
7F 00 0000 0000 0000 0000 0000 0000 0000 0000 0000 00 00
7F 00 0000 0000 0000 0000 0000 0000 0000 0000 0000 00 00
7F 00 0000 0000 0000 0000 0000 0000 0000 0000 0000 00 00
7F 00 0000 0000 0000 0000 0000 0000 0000 0000 0000 00 00
7F 00 0000 0000 0000 0000 0000 0000 0000 0000 0000 00 00
7F 00 0000 0000 0000 0000 0000 0000 0000 0000 0000 00 00
7F 00 0000 0000 0000 0000 0000 0000 0000 0000 0000 00 00
7F 00 0000 0000 0000 0000 0000 0000 0000 0000 0000 00 00
7F 00 0000 0000 0000 0000 0000 0000 0000 0000 0000 00 00
7F 00 0000 0000 0000 0000 0000 0000 0000 0000 0000 00 00
7F 00 0000 0000 0000 0000 0000 0000 0000 0000 0000 00 00
```

ProjectSummary.txt                                    ╱─503

Device Name  VAVModReheat3

Resource Useage
Control Floats = 21
Control Digitals = 10
Control NonVolatiles = 17
Flash Constants = 5
Bytes RAM pool Used = 192
Bytes Loop Static = 34
Function Blocks = 19
User NVIs = 10
User NVOs = 3

Function Block Data

| Type     | Name     |           |           |       |
|----------|----------|-----------|-----------|-------|
| OCC_ARB  | OCC_ARB3 |           |           |       |
| Wrd | Name              | PVID(hex) | PVID(dec) | Value |
| 0   | schedCurrentState | 8200      | 33280     | 0     |
| 1   | wmOverride        | 8201      | 33281     | 0     |
| 2   | networkManOcc     | 0000      | 00000     | 0     |
| 3   | occSensorState    | 0000      | 00000     | 0     |
| 4   | effOccCurrentState| 8203      | 33283     | 0     |
| 5   | manOverrideState  | 8106      | 33030     | 0     |
| 6   | unused1           | 0000      | 00000     | 0     |
| 7   | unused2           | 0000      | 00000     | 0     |
| 8   | unused3           | 0000      | 00000     | 0     |
| Byt | Name              | Value     |           |       |
| 0   | netLastInWins     | 0         |           |       |
| 1   | occSensorOper     | 0         |           |       |
| 2   | spare             | 0         |           |       |

| Type       | Name         |           |           |       |
|------------|--------------|-----------|-----------|-------|
| TEMP_SPCALC| TEMP_SPCALC4 |           |           |       |
| Wrd | Name              | PVID(hex) | PVID(dec) | Value |
| 0   | effOccCurrentState| 8200      | 33280     | 0     |
| 1   | schedNextState    | 8202      | 33282     | 0     |
| 2   | schedTuncos       | 8000      | 32768     | 0     |
| 3   | setpoint          | 0000      | 00000     | 0     |
| 4   | heatRampRate      | 0000      | 00000     | 0     |
| 5   | coolRampRate      | 0000      | 00000     | 0     |
| 6   | manOverrideState  | 8106      | 33030     | 0     |
| 7   | effHeatSP         | 8002      | 32770     | 0     |
| 8   | effCoolSP         | 8003      | 32771     | 0     |
| Byt | Name              | Value     |           |       |
| 0   |                   | 0         |           |       |
| 1   |                   | 0         |           |       |
| 2   | spare             | 0         |           |       |

| Type      | Name       |           |           |       |
|-----------|------------|-----------|-----------|-------|
| TEMP_MODE | TEMP_MODE5 |           |           |       |
| Wrd | Name              | PVID(hex) | PVID(dec) | Value |
| 0   | sysSwitch         | 0000      | 00000     | 0     |
| 1   | cmdMode           | 0000      | 00000     | 0     |
| 2   | supplyTemp        | 0000      | 00000     | 0     |
| 3   | spaceTemp         | 8001      | 32769     | 0     |
| 4   | effHeatSP         | 8002      | 32770     | 0     |
| 5   | effCoolSP         | 8003      | 32771     | 0     |
| 6   | allowAutoChange   | 0000      | 00000     | 0     |
| 7   | effSetpt          | 8004      | 32772     | 0     |
| 8   | effTempMode       | 8107      | 33031     | 0     |
| Byt | Name              | Value     |           |       |
| 0   | controlType       | 1         |           |       |
| 1   |                   | 1         |           |       |
| 2   | spare             | 0         |           |       |

```
#Piranha Config File for 90000c6822030438 VAVModReheat3
010192AD030000
01909EFF00006E6369554943616C4F666673657400009FFF00006E766954696D
6553657400000000000A0FF22006E76694D616E56616C0000000000000009EFF
00006E766F494F310000000000000000000A1FF00006E766F494F3200000000
000000000000A2FF00006E766F494F330000000000000000000009FFF0C006E76
6F54696D655000000000000000000000A3FF00006E6369536574706F696E74730000
0000A4FF20004E5649466C6F774F66667272696465000DFF00004B2046616374
6F720000000000000000012FF00006D656173757265644D696E64C6F770012FF
00006D656173757265644D6178466C6F770013FF0000447563744172656100000
000000000012FF00004F6364D696E466C6F7753657450074000012FF00005374
616E6442794D696E466C6F77536512FF00004D6178466C6F7753657470740000
000012FF00005265686561744C6F77536574500740000AFF04006E766F426F78
466C6F770000000000000000A5FF04006E766F44617461100000000000000000A6FF
04006E766F4461746132000000000000000000
02020FE1090360
020D92000D0000000092010D0000000092020D0000000092030D000000009204
0D0000000092050D0000000092060D00000000C0000E00000000C0010F000000
00C0020F00000000C0030F00000000C0040F00000000C0050F000000009400B
00000000094010B0000000094020B000000009A000B0000000090000D00000000
90010D0000000090020D0000000090030D0000000090040D0000000090050D00
00000090060D0000000090070D0000000093000D0000000093010D0000000093
020D0000000093030D0000000094000B0000000094010B0000000094020B0000
000095000B0000000095010B0000000095020B0000000095030B000000009504
0B0000000095050B0000000095060B0000000095070B00000000C0000E0000000
00C0010F00000000C0020F00000000C0030F00000000C0040F00000000C0050F
00000000810008000000000810108000000000810208000000008103080000000
8104080000000081050800000000082080F0000000000000B00000000800D0D00
00000081090D00000000810C12000000000810B12000000000810A130000000081
0E120000000081101200000000810D12000000000810F1200000000800C0A0000
0000800408000000000820300000000800108000000008107000000008010
0B000000000800E1200000000800F12000000080050B0000000080070B000000
0080030800000000800208000000000
0301BA6D8506AC
01B81200820082010000000082038106000000000000002900820082028000
000000000008106800280030000130000000000000000800180028003000008004
810701011A00810780068204820500000000000000000000010082048205
0000000000000000830083008207000108008001800482068301830283008300
8300801000001008006000000000000000000083008300820600010800800
80048207830183028300830083008007010025008014830383008005000000
00000000000000000070090028109000000000810A8009810880080000000002400
8009810E800A8013800B800C0000000000001002700000000000000810B0000
00008013830080000000270000000000000000810C00000000810E8300800000
0E008010800C800F8013820880080810A800E801400001B0081078011801181F
000000000000000801200001B008107810D810D810F000000000000000008013
00001900000082090000000008012810E0000000800F01001A008208000000
000000000000000000820900000000001B008203810E810E830081E811000000000
801100007F00000000000000000000000000000000
040016CB580F48
001400000000040400000451C400042C800000000000
0501B72B800FEC
01B501B5270000A000805D8849804A885A885C800089008800A000A000890088
008000A000A008900896B896B810080548000A000A000A00080548000800080
008000800080008000800080008000800026332E3440304E6F64654F
626A6563742C323030373050697261686E610010403023313039001040307C32
001040307C35001040307C36001040307C37001040307C310010403023313031
```

```
#Piranha Parameter File for 90000c6822030438 VAVModReheat3
100046754F0000
0044000000000000000000000000000000000000000000000000000000447A
00003F0A3D71447A00003F0A3D717F8000007F800000444800000434800000043C8
000043480000
110022F14C00B8
00200000000000000000000000000000000000000000000000000000000000
0000
18000ACECA00DC
0008FF0000000100FFFF
190005D8BC00E8
0003010101
130006BB5D0112
000404020A25
1500622D07011A
00600001E0010528FF0000FF00000001E0010528FF0000FF00000001E0010528
FF0000FF00000001E0010528FF0000FF00000001E0010528FF0000FF00000001
E0010528FF0000FF00000001E0010528FF0000FF0000FF0000FF0000FF0000FF
0000
1600202A45017E
001E000000000000000000000000000000000000000000000000000000000000
1B000684C001A0
000400000000
1C0014471401A8
00125641564D6F645265686561743300000000000
1D000CE13901BE
000A0000000000000000000000
```

*Figure 27*

```
                                VAVModReheat3NM.txt
#comment, for twisted pair FTT version of Piranha,,,,,,,,,,,,,,
#data,Node,90000c6822030438,VAVModReheat3,PIR1,,,,,,,,,,,
#data,Nv,90000c6822030438,nroPgmVer,0,CONST,0,0,0
#data,Nv,90000c6822030438,nvoNodeStatus,1,OUT,0,0,0
#data,Nv,90000c6822030438,nviFileRequest,2,IN,0,0,0
#data,Nv,90000c6822030438,nvoFileStatus,3,OUT,0,0,0
#data,Nv,90000c6822030438,nviFilePos,4,IN,0,0,0
#data,Nv,90000c6822030438,nviNodeRequest,5,IN,0,0,0
#data,Nv,90000c6822030438,nvoConfigError,6,OUT,0,0,0
#data,Nv,90000c6822030438,nciApplVerNew,7,CONFIG,0,0,0
#data,Nv,90000c6822030438,nviDebugIndex,8,IN,0,0,0
#data,Nv,90000c6822030438,nvoDebug1,9,OUT,0,0,0
#data,Nv,90000c6822030438,nvoDebug2,10,OUT,0,0,0
#data,Nv,90000c6822030438,nciDeviceName,11,CONFIG,0,0,0
#data,Nv,90000c6822030438,nviInUse,12,IN,0,0,0
#data,Nv,90000c6822030438,nvoAlarmH,13,OUT,0,0,0
#data,Nv,90000c6822030438,nvoAlarmStatus,14,OUT,0,0,0
#data,Nv,90000c6822030438,nvoError,15,OUT,0,0,0
#data,Nv,90000c6822030438,nciAlarmInhibit,16,CONFIG,0,0,0
#data,Nv,90000c6822030438,nciSndHrtBt,17,CONFIG,0,0,0
#data,Nv,90000c6822030438,nciRcvHrtBt,18,CONFIG,0,0,0
#data,Nv,90000c6822030438,nciUICalOffset,19,CONFIG,0,0,0
#data,Nv,90000c6822030438,nviTimeSet,20,IN,0,0,0
#data,Nv,90000c6822030438,nviManVal,21,IN,0,0,0
#data,Nv,90000c6822030438,nvoIO1,22,OUT,0,0,0
#data,Nv,90000c6822030438,nvoIO2,23,OUT,0,0,0
#data,Nv,90000c6822030438,nvoIO3,24,OUT,0,0,0
#data,Nv,90000c6822030438,nvoTime,25,OUT,0,0,0
#data,Nv,90000c6822030438,nciSetpoints,26,CONFIG,0,0,0
#data,Nv,90000c6822030438,NVIFlowOverride,27,IN,0,0,0
#data,Nv,90000c6822030438,K Factor,28,CONFIG,0,0,0
#data,Nv,90000c6822030438,measuredMinFlow,29,CONFIG,0,0,0
#data,Nv,90000c6822030438,measuredMaxFlow,30,CONFIG,0,0,0
#data,Nv,90000c6822030438,DuctArea,31,CONFIG,0,0,0
#data,Nv,90000c6822030438,OccMinFlowSetPt,32,CONFIG,0,0,0
#data,Nv,90000c6822030438,StandByMinFlowSetPt,33,CONFIG,0,0,0
#data,Nv,90000c6822030438,MaxFlowSetpt,34,CONFIG,0,0,0
#data,Nv,90000c6822030438,ReheatFlowSetPt,35,CONFIG,0,0,0
#data,Nv,90000c6822030438,nvoBoxFlow,36,OUT,0,0,0
#data,Nv,90000c6822030438,nvoData,37,OUT,0,0,0
#data,Nv,90000c6822030438,nvoData2,38,OUT,0,0,0
#data,Field,90000c6822030438,nroPgmVer,hwId,UN,0,0,2,0,1,0,0,0,
#data,Field,90000c6822030438,nroPgmVer,applId,UN,2,0,2,0,1,0,0,0,
#data,Field,90000c6822030438,nroPgmVer,majorVer,UN,4,0,1,0,1,0,0,0,
#data,Field,90000c6822030438,nroPgmVer,minorVer,UN,5,0,1,0,1,0,0,0,
#data,Field,90000c6822030438,nroPgmVer,bootVer,UN,6,0,1,0,1,0,0,0,
#data,Field,90000c6822030438,nroPgmVer,nodeType,UN,7,0,1,0,1,0,0,0,
#data,Field,90000c6822030438,nvoNodeStatus,stObjectID,UN,0,0,2,0,1,0,0,0,
#data,Field,90000c6822030438,nvoNodeStatus,stInvalidID,&BOOLEAN,2,7,1,0,1,0,0,0,
data,Field,90000c6822030438,nvoNodeStatus,stInvalidRequest,&BOOLEAN,2,6,1,0,1,0,0,0 data,Field,90000c6822030438,nvoNodeStatus,stDisabled,&BOOLEAN,2,5,1,0,1,0,0,0,
data,Field,90000c6822030438,nvoNodeStatus,stOutOfLimits,&BOOLEAN,2,4,1,0,1,0,0,0,
#data,Field,90000c6822030438,nvoNodeStatus,stOpenCircuit,&BOOLEAN,2,3,1,0,1,0,0,0,
#data,Field,90000c6822030438,nvoNodeStatus,stOutOfService,&BOOLEAN,2,2,1,0,1,0,0,0,
#data,Field,90000c6822030438,nvoNodeStatus,stMechanicalFault,&BOOLEAN,2,1,1,0,1,0,0,
0,
#data,Field,90000c6822030438,nvoNodeStatus,stFeedbackFailure,&BOOLEAN,2,0,1,0,1,0,0,
0,
#data,Field,90000c6822030438,nvoNodeStatus,stOverRange,&BOOLEAN,3,7,1,0,1,0,0,0,
#data,Field,90000c6822030438,nvoNodeStatus,stUnderRange,&BOOLEAN,3,6,1,0,1,0,0,0,
#data,Field,90000c6822030438,nvoNodeStatus,stElectricalFault,&BOOLEAN,3,5,1,0,1,0,0,
0,
```

|  | nv\|config | nv\|auth\|config | nv\|priority\|config | nv\|serv\|type\|config | nv\|of\|ine | nv\|po\|ied | nv\|sync | ext\|rec | HEX | SNVT# |
|---|---|---|---|---|---|---|---|---|---|---|
| nviRequest | a | 1 | 1 | 1 | 0 | 0 | 0 | 1 | 8e | 5c |
| nvoStatus | s | 1 | 1 | 1 | 0 | 0 | 1 | 1 | ce | 5d |
| nvoFileDirectory | 0 | 1 | 1 | 1 | 1 | 0 | 0 | 1 | ae | 72 |
| nvoValue | 0 | 1 | 1 | 1 | 0 | 0 | 0 | 1 | 8e | 5f |
| nvoTemp | 0 | 1 | 1 | 1 | 0 | 0 | 0 | 1 | 8e | 69 |
| nviValue | 0 | 1 | 1 | 1 | 0 | 0 | 0 | 1 | 8e | 5f |

INTEROPERABLE NETWORK PROGRAMMABLE CONTROLLER GENERATION SYSTEM

BACKGROUND

The present invention pertains to engines for designing systems, and particularly to designing controller systems. More particularly, the invention pertains to changing on the fly aspects of the control systems.

SUMMARY

The invention is a control system wherein aspects of it may be changed on the fly.

BRIEF DESCRIPTION OF THE DRAWING

FIG. 7 shows a table of data from the simulation of the designed circuit or system of FIGS. 5 and 6;

FIG. 23 shows an illustrative example of a spreadsheet for data in a comma separated value format;

FIG. 24 reveals an example of an intermediate file for a function block system;

FIG. 25 is an example of a summary file of the spreadsheet in FIG. 23;

FIG. 26 is an example of a configuration (CFG) file;

FIG. 27 is an example of a Piranha™ parameter file;

FIG. 28 is an example of a text file of Piranha™ related information;

FIG. 32 shows a table for network variables;

DESCRIPTION

Figure 1:
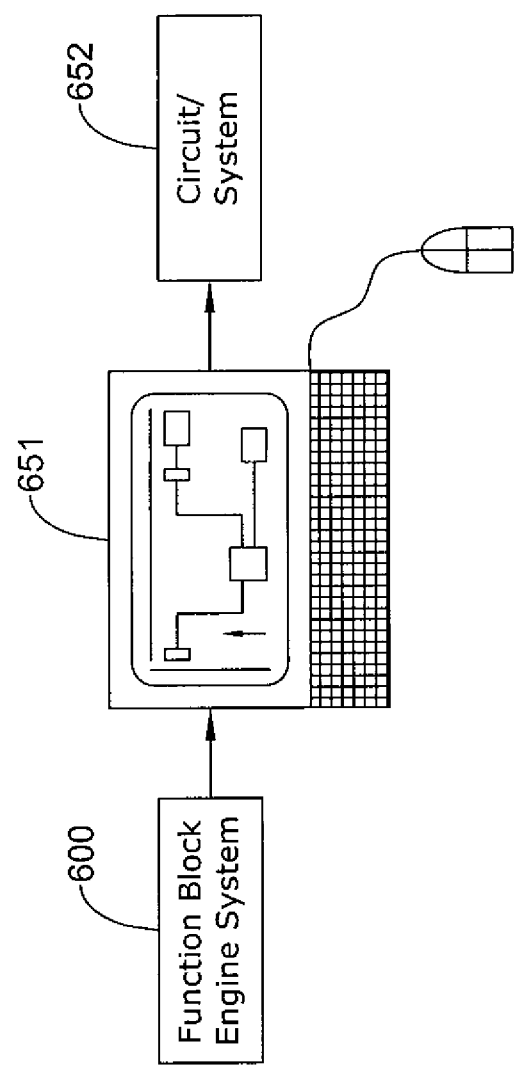
FIG. 1 is a diagram of a relationship of the function block engine system, computer and resulting circuit or system.

The present invention is a system that may allow, for example, an HVAC control application to be graphically created and generate needed confirmation information for the network protocol. In the past, other approaches appeared to depend on complex and cumbersome tools to implement such configuration information. In addition, the present configuration tool may allow testing and simulation of the complete design cycle in a control framework. It is possible here to test the files for correct operation before installation due to this integrated environment. The present system may reduce the time to market for control implementations and allow a high quality product to be created in short turn due to an advanced testing capability.

U.S. patent application Ser. No. 11/777,873, filed Jul. 13, 2007, is hereby incorporated by reference. U.S. patent application Ser. No. 11/670,911, filed Feb. 2, 2007, is hereby incorporated by reference. U.S. patent application Ser. No. 11/620,431, filed Jan. 5, 2007, is hereby incorporated by reference. U.S. patent application Ser. No. 11/564,797, filed Nov. 29, 2006, is hereby incorporated by reference. U.S. patent application Ser. No. 11/559,706, filed Nov. 14, 2006, is hereby incorporated by reference. U.S. patent application Ser. No. 11/427,750, filed Jun. 29, 2006, is hereby incorporated by reference. U.S. Pat. No. 6,549,826, issued Apr. 15, 2003, U.S. Pat. No. 6,536,678, issued Mar. 25, 2003, U.S. Pat. No. 5,479,812, issued Jan. 2, 1996, are hereby incorporated by reference.

Commercial controls, for instance HVAC control systems, are becoming increasing complex with additional power and features required to meet customer needs. At the same time, there is advancement of the power of low cost microprocessors that will allow the most common control components to be created with large power at low cost. There exists a need to have the complex controls be easily used in a low cost environment, pushing the complexity of configuration and design into a high powered configuration tool and keep the low cost powerful microprocessor resources dedicated to the computer.

One may design and/or implement a system controller or another system having virtually no hardware except for the computer used to design and put the resulting software into a memory, e.g., in a form of microcode or other manner. An ordinary computer, though not necessary, may provide the resulting function block engine designed software input to it, i.e., to a memory, and the computer may effectively become the designed controller with function blocks, interconnections, links, inputs, outputs, selections, adjustments, interfaces, a display, visual and/or audio indicators for showing variables, parameters, readings, prescriptions, results, on-station and/or remote monitoring and control whether by keyboard, mouse, touch screen, voice command, eye tracking and blinking control, or other communicative manner, having diagnostics, simulation capabilities within itself and a system to be controlled, plus more, effectively all in conveyable software. The function block system could be designed and implemented without a computer. However, for an illustrative instance, one's personal computer or other mechanism may be loaded with and use the present system level function block engine to design virtually any kind of system controller in a context of software. After design, simulation and testing, as desired, this computer may become the designed system controller for an actual application, or the software may be transferred to another computer or other device to become the system controller. The computer, or some other like-designed processor, programmable personal assistant (PDA), cell phone, device and so on, with the software may become the designed system controller such as, for one among many examples, a programmable thermostat for a building HVAC. Communication between the controller on the computer and the controlled system may be via wireless or non-wireless media.

Additionally, in the commercial HVAC industry, there may be a need to have complex applications that are tested and implemented in controlling devices. These devices should be low cost and be able to meet application needs. There is a need to have a flexible low cost controller that allows applications to be met as demands change within the low cost controller platform and tools. The function block framework of the present system may provide a logical application structure that allows a system control application designer (e.g., HVAC) to combine pre-designed blocks featuring powerful control capabilities and thorough connections of libraries and block functions, that may be incorporated the development of sophisticated applications to meet new and advanced customer needs.

The present function block engine system may use relatively little memory in view of its significantly powerful and revolutionary capabilities. Programmable controllers may be implemented as engines that can interpret a meta language that is resident wholly or partially in a random access memory (RAM) as it runs. This means that minimal RAM requirements for a small program may be about 15K bytes (Kb) and can grow in proportion to the program. An inexpensive microprocessor may typically have a rather small RAM (e.g., 2K bytes or less) which means that a little amount of RAM (i.e., about 1 Kb) is available after operating system (OS) and communication capabilities are taken into consideration. However, by providing programmability from a function block engine, as described herein, that is resident in FLASH and having the functions use a common pool of RAM to hold minimal static value storage while the rest of the pool is reused by all the blocks for temporary execution space, fairly complex programs can be executed with a fixed memory allocation of about 1K of RAM. The program may simply be a list of "function" calls, as described by the function block definitions herein, which can be downloaded to a small file in FLASH.

FIG. 1 is a diagram showing relationship of the function block engine system 600, computer 651 and a resulting circuit or system 652. One may take the present function block engine system 600, perhaps on a memory medium (e.g., disk, FLASH, stick, or the like) to store and/or load it into a memory of an operating system such as that of a personal computer 651. One may design a circuit or system 652, for example, a controller, with the function block engine system 600. That circuit or system 652 may be put into a memory, for instance, in microcode, or another code, manner or mode. The memory with the system 652 may be tied in with an operating system to provide the activity of a controller having the connections with the hardware or other to be controlled and monitored based on the function block designed system 652.

FIGS. 2-8 show an operation for designing simple example system 652 with the function block engine system 600. This operation may be implemented in a system designer and simulator on a personal computer 651 with software such as, for example, "Microsoft Windows XP Professional™". One may have a screen like that shown in FIG. 2. A mouse may be used to move an arrow 611 to click on "controller" and then on "configure" of the tool bar 612. Then one may, for example, click and drag out a function block 601 entitled "Timeset" from function block source area 602 into an area 603 of a display screen with the mouse arrow 611. Even though a function block 601, for instance, may be dragged from area 203 to area 603, the source 601 of the function block would remain in area 602. Then one may drag a Limit 604 from area 602 to area 603. One may place the mouse arrow 611 on an output terminal 605 of block 601 and drag a connection 606 to an input terminal 607 of limit 604. An add function block 608 may be dragged from area 602 to area 603. A network variable input block 609 may be dragged with the mouse arrow 611 into area 603. A multiply function block 610 may be dragged from area 602 to area 603. The mouse arrow 611 may be placed and clicked on a terminal 613 of block 609 and a line 614 may be dragged from terminal 613 to a terminal 615 of function block 610 to make a connection between block 610 and input 609. In a similar manner a line 616 may be dragged from an output terminal 617 of block 610 to an input terminal 618 of block 608. Also, a connection may be made with a line 619 from an output terminal 621 of limit block 604 to an input terminal 622 of the add block 608. The add function block 608 may add input values at terminals 618 and 622 to result in a sum at an output terminal 623 of block 608. The output at terminal 623 may be provided to an input terminal 624 of another limit function block 625 with a line 626. The source of limit function block 625 may be the same as that for limit function block 604 which is from area 602. To check the inputs of add function block 608, one may right click the mouse and click on edit to get a dialogue box that shows the inputs which may changed to one or more parameters with values placed in them in lieu of inputs to the add function block 608. The same may be done for the multiply function block 610 where one input is replaced with a parameter of four which can be multiplied with a value at input at 615 to get a result at terminal 617. Also, other things, such as function block names, may be changed in this right-clicked edit dialogue box.

The circuit or system design with function blocks in area 603 may continue on to another page as shown in the tool bar 612. The pages may be relabeled, for example, as page 1 was relabeled ad ADD1 at place 626 and page 2 was relabeled as ADD2 at place 627. The circuit or system may be continued on to the next page ADD2 with a TAG connection block 628, which can be dragged with the arrow 611 from the block source area 602 to area 603. An output terminal 629 of block 625 may be connected with a line 631 dragged out with arrow 611 from terminal 629 to a terminal 632 of tag block 628.

Figure 3:
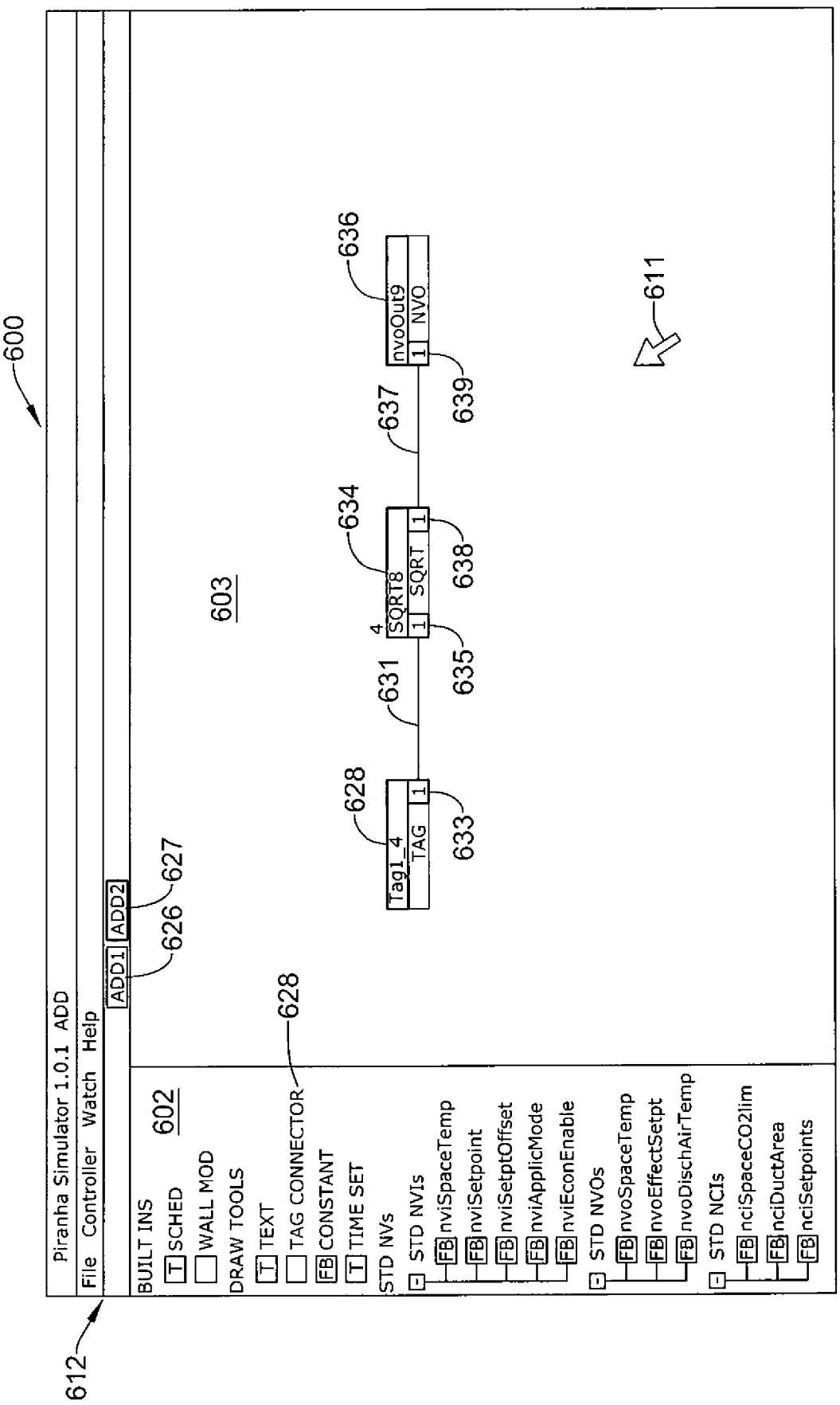
FIG. 3 shows a second page of the screen of FIG. 2.

FIG. 3 shows a continuation of the circuit or system from page ADD1 to page ADD2. Tag 628 may be a continuation of line 631 via input terminal 632 and an output terminal 633 of tag 628 in FIG. 3. A square root function block 634 may be dragged from area 602 to area 603 of the display. The line 631 connection may be dragged with the arrow 611 from terminal 633 to an input terminal 635 of the square root function block 634. A network variable output 636 may be dragged from area 602 into area 603 of the display with the mouse arrow 611. A connection line 637 may be dragged from an output terminal 638 of block 634 to a terminal 639 of output block 636.

The ADD1 626 and ADD 627 pages may themselves be placed into individual function blocks with their respective inputs and outputs. The block of pages 626 and 627 may be placed into one function block. If there are other function blocks having a number of pages of circuits made from various function blocks, they also may be combined into one function block. These one function blocks might be interconnected and also combined into still another one function block. This hierarchical progression of function blocks being combined may continue until an entire system of a design is in one block, such as an aircraft instrumentation, industrial plant, HVAC or some other kind of controller. The resulting function block might be treated as a black box in some instances.

Figure 4:
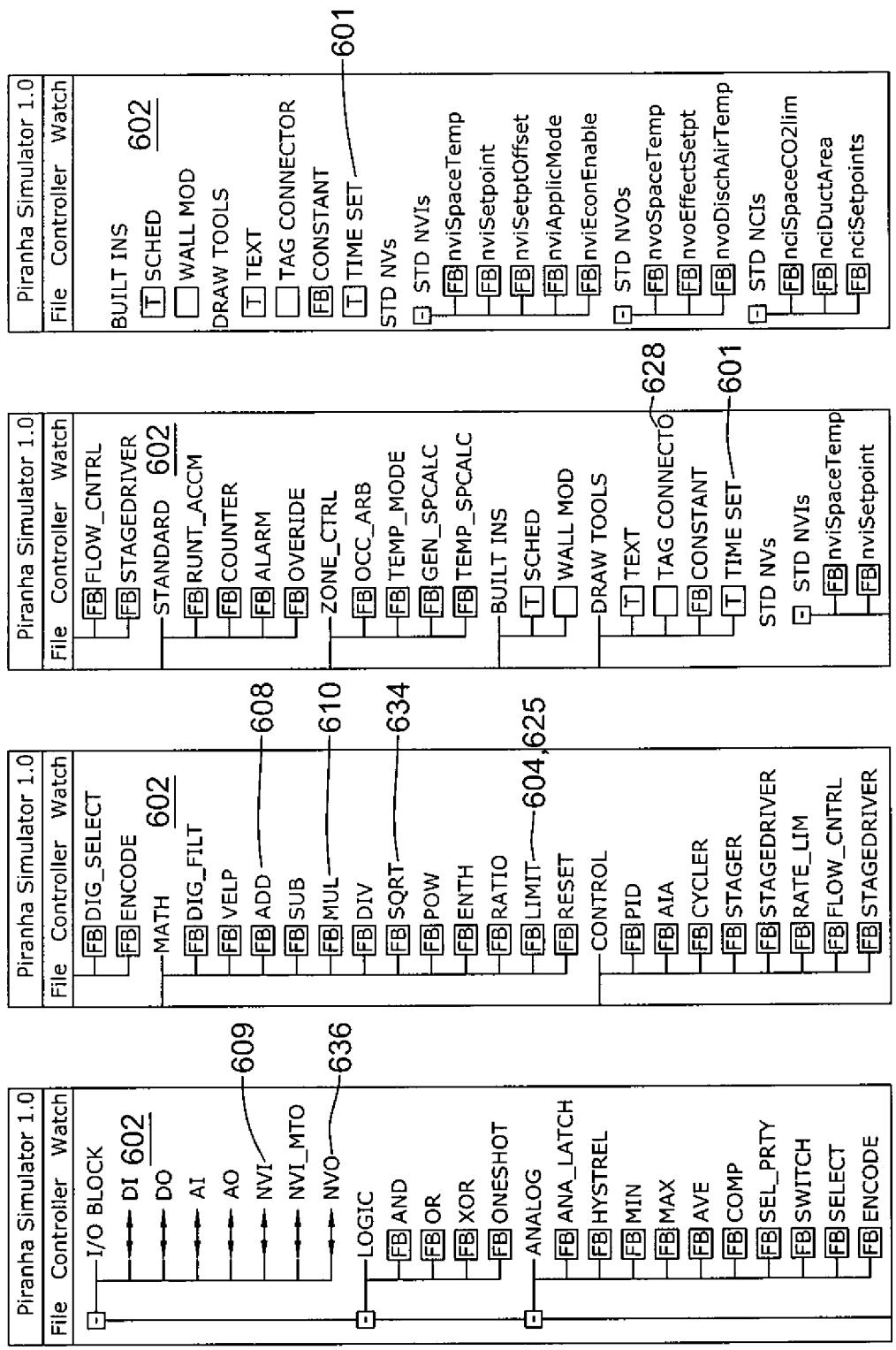
FIG. 4 shows from the screen a partial list of function blocks and other items that may be used in designing a circuit or system.

FIG. 4 shows a list of function blocks and terminals in area 602 of the display that may be selected for developing various kinds of designs. The list is not inclusive in that other function blocks and terminals may be added.

Figure 2:
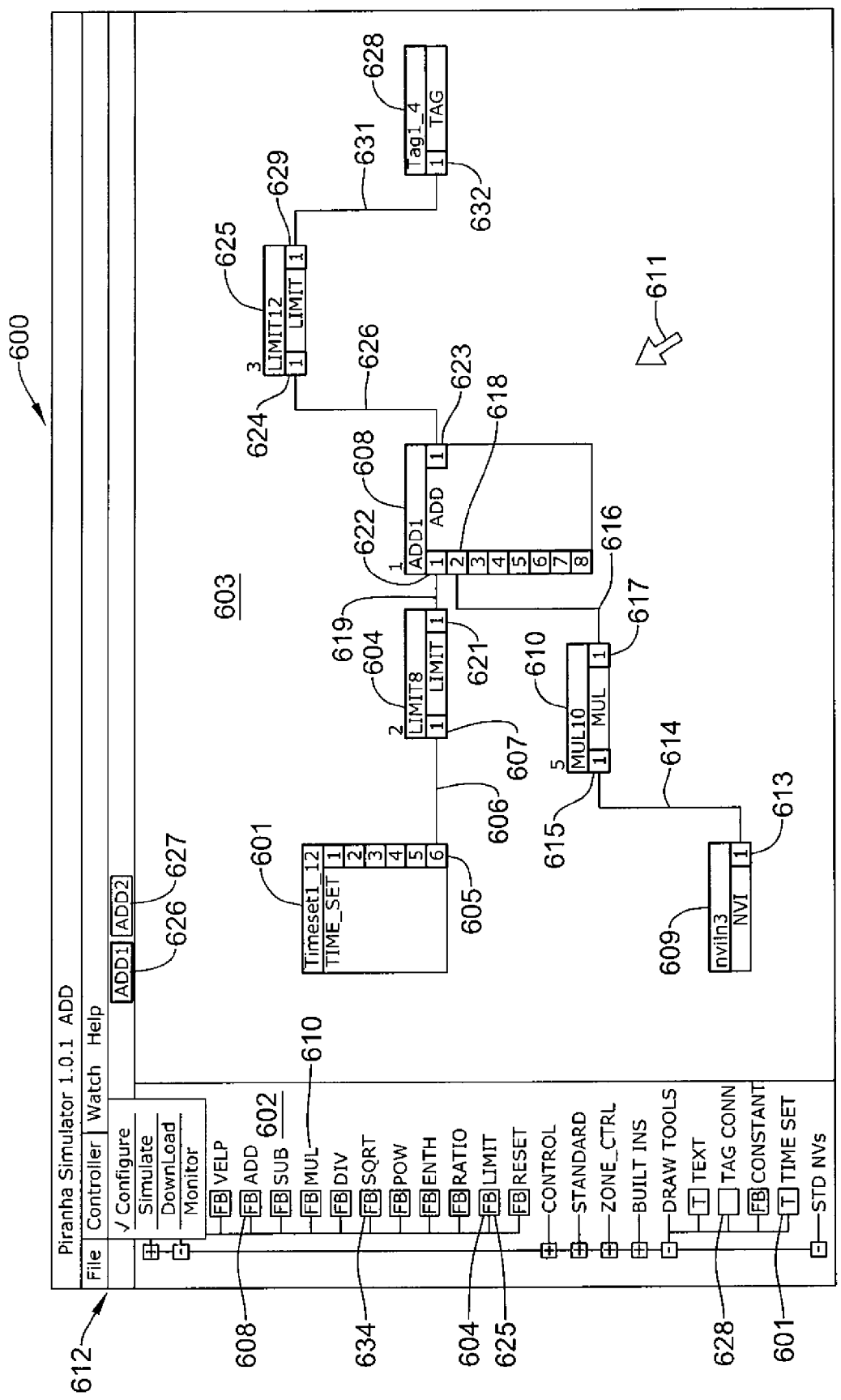
FIG. 2 shows a display screen set up for designing circuits or systems with function blocks.
Figure 5:
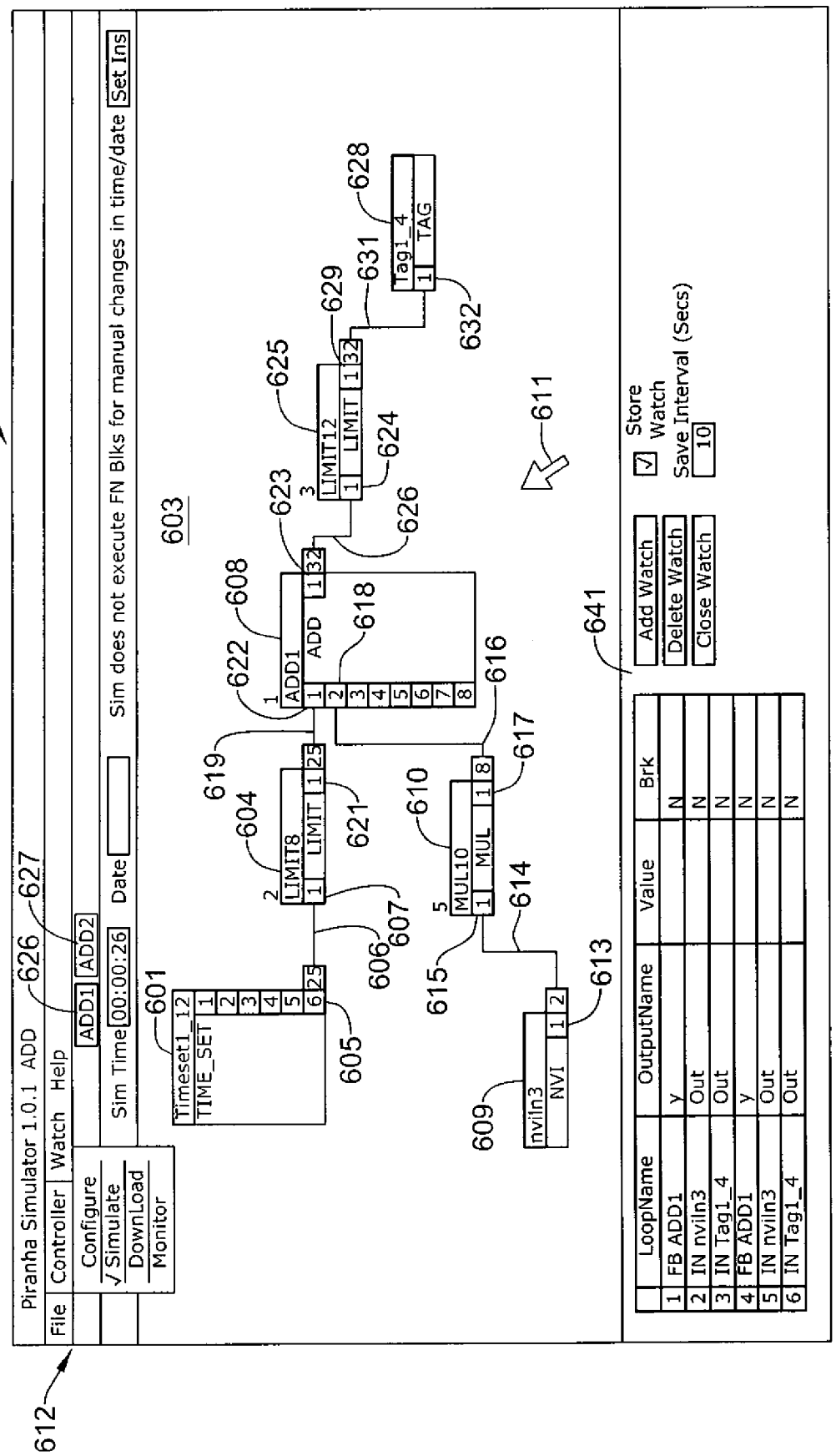
FIG. 5 shows a screen for a simulate mode for the designed circuit or system of FIGS. 3 and 4.
Figure 6:
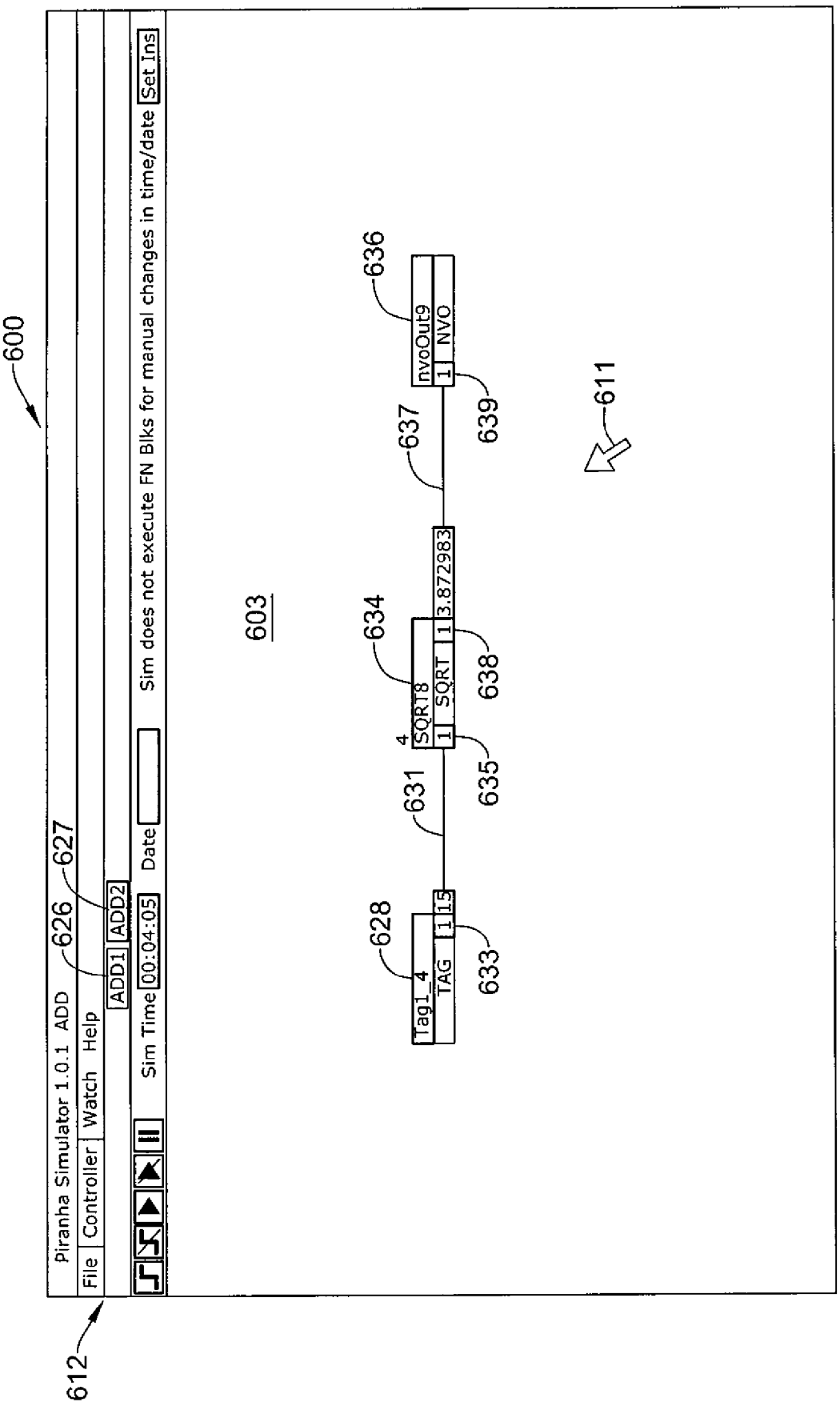
FIG. 6 shows a second page of the screen of FIG. 5.
Figure 8:
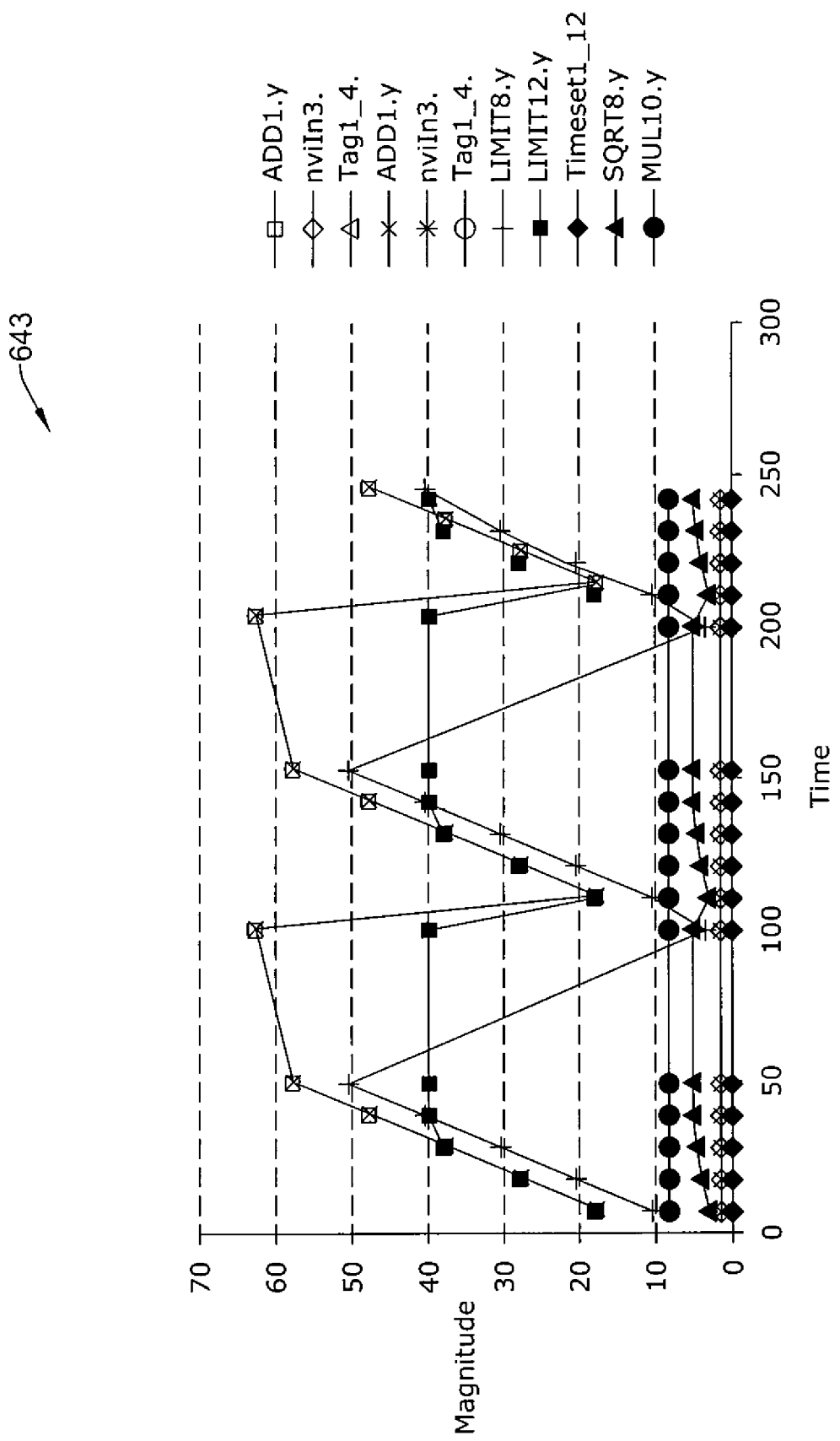
FIG. 8 is a graph of the data in the table in FIG. 7.

FIGS. 5 and 6 show the circuits of FIGS. 2 and 3, respectively, in a simulate mode which may be selected by clicking on "controller" of the tool bar 612 with the mouse arrow 611. Then "simulate" may be clicked on to put the designed circuit into an operational-like scenario. The label "watch" on the tool bar 612 may be clicked on to get the watch dialogue box 641. The loops and outputs along with their respective values may be listed in box 641. Also, values for each increment of time may be provided at the various output terminals of the function blocks. For example, a value of "25" is shown at the output terminal 621 of the limit function block 604. Units may be of time, magnitudes, or some other kind of measurement. The circuit or system, on pages ADD1 626 and ADD2 627 indicated on the tool bar 612, may include analog, digital or a combination of digital and analog function blocks. A simulation may run for various inputs may be recorded in a table 642 as shown in FIG. 7 and plotted as shown in a graph 643 of FIG. 8. Graph 643 shows magnitudes for various outputs versus time.

Figure 9:
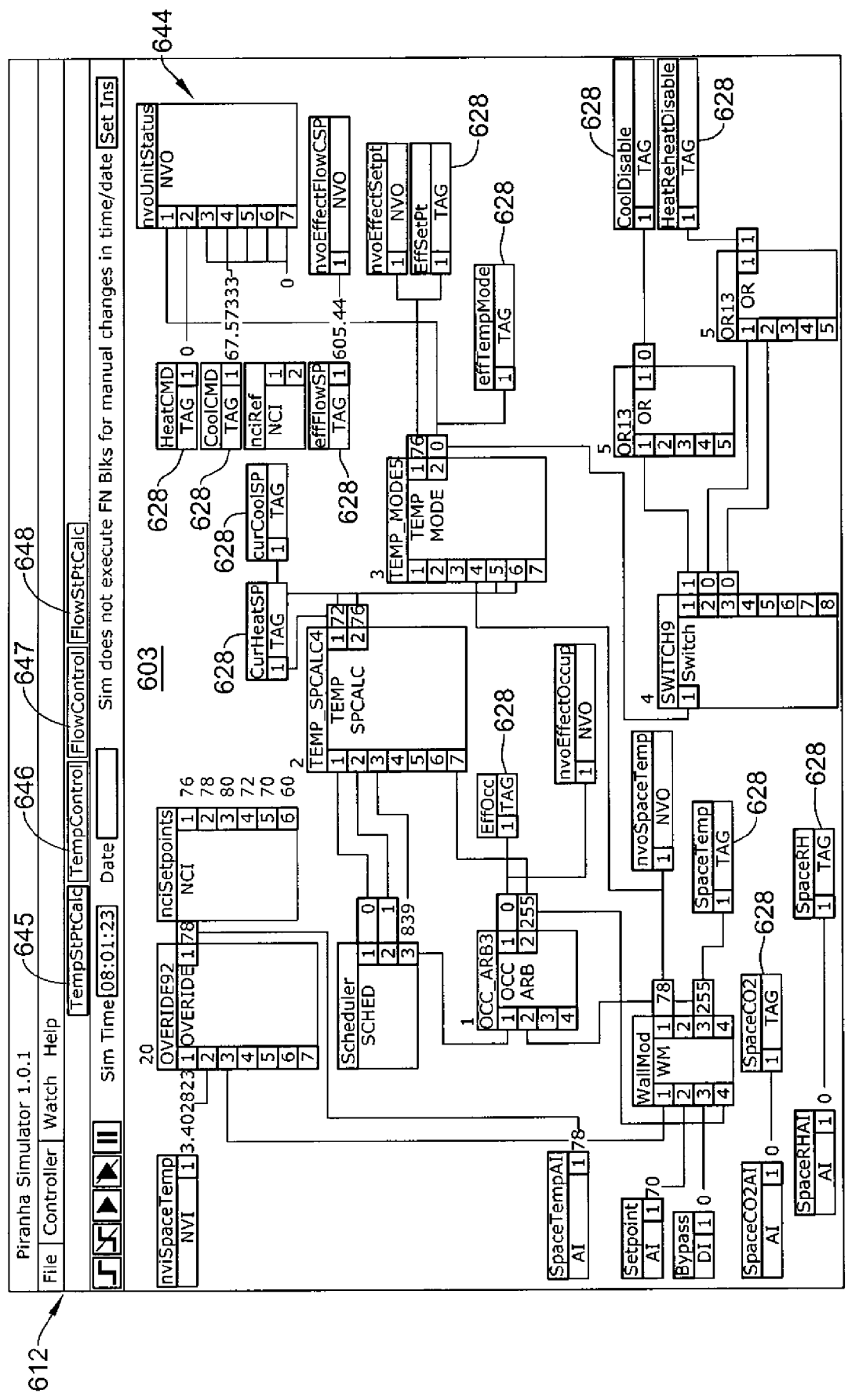
FIG. 9 shows a display screen with one of several pages showing a designed system have somewhat more complexity that the example circuit or system of FIGS. 2 and 3.

FIG. 9 shows a simulation mode of a somewhat intricate circuit 644 of function blocks. Tool bar 612 appears to show that this circuit 644 is one of four pages 645, 646, 647, and 648 of a larger combination of function blocks interconnected via tag connections 628.

Figure 10:
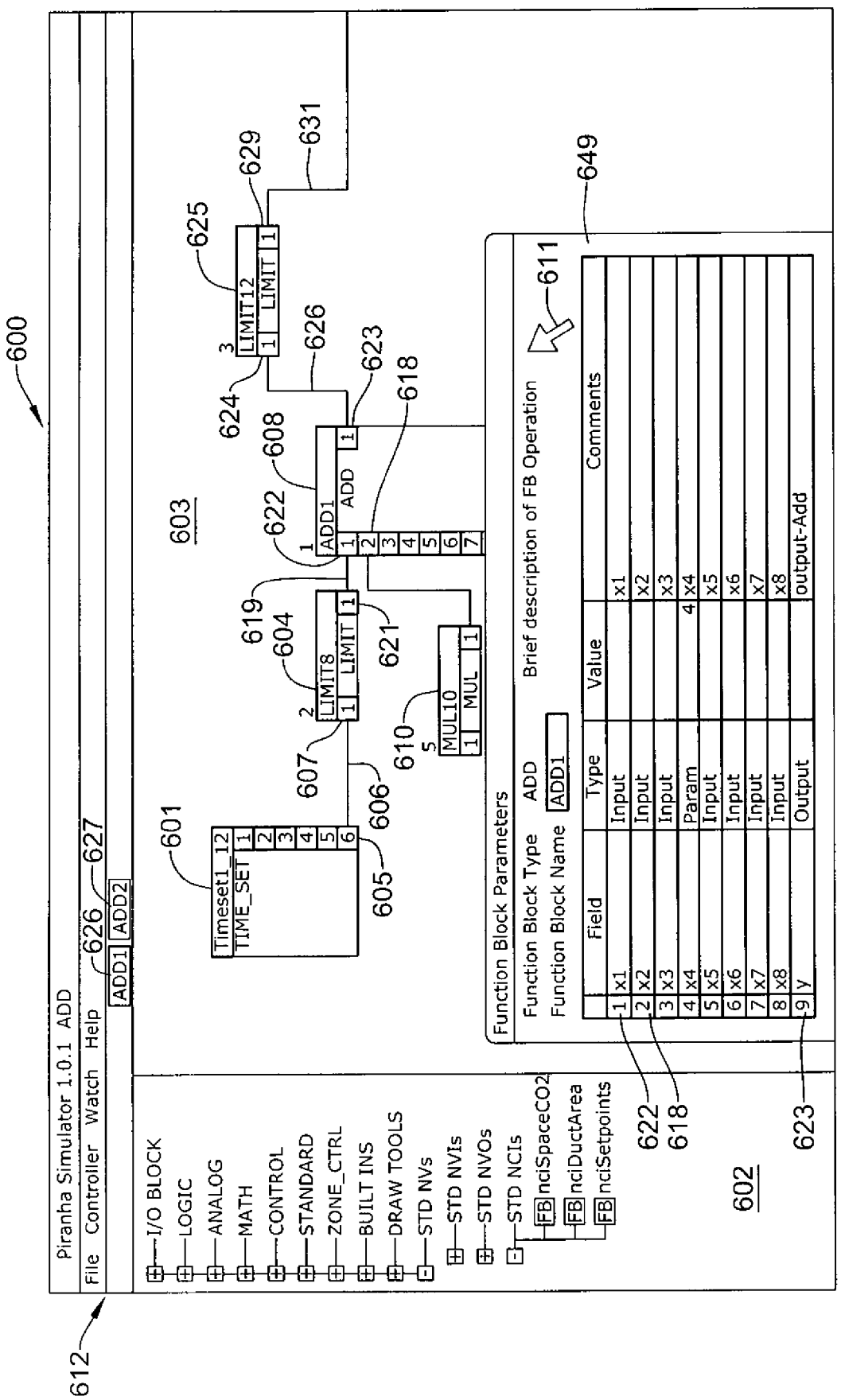
FIG. 10 shows a dialog box with inputs, a parameter and an output.

FIG. 10 shows a portion of the layout of the circuit in FIG. 3, but with a dialogue box 649 showing the inputs and output of the add function block 608, as discussed herein.

An illustrative example resulting from the present function block engine system may be a VAV (variable air volume) system used for reducing the air quantity under periods of limited or no occupancy and saves both energy of air delivery and the energy involved in the heating/cooling the air. The present VAV system has an ability to have high resolution of air flow and the accurate control to an air setpoint, especially at low flow volume. The VAV air flow calibration process or field balancing is a very important part of the product delivery that allows an HVAC balancer to measure the flow very accurately and max flow and min flow and enter an adjustment to the VAV control calibration. At the high end of accuracy and resolution, ten point curves detailing the air pressure (proportional to voltage) in relation to velocity air flow may be customized and developed for the manufacture of flow pickup devices. There appears to be a need to develop an approach that can incorporate the minimum flow and calibration information in addition to the ease required for an HVAC balancer.

Advantages of the system may include the following. Function block architecture allows flexibility to accommodate new architectures, hardware, or changes in HVAC equipment due to improvements in sequences, control strategies, or communication to achieve balancing. A modular system gives ease of understanding. There is efficient use of resources—vastly simpler for balancing algorithm to implement resulting in savings of time and hardware/software resources. It may take advantage of a high point calibration technique in the present assignee's U.S. Pat. Nos. 6,549,826 and 5,479,812. This technique appears as being recognized in industry as leading in flow accuracy and low cost. The present system may facilitate this technique in a much more simple and elegant way.

U.S. Pat. No. 6,549,826, issued Apr. 15, 2003, is hereby incorporated by reference. U.S. Pat. No. 5,479,812, issued Jan. 2, 1996, is hereby incorporated by reference. U.S. Pat. No. 6,745,085, issued Jun. 1, 2004, is hereby incorporated by reference. U.S. Pat. No. 6,536,678, issued Mar. 25, 2003, is hereby incorporated by reference. U.S. patent application Ser. No. 10/809,115, filed Mar. 25, 2004, is hereby incorporated by reference.

The system may result in an ability to use multi-platform, multi-purpose programmable controller algorithms that can be adapted to, combined, merged, and/or synthesized with multi-protocols (TCP/IP/Ethernet, BACnet™, LON™, and so on), other applications (RTU, CVAHU, UV, FCU, VAVAHU, and so forth), internet (T7350H, XL15B, webserver) application (HVAC, boiler control per U.S. Pat. No. 6,536,678 owned by the present assignee) and industry (security, test, OEM, and so forth).

Figure 11:
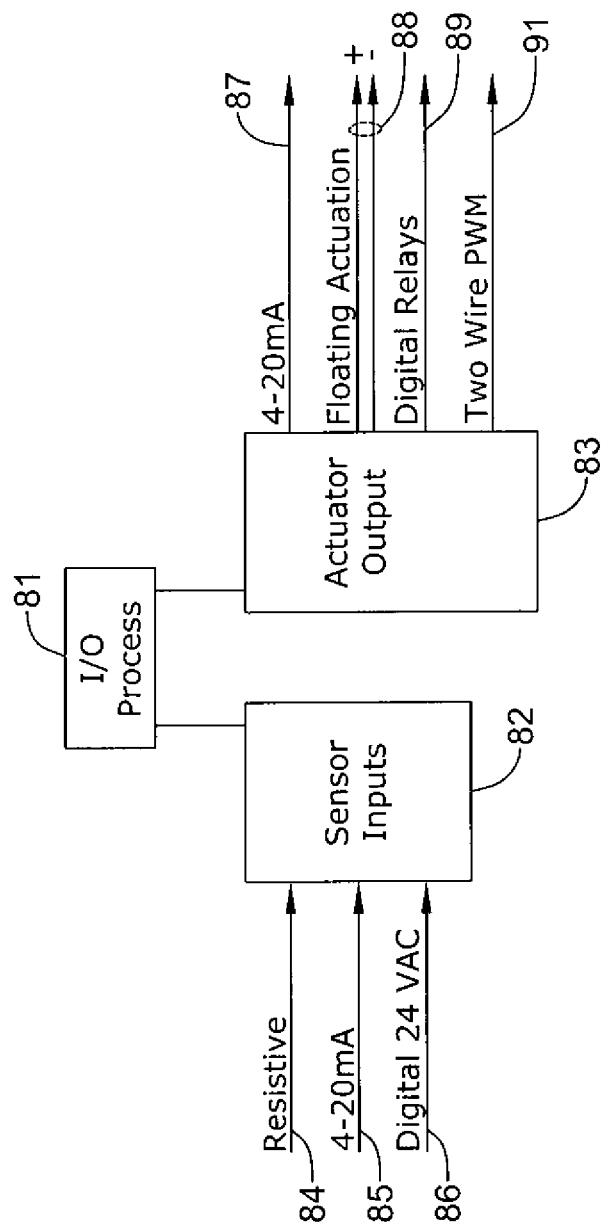
FIG. 11 is an input/output block diagram that may be associated with interacting with an operating system.

The may be an input/output processor module 81 that receives sensor inputs and provides actuator outputs. A sensor input module 82 may be connected to module 81. An actuator output module 83 may be connected to module 81. Inputs 84, 85 and 86 may receive resistive signals, 4-20 mA signals and digital 24 VAC signals, respectively. Other kinds of signals may be received by the inputs. Outputs 87, 88, 89 and 92 may provide signals for dampers, valves, and so forth. Outputs 87 may provide 4-20 mA signals. Output 88 may be a floating actuation of plus and minus signals of about 24 VAC to provide good resolution positioning of, for example, a damper at various angles relative to an air flow. Output 89 may provide digital relay signals and output 91 may be a two-wire PWM (pulse width modulated) signals. FIG. 11 is a diagram of modules 81, 82 and 83.

Figure 12:
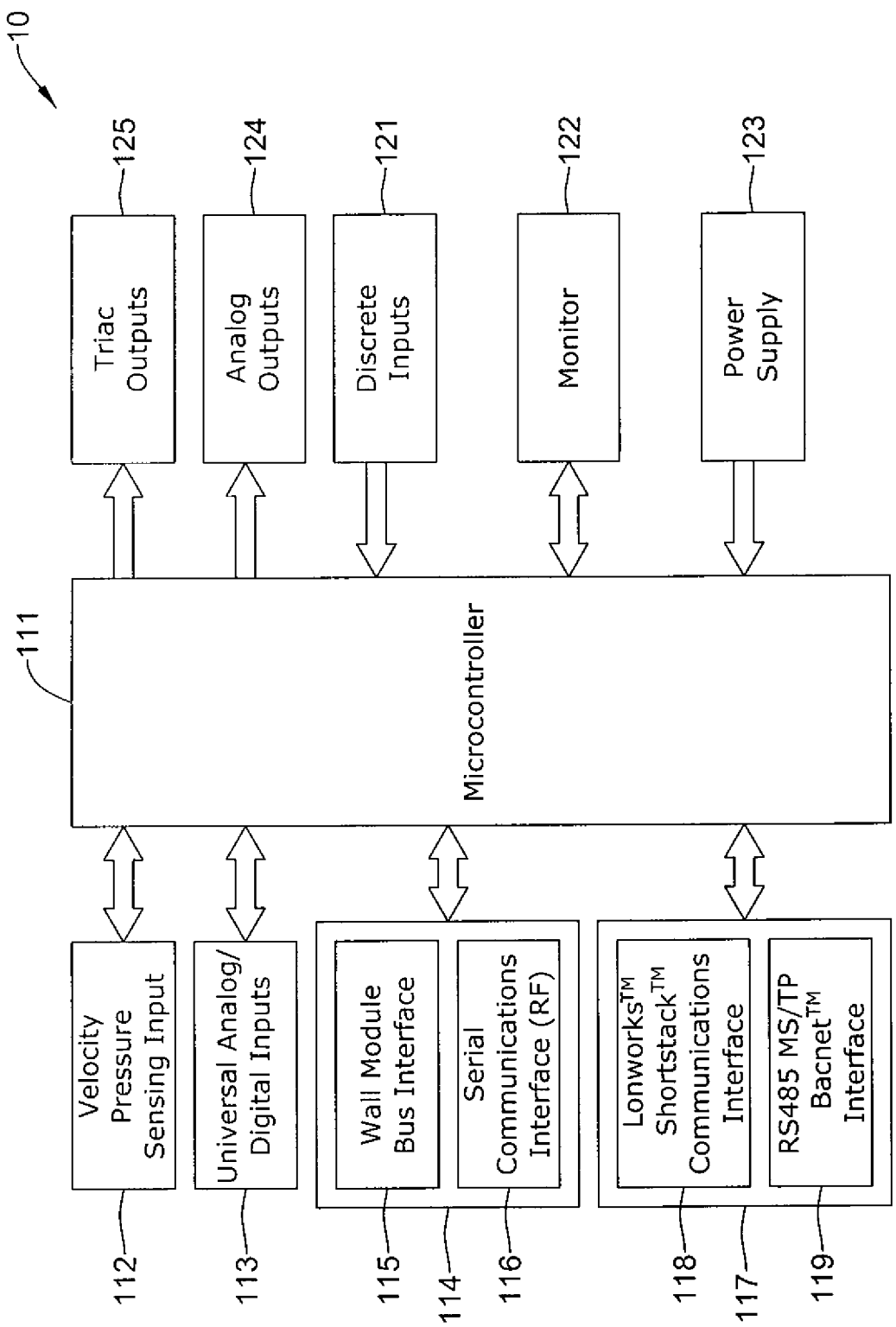
FIG. 12 is an overview block diagram of the present system with its interaction with a microcontroller.

FIG. 12 is an overview block diagram of the present system 10 with its interaction with a microcontroller. A central item may be a microcontroller module 111. Microcontroller module 111 may have one or more processors. Velocity pressure sensing input module 112 may be connected to microcontroller 111. Universal analog/digital inputs module 113 may be connected to module 111. An interface module 114, having a wall module interface 115 and a serial communications interface (RF) 116, may be connected to module 111. Another interface module 117, having a LonWorks™ ShortStack™ communications interface 118 and an RS485 MS/TP BACnet™ interface 119 may be connected to module 111. A discrete inputs module 121 maybe connected to module 111. A monitor 122 may be connected to module 111. A power supply module 123 may be connected to module 111. An analog outputs module 124 and a triac outputs module 125 may be connected to module 111. Other modules, as desired, may be provided and connected to microcontroller module 111.

Figure 13:
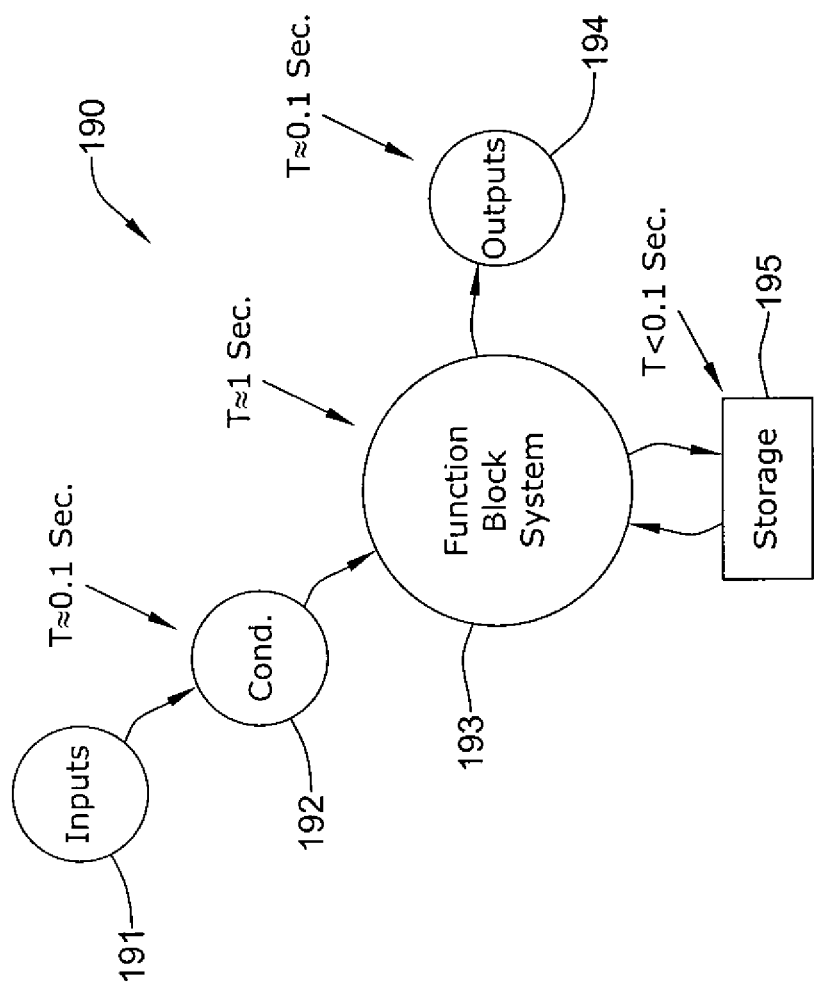
FIG. 13 shows a diagram of a balancing system and times for activity between the system and several other components.

FIG. 13 shows portions of a function block system 190 and their times for activity among them. For signals at inputs 191 to reach the function block system 193 via the conditioning 192 of the signals may take about 0.1 second. The time for the block system 193 to process the received signals may be about one second. To provide signals from the block system 193 to the outputs 194 may take about 0.1 second. The interaction of the block system 193 and storage or memory 195 may be significantly faster than 0.1 second.

Figure 14:
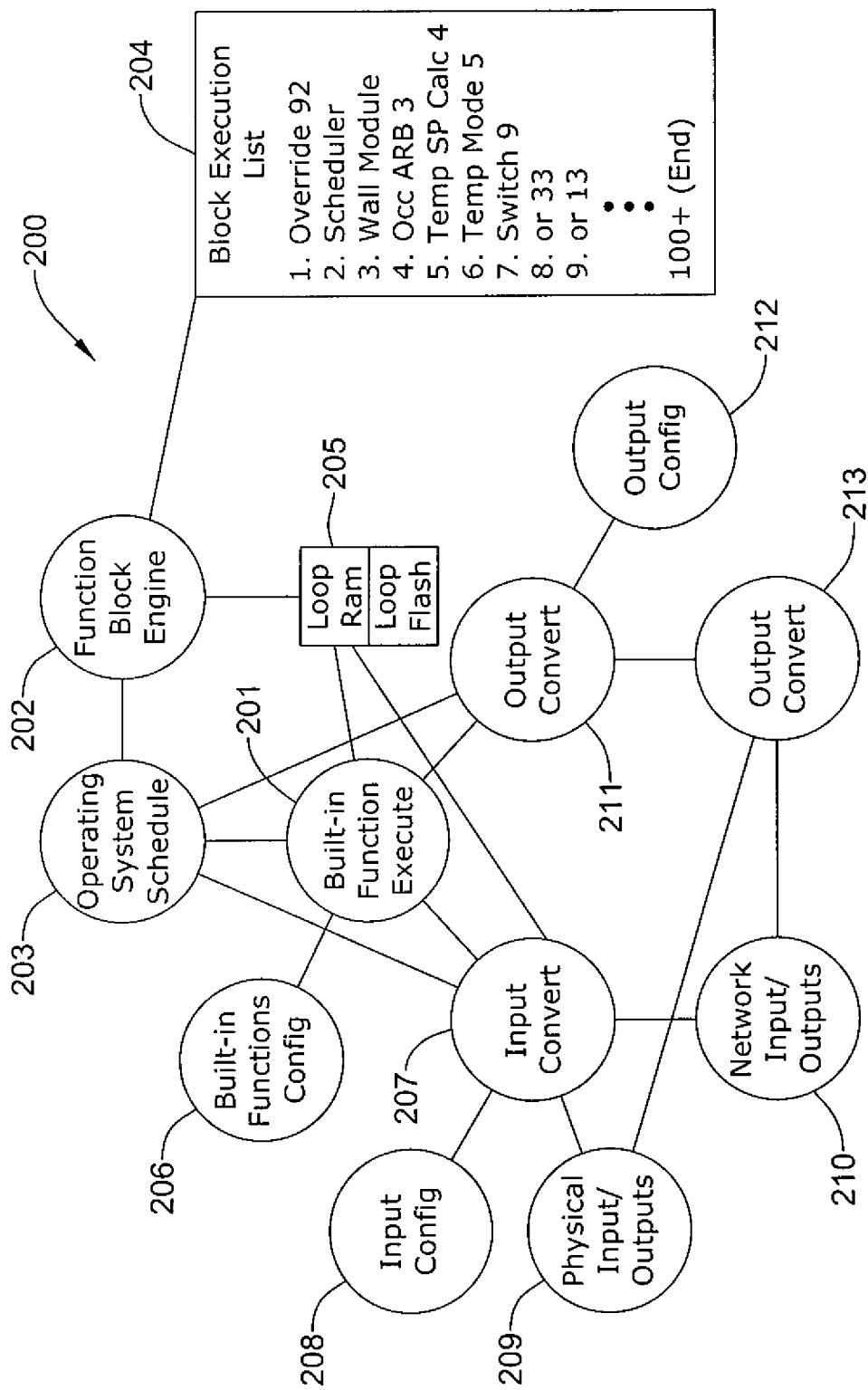
FIG. 14 is a diagram of a function block system.

FIG. 14 is a diagram of a function block system 200 which may have application to the balancing or other system. Built-in function execute 201 may be connected to operating system schedule 203, loop RAM/FLASH 205, built-in functions configuration 206, input converter 207, and output converter 211. Function block engine 202 may be connected to operating system schedule 203, block execution list 204, and loop RAM/FLASH 205. Operating system schedule 203 is connected to input converter 207 and output converter 211. Input converter 207 is connected to loop RAM/FLASH 205, input configuration 208, physical input/outputs 209, and network input/outputs 210. Output converter 211 is connected to output configuration 212 and output converter 213. Output converter 213 is connected to physical input/outputs 209 and network input/outputs 210.

Figure 15:
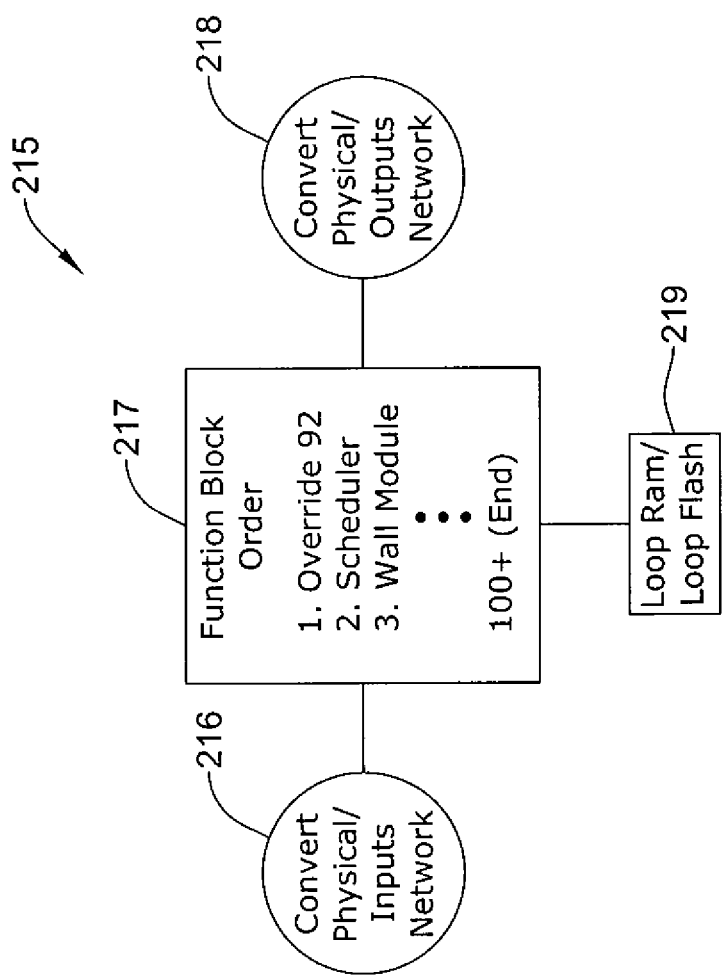
FIG. 15 is a summary variable air volume block flow diagram.

FIG. 15 is a summary VAV block flow diagram 215. A convert physical/inputs network 216 may be connected to a function block order list 217. The function block order list 217 may be connected to a convert physical/outputs network 218 and to a loop RAM/FLASH 219.

Figure 16:
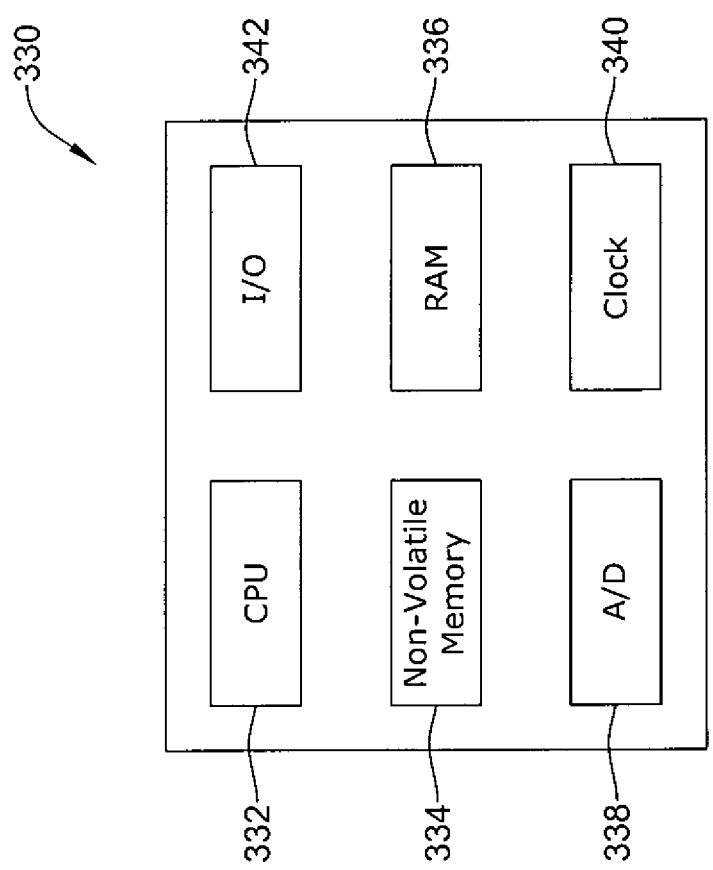
FIG. 16 is a block diagram of an illustrative programmable HVAC controller.

FIG. 16 is a block diagram of an illustrative programmable HVAC controller. The illustrative HVAC controller may be a programmable thermostat, or may be separate from the thermostat. In either case, the HVAC controller may provide one or more control signals that effect the operation of the HVAC system.

The illustrative HVAC controller may include a microcontroller 330 having a non-volatile memory 334 and a random-access memory (RAM) 336. Additionally, the illustrative microcontroller 330 may include a central-processing unit (CPU) 332, analog-to-digital converters (A/D) 338, input/outputs (I/O) 342, and a clock 340 or timer. The illustrative microcontroller 330 may include more or less than these illustrative components, depending on the circumstances. As illustrated, the aforementioned components may be provided internal to the microcontroller 330 without the need for any external components, but this is not required.

In some cases, the least expensive form of processor is a microcontroller. Microcontrollers typically contain all the memory 334 and 336 and I/O 342 interfaces, integrated on a single chip or device (e.g., microcontroller) without the need for external components. As noted above, one advantage of using a microcontroller 330 is the low cost when compared to the cost of a typical microprocessor. Additionally, microcontrollers 330 may be designed for specific tasks, such as HVAC tasks, which can help simplify the controller and reduce the number of parts needed, thereby further reducing the cost. While the use of a microcontroller may have some benefits, it is contemplated that the present system may be used in conjunction with a microprocessor or any other suitable controller, as desired.

In the illustrative microcontroller 330, the non-volatile memory 334 may be FLASH memory. However, it is contemplated that the non-volatile memory 334 may be Read Only Memory (ROM), programmable Read Only Memory (PROM), Electrically Erasable Programmable Read Only Memory (EEPROM), Random Access Memory (RAM) with a battery back-up, or any other suitable non-volatile memory 334, as desired. In the illustrative example, the amount of FLASH memory may be less than 100 Kb. In one case, the amount of FLASH memory may be about 60 Kb; however, it is contemplated that any amount of FLASH may be used depending on the requirements per application.

In some illustrative examples, the non-volatile memory 334 may be configured to have at least two portions including a first portion that is the equivalent of ROM and a second portion that is the equivalent of EEPROM. The first portion of non-volatile memory 334, often called the firmware portion, may be used to store at least in part one or more execution modules, such as, for example, a function block engine. In some cases, this portion of the non-volatile memory 334 may be programmed at the factory, and not subsequently changed. Additionally, the one or more execution modules (e.g., function block engine) stored in the firmware portion may execute, in some cases, one or more function blocks also stored in the non-volatile memory 334.

The second portion of the non-volatile memory 334 may include application configuration modules or data, including for example, a block execution list. In some cases, the non-volatile memory 334 in this second portion may be divided further to contain segments of data. This portion of the non-volatile memory 334 may be capable of being reconfigured post factory, such as during installation of the controller into an HVAC system in a building or structure. In other words, in some illustrative examples, the second portion of the non-volatile memory may be field programmable. In some cases, the amount of non-volatile memory 334 allotted for the second portion may be about 5 Kb. However, it is contemplated that any amount of field programmable memory may be provided, as desired.

It is further contemplated that the non-volatile memory 334 may also have a portion dedicated for the storage of constant values. This portion of memory may be provided in, for example, the firmware portion and/or the field programmable portion, as desired.

In the illustrative microcontroller 330, the RAM 336 may be used for variable storage. In some cases, the RAM 336 may be a relatively small repository for exchanging information during execution of the one or more programs or subroutines stored in the non-volatile memory 334. The RAM 336 may also be used for hosting the operating system of the microcontroller 330 and/or the communication capabilities, such as external interfaces. In the illustrative microcontroller 330, the amount of RAM 336 included may be about 5 Kb or less, 2 Kb or less, or any other suitable amount of RAM. In some cases, the operating system and communication capabilities may consume about 1 Kb of RAM 336, leaving about 1 Kb for other functions, such as storing variables and/or other data for the one or more programs.

The CPU 332 for the illustrative microcontroller 330 may interpret and execute instructions, and may control other parts of the microcontroller 330 as desired. In some cases, the CPU 332 may include a control unit and an arithmetic-logic unit contained on a chip. The clock 340 can provide a steady stream of timed pulses for the microcontroller 330, which may be used, for example, as the internal timing device of the microcontroller 330 upon which operations may depend. The I/Os 342 can transfer data to and from the microcontroller 330 and an external component. In some cases, for each input, there may be a corresponding output process and vice versa. The A/D 338 converter can provide transformations of an analog input into a digital input format helping to enable the microprocessor to be able to read and interpret analog input signals. In some cases, a D/A converter may also be provided to allow digital signals to be provided as analog outputs, if desired.

Figure 17:
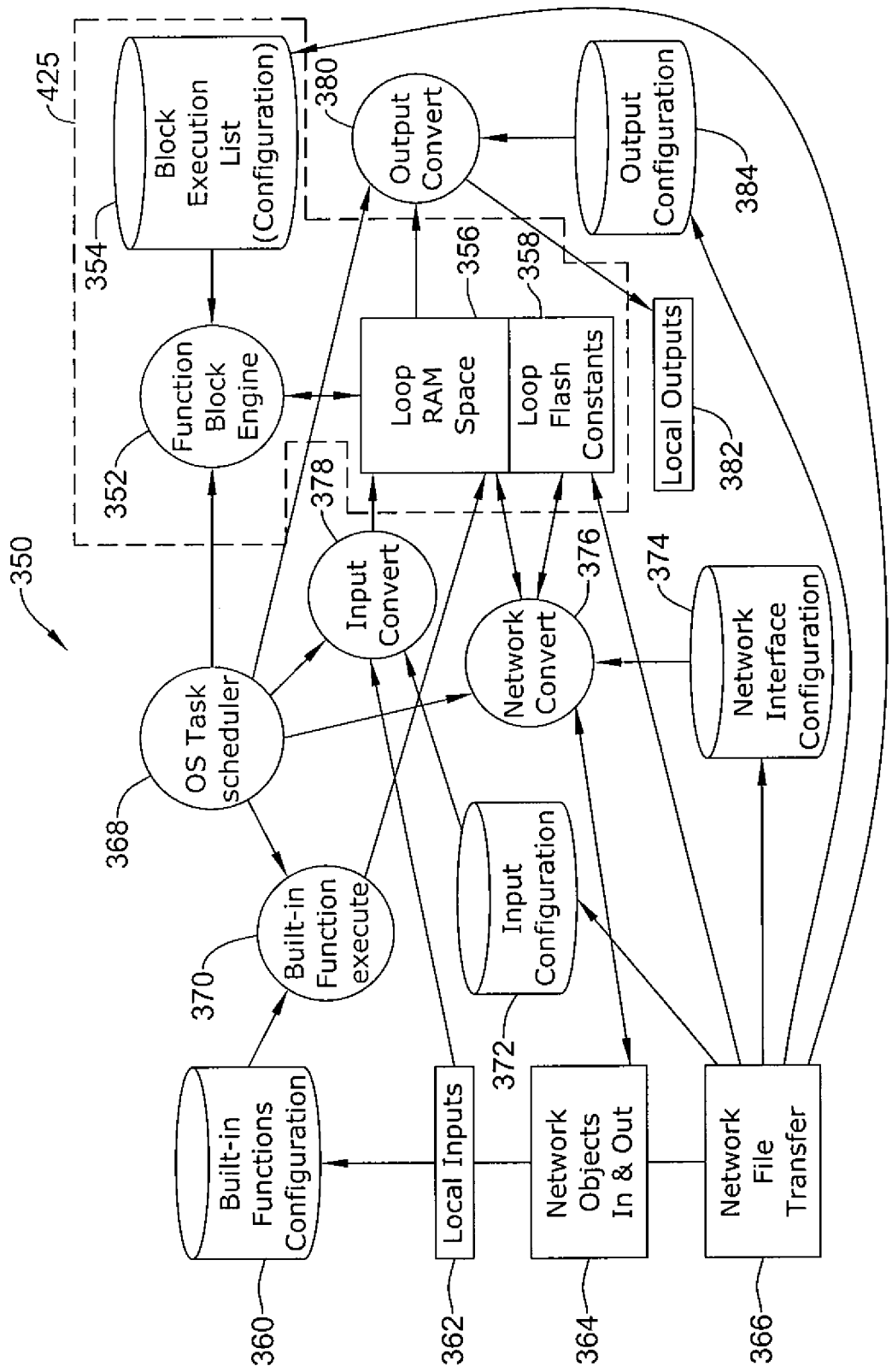
FIG. 17 is a schematic diagram of an illustrative application framework of a programmable controller.

FIG. 17 is a schematic diagram of an illustrative application framework of a programmable controller 350. The illustrative controller 350 includes one or more execution modules, one or more application configuration modules, and a parameter and variable storage space. The execution modules, as illustrated by the circles in FIG. 17, can include a function block engine 352, a built-in function execute module 370, an input convert module 378, a network convert module 376, and an output convert module 380. The application configuration modules, as illustrated by the cylinders, can include a block execution list 354, a built-in functions configuration 360, an input configuration 372, a network interface configuration 374, and an output configuration 384. The parameter and variable storage space can include a loop RAM space 356 and a loop flash constant space 358. Additionally, the illustrative controller 350 may include one or more external interfaces for communication capabilities, including a local input 362, a network file transfer 366, a network object in and out 364, and a local output 382. In some cases, the controller 350 may also include an operating system (OS) task scheduler 368.

The one or more execution modules can be resident in the non-volatile memory of the microcontroller 350, such as in FLASH memory. More specifically, in some cases, the one or more execution modules may be resident in the ROM equivalent or firmware portion of the non-volatile memory. At least one of the execution modules may include one or more programs, some of the one or more programs relating to the operation of the HVAC system. The one or more programs may include a set of sub-routines that the one or more execution modules can sequentially execute. The one or more execution modules may execute the one or more programs from the non-volatile memory.

The one or more application configuration modules can also be resident in the non-volatile memory, such as the FLASH memory, of the microcontroller 350. More specifically, the one or more application configuration modules can be resident in the EEPROM equivalent or the field programmable portion of the non-volatile memory. These modules can be pre-configured for standard HVAC applications or can be configured for custom HVAC applications, as desired. Additionally, the one or more application configuration modules can be field programmable. For example, in some cases, the one or more application configuration modules may be programmed and configured either during or after the installation of the controller into a HVAC system.

In some cases, the one or more application configuration modules can include a block execution list 354. The configuration of the block execution list 354 can direct the execution of the one or more execution modules (e.g., function blocks). In some cases, this configuration can be determined by the user or the installer. In some cases, a programming tool may be used that allows the installer to select the appropriate function blocks to create a custom block execution list 354, along with the appropriate configurations, to perform specific HVAC applications. This may help the one or more application configuration modules to be configured on a job-by-job basis, which in turn, can direct the execution of the execution modules on a job-by-job basis. In some cases, the one or more application configuration modules can include parameters or references that point to a location in memory for data, such as to the parameter and variable storage space.

The parameter and variable storage space may be provided in the controller 350 for the one or more execution modules and/or one or more application configuration modules to reference data or values to and from storage space. In an illustrative example, the variable parameter storage space, or loop RAM space 356, may be resident in RAM. This storage space can be used for the temporary storage of variables or parameters, such as function block outputs and/or temporary values from inputs, either local inputs or network inputs, of the controller 350.

Also, in the illustrative example, the constant parameter storage space, or loop flash constants 358, may be a storage space for storing constant values determined by the programmer or user. This storage space may be resident in non-volatile memory, such as the FLASH memory. Certain set points and operational parameters may be designated as constant parameter values selected by the application designer, installer, or user, and may be stored in the loop flash constants 358 storage space, if desired.

The HVAC controller 350 may also include external interfaces, such as local inputs 362 and local outputs 382. The local inputs 362 may be stored according to the input configuration 372 module executed by the input convert module 378. These modules may direct to storage the input value so that it can be used by other execution modules, such as the function block engine 352. The local outputs 382 may be configured according to the output configuration 384 as executed by the output convert module 380. This may output the value or data to an external HVAC component, such as a damper, thermostat, HVAC controller, or any other HVAC component as desired.

The OS task scheduler 368 may determine the operation and execution of the execution modules within the HVAC controller 350. For example, the execution modules may be executed in the following order: discrete inputs; including input convert 378 and network convert 376; built-in function execution 360; function block execution 352; physical output processing 380; and finally network output processing 376. However, it is contemplated that any suitable order may be used as desired.

Figure 18:
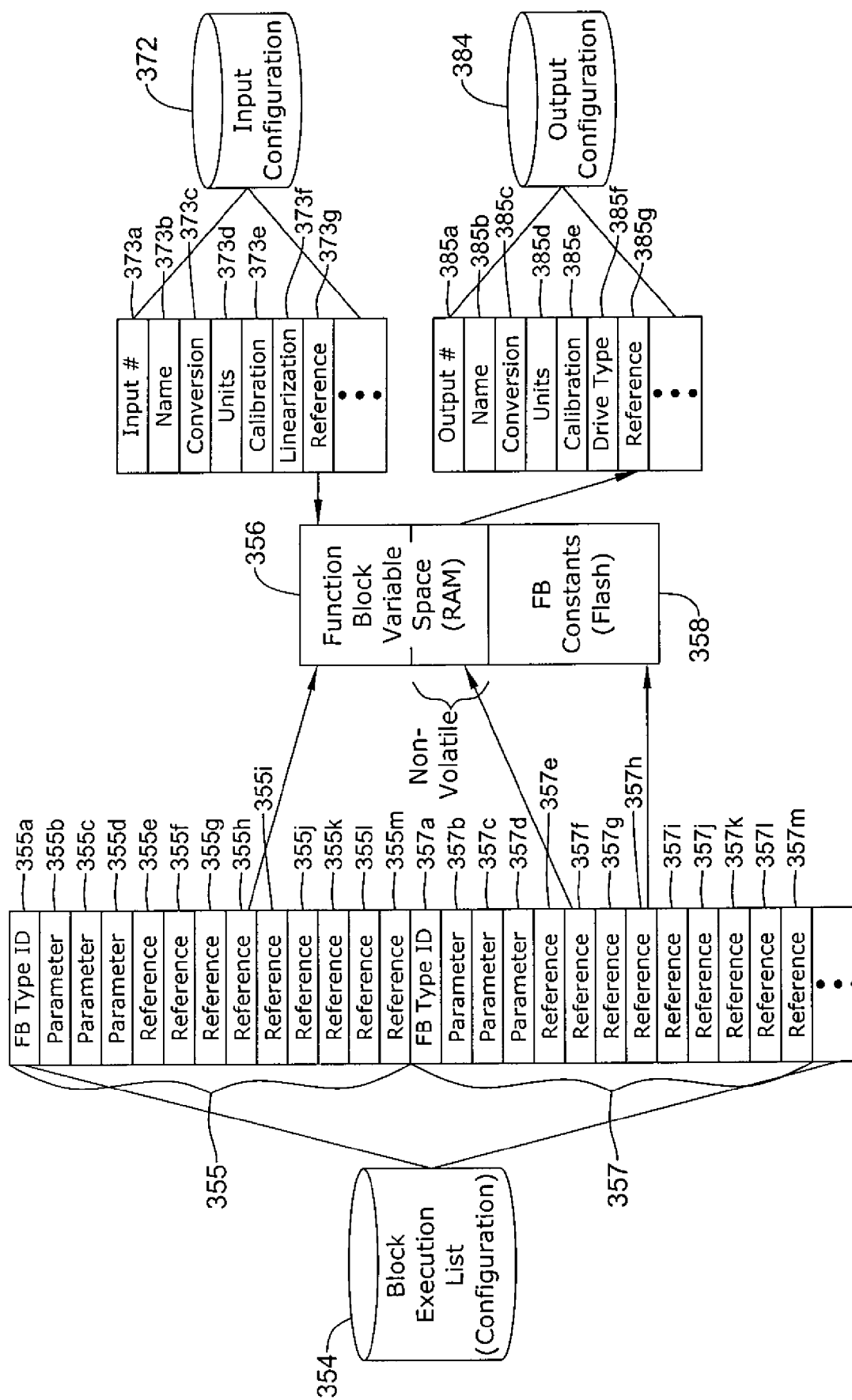
FIG. 18 is a schematic diagram of illustrative application configuration modules.

FIG. 18 is a schematic diagram of some illustrative application configuration modules of FIG. 17, including an illustrative block execution list 354. As indicated above, the block execution list 354 may be resident in non-volatile memory, such as FLASH memory, and more specifically the field programmable portion of the FLASH memory, if desired. The illustrative block execution list 354 includes a listing of one or more function blocks 355 and 357, and is used to direct which function blocks and the order of execution of the function blocks, executed by the function block engine 352 according to its configuration.

The block execution list 354 may be programmed at the factory or by the user or the installer, to configure the order and type of function blocks 355 and 357 that are to be executed for the particular application. In some cases, the user or installer can have a programming tool that allows the user or installer to select the appropriate function blocks 355 and 357 and configuration to perform the desired tasks for the particular application. Thus, in some examples, the block execution list 354 configuration may be provided on a job-by-job basis for the controller. In some cases, this can allow the block execution list 354 to be programmed and configured in the field and changed depending on the desired application and function of the controller.

In the illustrative example, the Function blocks 355 and 357 are modules that perform a specific task by reading inputs, operating on them, and outputting one or more values.

The function block 355 and 357 can be defined according to the block execution list 354, which can be programmed by the factory, user, installer, or application designer. In the illustrative example, function blocks 355 and 357 may be classified into six categories: analog function blocks, logic function blocks, math function blocks, control function blocks, zone control function blocks, and data function blocks.

The function blocks 355 and 357 may perform higher level functions, such as higher level functions for HVAC operations. Additionally, the controller may include some more generic function blocks for performing some basic applications, but, in many cases, these may be combined with other function blocks to perform higher level HVAC application.

Referring back to FIG. 18, function blocks 355 and 357 may include a number of function calls or pointers to particular locations in memory. In the illustrative example, each function block 355 and 357 may include a function block type 355$a$ and 357$a$, and a number of parameter or references 355$b$-$m$ and 357$b$-$m$. The references and parameter 355$b$-$m$ and 357$b$-$m$ may point to variables or constants that are stored in the parameter and variable storage space, such as in either the function block variable space 356 or the function block constant space 358. Additionally, in some cases, the reference and parameters 355$b$-$m$ and 357$b$-$m$ may relate to other function block outputs, inputs (either local or network), or pointers to any other data, as desired.

In one illustrative example, each function block may be about 22 bytes long. Each function block may include the function block type 355$a$ and 357$a$, which can be one byte. Each function block can also include nine references or variables 355$e$-$m$ and 357$e$-$m$, each reference or variable being allocated 2 byte WORD increments, totaling 18 bytes. Also, each function block 355 and 357 may include three parameter or configurations 355$b$-$d$ and 357$b$-$d$, each being one byte, totaling 3 bytes. However, these sizes are merely for illustrative purposes and it is not meant to be limiting in any way.

It is contemplated that any size function blocks 355 and 357 may be used, and/or any number or size of function block types 355$a$ and 357$a$, references or variables 355$e$-$m$ and 357$e$-$m$, and parameters or configurations 355$b$-$d$ and 357$b$-$d$. Furthermore, it is contemplated that the order may be the function block type 355$a$ and 357$a$, then one parameter 355$b$ and 357$b$, then the nine references 355$e$-$m$ and 357$e$-$m$, and then the two remaining parameters 355$c$-$d$ and 357$c$-$d$. More generally, it is contemplated that the function blocks 355 and 357 may be configured in any order and have any number of references and parameters, as desired.

The function block type 355$a$ and 357$a$ may be used to specify what function the function block 355 and 357 performs. Examples of functions that function block types 355$a$ and 357$a$ can perform may include, but are not limited to, one or more of: determining a minimum; determining a maximum; determining an average; performing a compare function; performing an analog latch function; performing a priority select function; performing a hysteretic relay function; performing a switch function; performing a select function; performing an AND/NAND function; performing an OR/NOR function; performing an exclusive OR/NOR function; performing a one shot function; performing an add function; performing a subtract function; performing a multiply function; performing a divide function; performing a square root function; performing an exponential function; performing a digital filter function; performing an enthalpy calculation function; performing a ratio function; performing a limit function; performing a reset function; performing a flow velocity calculation function; performing a proportional integral derivative (PID) function; performing a adaptive integral action (AIA) function; performing a stager/thermostat cycler function; performing a stage driver function; performing a stage driver add function; performing a rate limit function; performing a variable air volume (VAV) damper flow control function; performing an occupancy arbitrator function; performing a general set point calculator function; performing a temperature set point calculator function; performing a set temperature mode function; performing a schedule override function; performing a run time accumulate function; performing a counter function; and performing an alarm function. More generally, any suitable function may be performed by function block types 355$a$ and 357$a$, as desired.

Function block references 355$e$-$m$ and 357$e$-$m$ may be pointers to variables that can specify inputs, outputs and/or other data that is used by the function block 355 and 357. These variables may include data inputs that are used by the function block 355 and 357 during execution. In the illustrative example, there may be a number of variable type references that may each have a unique mapping to a memory class. In the illustrative example shown in FIG. 18, there are nine different types of variables: input, parameter, input/parameter, parameter/input, output floating point number, non-volatile output floating point number, output digital, static floating point number, and static digital. The input variables may include an input reference for the function block 355 and 357 stored in, for example, RAM memory. The parameter variable may be a value for the function block 355 and 357 to use, which in some cases, can be stored in either RAM or FLASH memory. The input/parameter variable can be a reference to either an input or a parameter, with the default being an input and may, in some cases, be stored in either FLASH or RAM memory. The parameter/input variable can be either a parameter or an input with the default being a parameter, and in some cases, can be stored in FLASH memory. The output floating point number variable may be an output of the function block 355 and 357, which can be called up as an input to another function blocks that is later executed. In some cases, the output floating point number variables may be stored in volatile RAM memory. The nonvolatile output floating point number variable may be an output of the function block 355 and 357, which can be called up as an input to another function block. In some cases, nonvolatile output floating point number variables may be stored in non-volatile RAM memory so that it retains its value on a power outage. The output digital variable may be an output of the function block 355 and 357 that can be called up as an input to another function block. In some cases, the output digital variables may be stored in RAM memory. The static floating point number variable may allow a function block 355 and 357 to use floats as static RAM variables. The static digital variable may allows a function block 55 and 57 to use digitals as static RAM variables. Additionally, there may be unused references, indicating that these references/variables are unused. More generally, it is contemplated that there may be any number of variable type references, as desired.

The output of function blocks 355 and 357 can be stored, in some cases, in the RAM for later use by the function block engine. As indicated above, and in some cases, the outputs of a function block 355 and 357 can be used as an input reference to another function block 355 and 357. Additionally, in some cases, outputs can be referenced to the input of the same function block 355 and 357, when appropriate. However, if an input is referenced to its output, there may be a delay before receiving the output signal at the input of the function block (e.g., by one cycle or iteration) due to the sequential execution of the function blocks in one illustrative example. In some cases, it may take about one second for the execution of the function blocks 355 and 357, but this should not be required.

The parameters 355b-d and 357b-d may include design time configuration information needed by the function block 355 and 357 to execute. For example, the parameters 355b-d and 357b-d may instruct a corresponding function block 355 and 357 on how to initialize itself. In the illustrative example, each function block 355 and 357 may have three parameters 355b-d and 357b-d, each including one byte of configuration information, for this purpose. However, it is contemplated that any suitable number of parameters of any suitable size may be used, as desired. In some cases, the parameter information may be entered by the application designer, the installer in the field, or the user, as desired. The parameters 355b-d and 357b-d may be configured to apply to just one specific function block type, one specific function block instance, or multiple function blocks, depending on the application. In some cases, the parameters 355b-d and 357b-d may be stored in the function block constants storage space 358, but this should not be required.

The function block variable space 356 and the function block constant space 358 may be provided in the controller. For example, the function block variable space 356, which may change, may be resident in RAM memory of the controller. In some cases, the RAM may have a portion that is volatile and a portion that is non-volatile. In the volatile RAM, upon a power disruption, the data may be lost or reset, whereas in the non-volatile RAM, upon a power disruption, the data should be retained. Thus, data that is desirable to maintain upon a power disruption may be stored in the non-volatile RAM, while other data may be stored in the volatile RAM.

The function block constant space 358 may be a constant value storage space for data, such as parameters, as determined by the application designer, installer or user. The constant value storage space may be resident in non-volatile memory, such as FLASH memory. This may include certain set points and operational parameters that are designated as constant parameter values selected by the application designer at design time, by the installer, or the user. In order to change a constant parameter, and in some cases, a new function block configuration may have to be downloaded to the controller. Additionally, in some cases, a function block description, which may be available to the user, programmer, and/or installer, can provide details as to which parameters are variable and which are fixed. Providing the function block constant space 358 may help improve the efficiency of the controller by maintaining parameters and/or variables that could be used by the function blocks 355 and 357.

External interfaces, such as the network input/output and local input/output may also use the function block 355 and 357 variable space to map data in and out of the controller. To input data into the controller, an input configuration 372 may be provided to properly configure the input so that the function blocks identified in the block execution list 354 may properly reference the data. In some cases, the input configuration 372 may include an input number 373a, name 373b, conversion 373c, units 373d, calibration 373e, linearization 373f, and references 373g. The input reference may map the input to the function block variable space 356 resident in the RAM memory. An output configuration 384 may also be provided to configure outputs that may be mapped out of the controller. The output configuration 384 may include an output number 385a, name 385b, conversion 385c, units 385d, calibration 385e, drive type 385f, and references 385g. The output reference may map data from the function block variable space 56 resident in the RAM.

Figure 19:
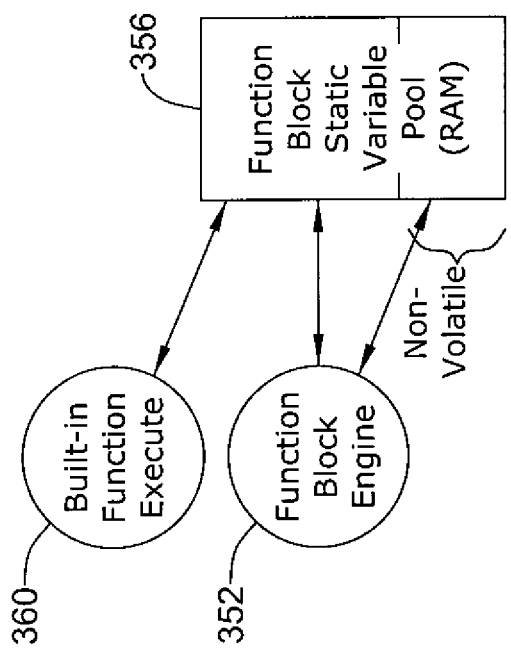
FIG. 19 is a schematic diagram of one or more execution modules including a function block engine.

FIG. 19 is a schematic diagram of the illustrative one or more execution modules of FIG. 17 including the function block engine 352. As discussed previously, the function block engine 352 may be resident in the non-volatile memory of the microcontroller, more specifically, in the firmware portion of the non-volatile memory. The function block engine 352 may include one or more programs, such as one or more HVAC application programs. The functional block engine 352 may be a set of sub-routines that can sequentially execute function blocks identified by the block execution list. In some circumstances, the function block engine 352 may execute the function blocks every second in the order provided by the block execution list.

During execution, the function block engine 352 may follow the block execution list of function blocks. This may include reading variables and/or parameters stored in the function block variable pool 356 and/or the loop flash constants 358, as directed by the function blocks and/or block execution list. The function block engine 352 may execute the function blocks from the non-volatile memory, such as FLASH memory, using the data read from the parameters and/or variables. In some cases, the function block engine 352 may also write values or data to the function block variable pool 356. In some cases, these written values are stored only temporarily in the function block variable pool 356 for use in the execution of other function blocks or as outputs of the controller.

The function block engine 352 may allow the application designer to program the controller to perform a wide variety of functions, such as HVAC functions. The function block engine 352 sequentially may execute each function block that the application designer has configured in the block execution list. In some cases, the inputs to the function blocks may be referenced from the function block variable pool 356 that may be resident in RAM. In some cases, there may only be a small stack space in the function block variable pool 356, which could be reused by the function blocks for local, temporary variable storage. Additionally, in some cases, local physical and network inputs may be provided with access to the variable space.

The built-in function configuration and execute block 360 may provide a means of translating inputs (both local and network), and providing the values as variables that can be used as inputs to any or selected function blocks. In other words, in some case, the function blocks may be unaware that an input to a function block came from a physical input, a network input, a parameter, or as an output from another function block. The input from the built-in function execute block 360 may be stored in the function block variable pool 356, in some cases only temporarily, for use by the function block engine 352.

The following is an approach for a balancing procedure for a configuration tool that may be used. First is a k factor method with the following steps: 1) Set nviFlowoverride from HVO_OFF_NORMAL (0) to HVO_Maximum (7); 2) Read nciMaxFlowCoolSP and nvoBoxFlowCool and compare; wait until the nvoBoxFlowCool is within 0.5% of the nciMaxFlowCoolSP; look at nvoCmdCoolDmpPos and monitor until changes stops for 5 seconds or direction changes; 3) Read nvoBoxFlowCool and nvoCmdCoolDmpPos for stability; average nvoVelSenPressC reading over a 5 sample window after stability is reached; if the Flow is unstable, ask the user, "Would you like to balance anyway?" 4) Display apparent flow (nvoBoxFlowCool) and Display Current K Factor nciKFactorCool; show the new calculated K Factor based on the equation below and ask user to proceed with new calculated K factor; (K Factor) nciKFactorCool=(user entered measured Box Flow)/sqrt([5 sample average of nvoVelSenPressC]–nvoPressOffsetC); and 5) Set nviFlowOverride from HVO_Maximum (7) to HVO_OFF_NORMAL (0); (optional) check minimum flow if desired.

Next is a min/max method with the following steps: 1) Set nviFlowOverride from HVO_OFF_NORMAL (0) to HVO_Maximum (7); 2) Read nciMaxFlowCoolSP and nvoBoxFlowCool and compare; wait until they are within control range of algorithm; look at nvoCmdCoolDmpPos and monitor until changes stops for 5 seconds or direction changes; 3) Read nvoBoxFlowCool and nvoCmdCoolDmpPos for stability; average nvoVelSenPressC readings over a 5 sample window after stability is reached; if the Flow is unstable, ask the user "Would you like to balance anyway?" 4) Display apparent flow (nvoBoxFlowCool) and request input for actual max flow; enter in value in nciMeasMaxFlowC; 5) Set nviFlowOverride from HVO_OFF_NORMAL (0) to HVO_Minimum(7); 6) Read nciOccMinFlowCSP and nvoBoxFlowCool and compare; wait until they are within control range of algorithm; look at nvoCmdCoolDmpPos and monitor until changes stops for 5 seconds or direction changes; if the Flow is unstable, ask the user "Would you like to balance anyway?" 7) Read nvoBoxFlowCool and nvoCmdCoolDmpPos for stability; average readings over a 5 sample window after stability is reached; if the Flow is unstable, ask the user, "Would you like to balance anyway?" 8) Display apparent flow (nvoBoxFlowCool) and request input for actual min flow; enter in value in nciMeasMinFlowC; and 9) Set nviFlowoverride from HVO_Minimum(7) to HVO_OFF_NORMAL (0).

The following presents a simple work bench arrangement of the required hardware and the associated wiring connections to configure Excel™ 10 W775D, F Controllers (by Honeywell International Inc.). One may proceed as in the following: 1) With power disconnected to the housing subbase, insert the controller circuit board (contained in the housing cover) into the subbase unit; 2) Apply power to the controller, and insert the Serial Interface cable into the jack on either the Excel 10 W7751D or F Controllers; 3) Use the CARE/E-Vision™ PC tools to configure the controller (See the CARE E-Vision™ User's Guides, forms 74-5587 and 74-2588, for further details), use the ID number sticker on the controller or press the bypass button on the wall module; 4) When configuration is completed, power down and remove the W7751D, F from the subbase, mark the controller with the Plant name or location reference so the installer knows where to install each controller in the building; 5) Repeat with next W7751D, F to be configured; and 6) The data file used for this configuration should be used at the job site so the commissioning data matches the controllers.

One may do configuring in the field. If the controllers were installed at the site, the procedure to assign the node numbers to the Excel™ 10 VAV Controller may be as in the following: 1) Instruct the installer to remove the ID sticker from each controller during installation and to affix it to either the job blueprint at the appropriate location or to a tabulated list, be sure the installer returns these prints to the application engineer after the controllers are installed; 2) Connect to the E-Bus with the CARE™ PC tool; and 3) Proceed to configure the W7751 (using the job prints for location reference for the controllers) by following the standard CARE™ procedures.

One may configure a Zone Manager. The Q7750A Excel™ 10 Zone Manager may send out a one-time LonWorks™ message containing its 48-bit Neuron™ ID after any power-up WARMSTART™ or when the Excel™ 10 Zone Manager is reset by pressing the reset button. It may be important to note that pressing the reset button on the Excel™ 10 Zone Manager may cause all application files in the Q7751, including the C-Bus setup, to be lost. The LonWorks™ message is sent out one time and only on the E-Bus, not on the B-Port. The message may be the same as the one generated after pressing the service pin pushbutton available on Excel™ 10 VAV Controllers and also via the wall module bypass pushbutton. The CARE commission tool (E-Vision) can use this message to assign the node address.

The Assign ID procedure is the same as for an Excel™ 10 VAV Controller except, instead of pressing the bypass button, the reset button should be pressed or the power must be cycled (down then up) on the Q7750A Excel™ 10 Zone Manager.

The following is pertinent to Sensor Calibration. The space temperature and the optional resistive inputs may be calibrated. The wall module setpoint potentiometer can not necessarily be calibrated. One may perform the sensor calibration by adding an offset value (either positive or negative) to the sensed value using E-Vision™ menus (see E-Vision™ user's guide, form number 74-2588).

The following may be used in Air Flow Balancing for Pressure Independent applications. In addition to the ten point Flow Pickup Calibration Table, the Excel™ 10 VAV Controller may provide for 3-point (Maximum, Minimum, and Zero) Air Flow Calibration. This may allow the box to be adjusted so it can be certified that the box provides the flow rates specified by the consulting engineer. When balancing is complete, the actual flow from a box should be within 5 to 10 percent of the indicated air flow (as shown on the E-Vision™ screen). On may note that there are many sources of error in flow-hood measurements. Flow hood meters may typically attain accuracy to within plus or minus three to five percent of full flow. The error can be due to the device being out of calibration, or that it was last calibrated with a different style of diffuser. Even the operator technique may play a role in obtaining repeatable, accurate flow readings. When working with slotted diffusers, one should not use a hood, but rather use a velocity-probe type of instrument.

One may follow the diffuser manufacturer's recommendation for a procedure of how to best measure the air flow through their products. Prior to air flow balancing for the first time, perform a zero flow calibration procedure. To do so, power the Excel™ 10 VAV Controller for one hour or more before performing the procedure. Select the controller being worked on with E-Vision™ (see the E-Vision™ User's Guide, form 74-2588, for general details on using E-Vision). Due to inconsistencies in VGA display cards and modes, be sure to maximize the E-Vision™ window on the screen (by clicking the up-arrow at the top-right corner of the E-Vision™ window). This assures that all E-Vision activities are user viewable. Refer to the Air Flow balancing section in the E-Vision™ user's Guide form, 74-2588 for the exact procedure. As to resetting Air Flow Calibration to Factory Defaults, one may refer to the Air Flow Balancing section in the E-Vision™ user's Guide form, 74-2588 for the exact procedure.

A VAV Zeroing Procedure may include the following): 1) Manually command Damper to Closed Position; 2) Read nvoCmdCoolDmpPos until it has closed (See step 3 in K factor Balancing Procedure); 3) Command nviAutoOffsetC to true; 4) Command nviAutoOffsetC to false; and 5) Observe nvoPressOC has changed.

The present system may permit a configuration algorithm to work with an efficient architecture dedicated to custom designed control functions to be connected and created and compile information in such a manner as to allow low cost microprocessors to accept the configuration and implement a fully programmable flexible HVAC controller in a very low resource environment. The present system may use efficient control functions that have fixed resource structures allocated through a separate compiler tool.

Part of the present system may be in the table, as to the function block piece. The representation may be on the screen. The function block list may be pre-existing. When one goes to simulate, then memory files may be generated.

Figure 20:
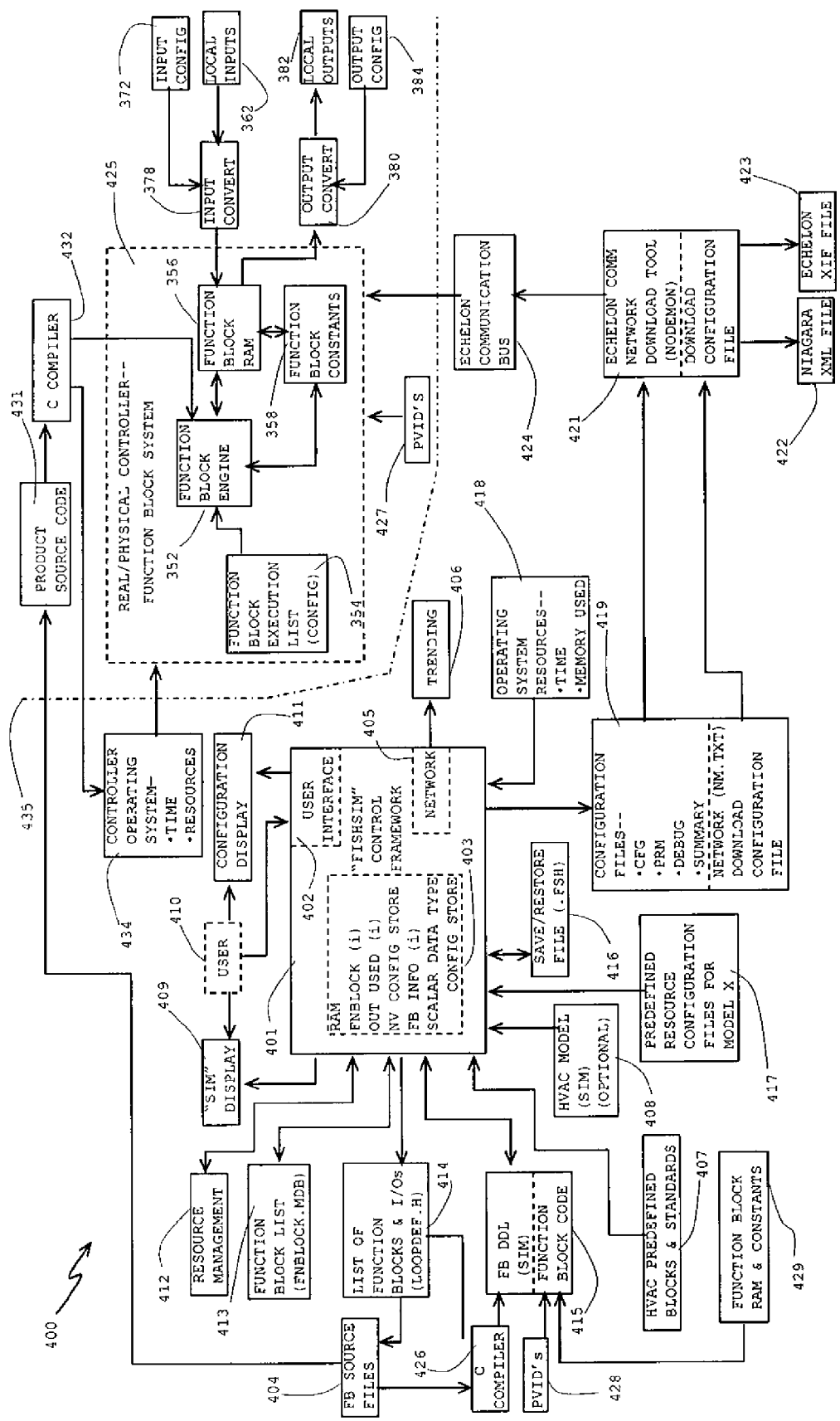
FIG. 20 is a diagram of a control system language compiler.

FIG. 20 is a diagram of a control system language compiler 400. A "fishsim" control framework 401 may have a user interface 402, and a storage RAM 403 with Fn Block (i), out used (i), nv configuration store, FB info (i), scalar data type configuration store, and more or less items depending on design specifics of system 400. Framework 401 may have a network 405 output of trending 406. Some information to an analog input may include HVAC predefined blocks and standards 407. Also, an optional HVAC model (sim) 408 may be an input to framework 401. An HVAC application of system 400 is for illustrative purposes. Predefined resource configuration files for model X module 417 may provide configuration information to control framework 401. Framework 401 may be connected to a save/restore file (.fsh) module 416.

The user interface 402 may have inputs from a user 410. The user 410 may also work with a "sim" display 409 and a configuration display 411. User interface 402 may provide inputs to the configuration display 411 and "sim" display 409.

An operating system resources (time and memory used) module 418 may provide operating system (OS) resources to control framework 401. A resource management module 412 may output management information to the control framework 401. A function block list (fnblock.mdb) module 413 may provide function block information to framework 401. Also, module 413 may provide function block information to a list of function blocks and I/Os (loopdef.h) module 414 via framework 401. An output of related information from module 414 may go to a function block source files module 404 which provide an output to C or other kind of compiler 426. An output of the C compiler 426 may go to an FB DDL (sim) portion of module 415. Module 415 may exchange function block information with control framework 401. A PVID module 428 may provide PVID's to a function block portion of module 415. Also, a function block RAM and constants module 429 may be connected to the function block code portion of module 415.

Control framework 401 may output configuration files, such those of cfg, prm, debug and summary, to a module 419. Also provided may be a network (nm.txt) download configuration file to module 419. An output from module 419 may go to a module 421. Information related to configuration files of module 419 may go to module 421 relating to the Echelon™ communication network download tool (nodemon). Information related to the network download configuration file of module 419 may go to the module 421 portion pertaining to the download configuration file. This configuration information of module 421 may go to a Niagara™ XML file 422 and/or an Echelon™ file 423. Also information relating to the download tool (e.g., "nodemon") from module 421 may go to a real/physical controller function block system module 425 via an Echelon™ communication bus 424.

The function block system module 425 may include a function block execution list (config) module 354 (see FIG. 17) having an output connected to a function block engine module 352. Module 352 may be connected to the function block RAM module 356 and to a function block constants module 358. Input information may be provided to the RAM module 356 from an input convert module 372. Output information may be provided to the constants module 358 from an output convert module 380. A controller operating system module 434 may provide time and resource management for the real/physical controller function block system module 425. Also, a PVID module 427 may provide PVID's to system module 425. The FB source files module 404 may provide an output to a product source code module 431. This output may be in the same code as the output to compiler 426. Module 431 may provide an output to a compiler 432. Compiler 432 may provide an output to controller operating system module 434 and an output to the function block engine of system module 425. Some or all of module 425 may be replicated in module 415. FB DDL (sim) of module 415 may be a key to success of a function block based design.

In FIG. 20, line 435 may show a separation between a fishsim tool on the left of line 435 and a function block system on the right side of the line. The tool permits a simulation of an operation of a designed system before it is put into a physical implementation as represented by the system on the right side of line 435. Memory and other resources may be shifted from the right side to the left side for reasons of economy.

Figure 21:
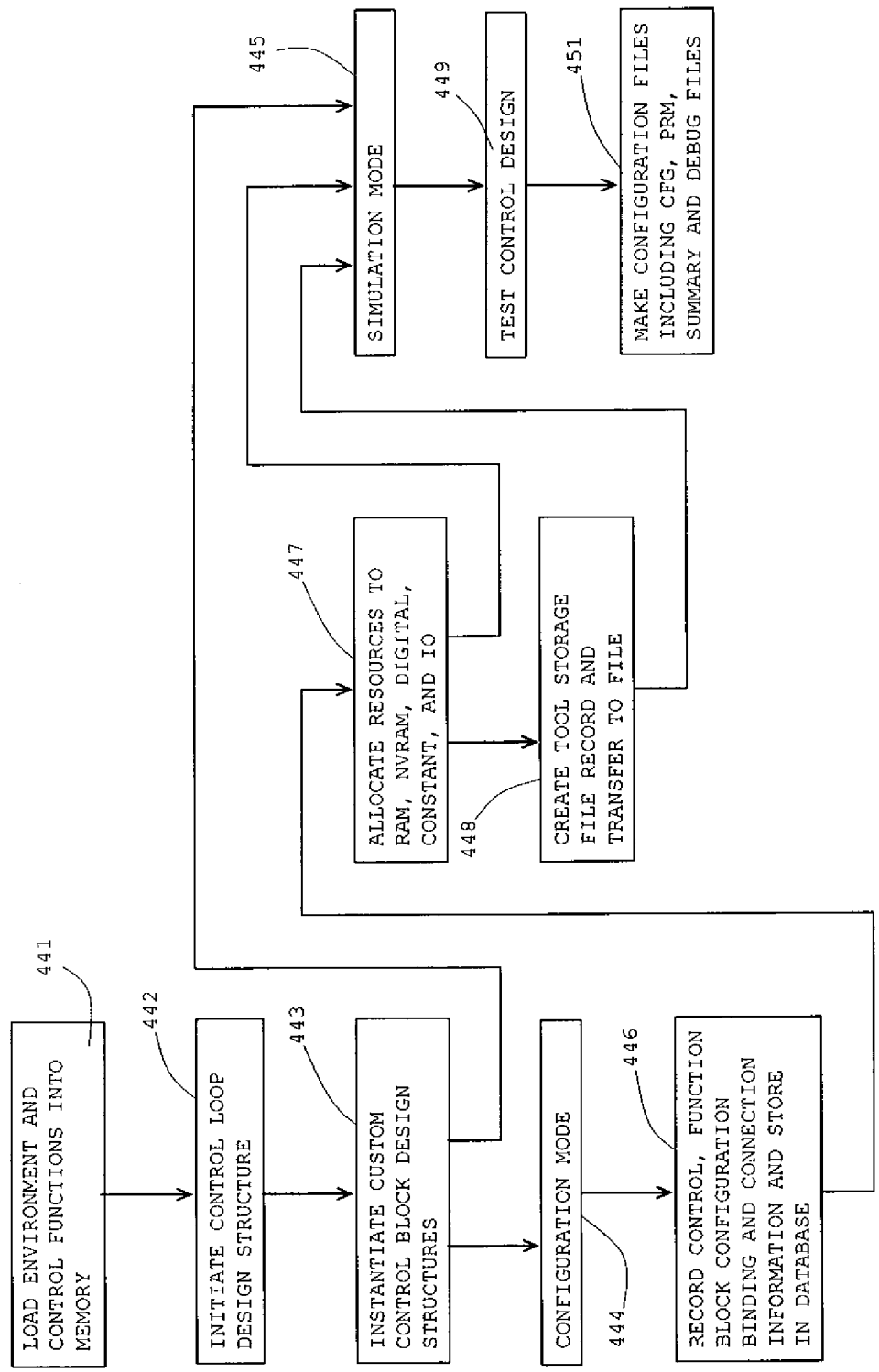
FIG. 21 is a diagram of activity related to the control system language compiler.

FIG. 21 is a diagram of activity related to the control system language compiler. It may start with a module 441 for loading environment and control functions into a memory. The loading of control functions may involve the function block list (FnBlock.mdb) of module 413 (FIG. 20) as a load. Also, predefined blocks and standards of module 407 and predefined resource configuration files for a model of module 417 (FIG. 20) may be considered for loading. Then a control loop design structure may be initiated at module 442. A list of possible function blocks for a menu on a left side of a screen may be unloaded from the mdb file of module 413, which also can contain information about configurations, non-configurations, ins, outs, changes, and so on. A spread sheet may be obtained from an mdb file. Going from module 442 to module 443, custom control loop or block design structures may be instantiated for an array of the spreadsheet. A FnBlock(i) array of the spreadsheet may be populated. Information for the array may include non-function blocks as well. At this point, one may go to a configuration mode module 444 where blocks are dragged on to a screen to form a design of a circuit or structure. As these blocks are dragged on and connected, relevant information about this design is filled into the spreadsheet. Function block and other pertinent information may be provided for a simulation operating system (e.g., an execution order) to a simulation mode module 445.

One may move from the configuration mode module 444 towards module 446 to record control, function block configuration binding and connection information, and store in database which may be a RAM structure. The spreadsheet may be further populated. Here a fish (.fsh) file of module 416 (FIG. 20) may be saved and/or restored. From module 446, one may go towards module 447 where resources may be allocated to RAM, NVRAM, digital constant, and IO. Here a count may occur when something is dragged on to such as blocks, connections, tags representing outputs of blocks going from one page to another of a screen, PVID's, and so on; however, only the things that are used will use resources such as memory. Results of module 447 may go to the simulation mode 445.

The module 447 output may also go to module 448 where a tool storage file record is created and transferred to a file. An example may be a save to the .fsh file. The output from module 448 may go to the simulation mode module 445. The simulate mode may create PVID's from scratch and their assignments, find inputs, outputs, information for and from the spreadsheet, make new arrays, create a list of outputs used just for function blocks (e.g., from an .fsn file). Then from the simulation mode 445, there may be a testing of the control design at module 449. Here IO's may be changed before testing. From the test control design module 449, one may go to module 451 to make configuration files including cfg, prm, summary and debug files. Controller downloadable files and user friendly documentation files may be made at this module.

Figure 22:
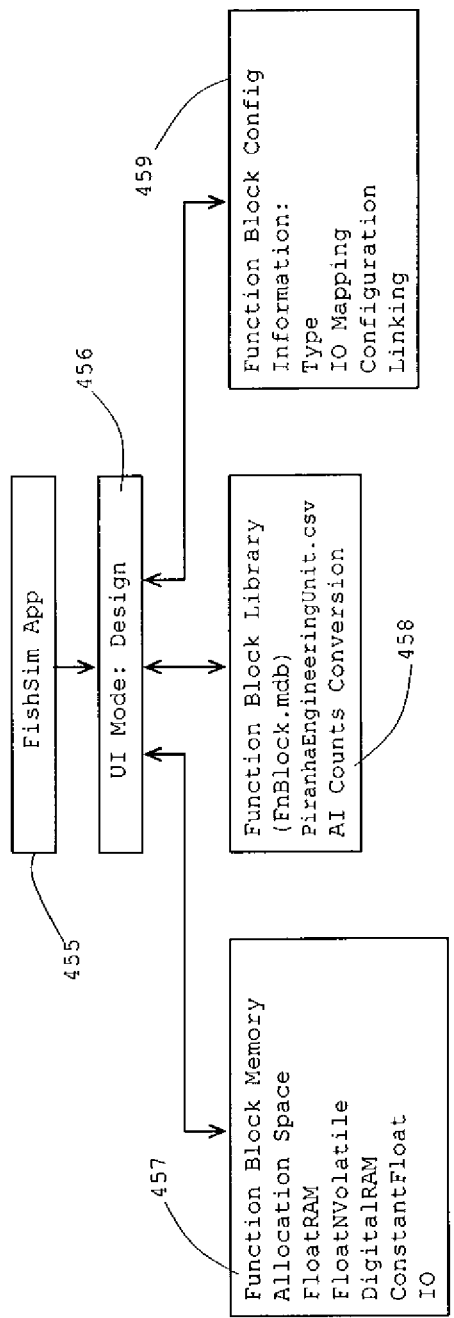
FIG. 22 is a diagram that relates to a control framework module of the compiler shown in FIG. 20.
Figure 29A:
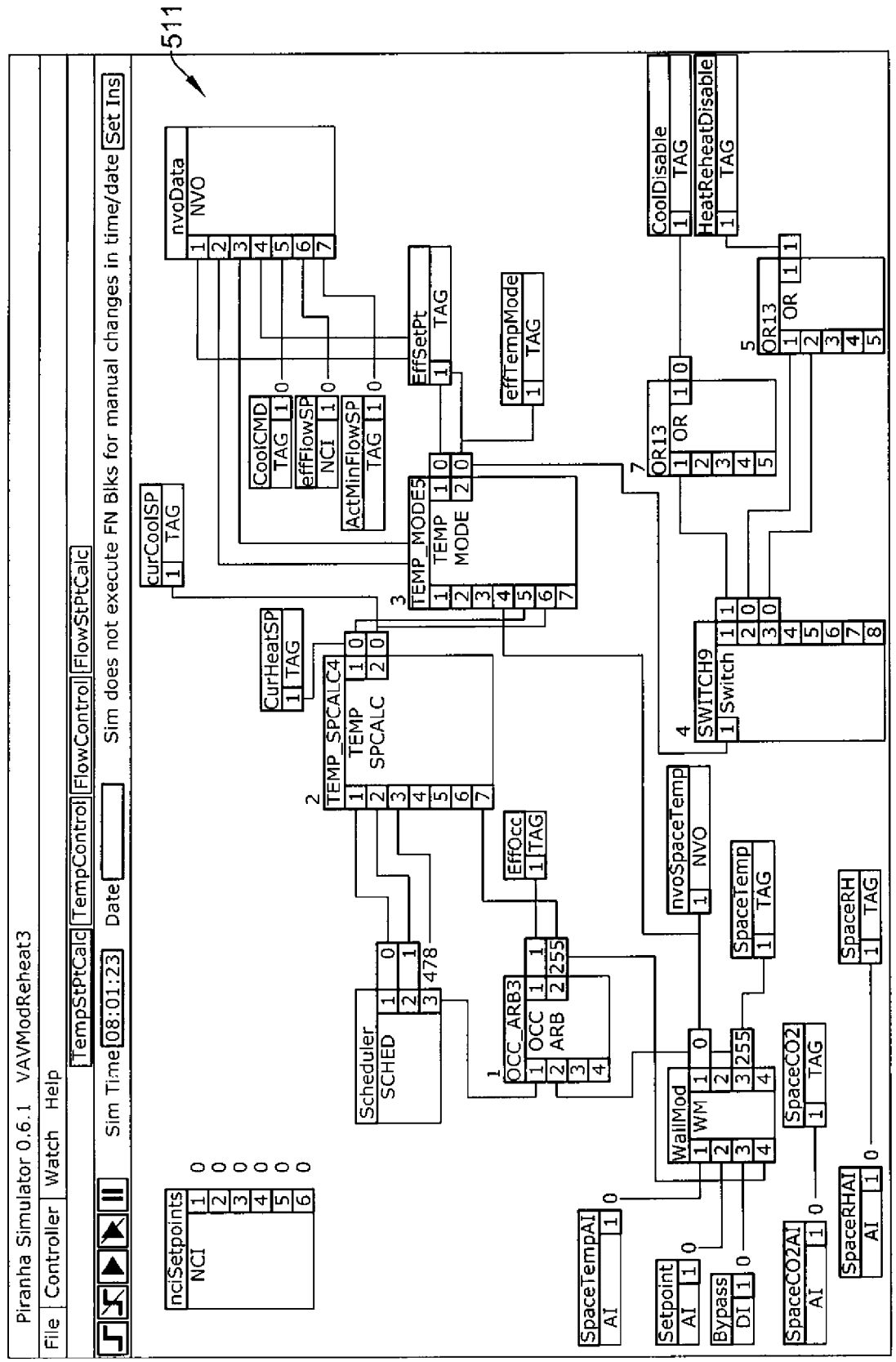
FIGS. 29a, 29b, 29c and 29d show displayed portions an example function block layout for reheat mechanism.
Figure 29B:
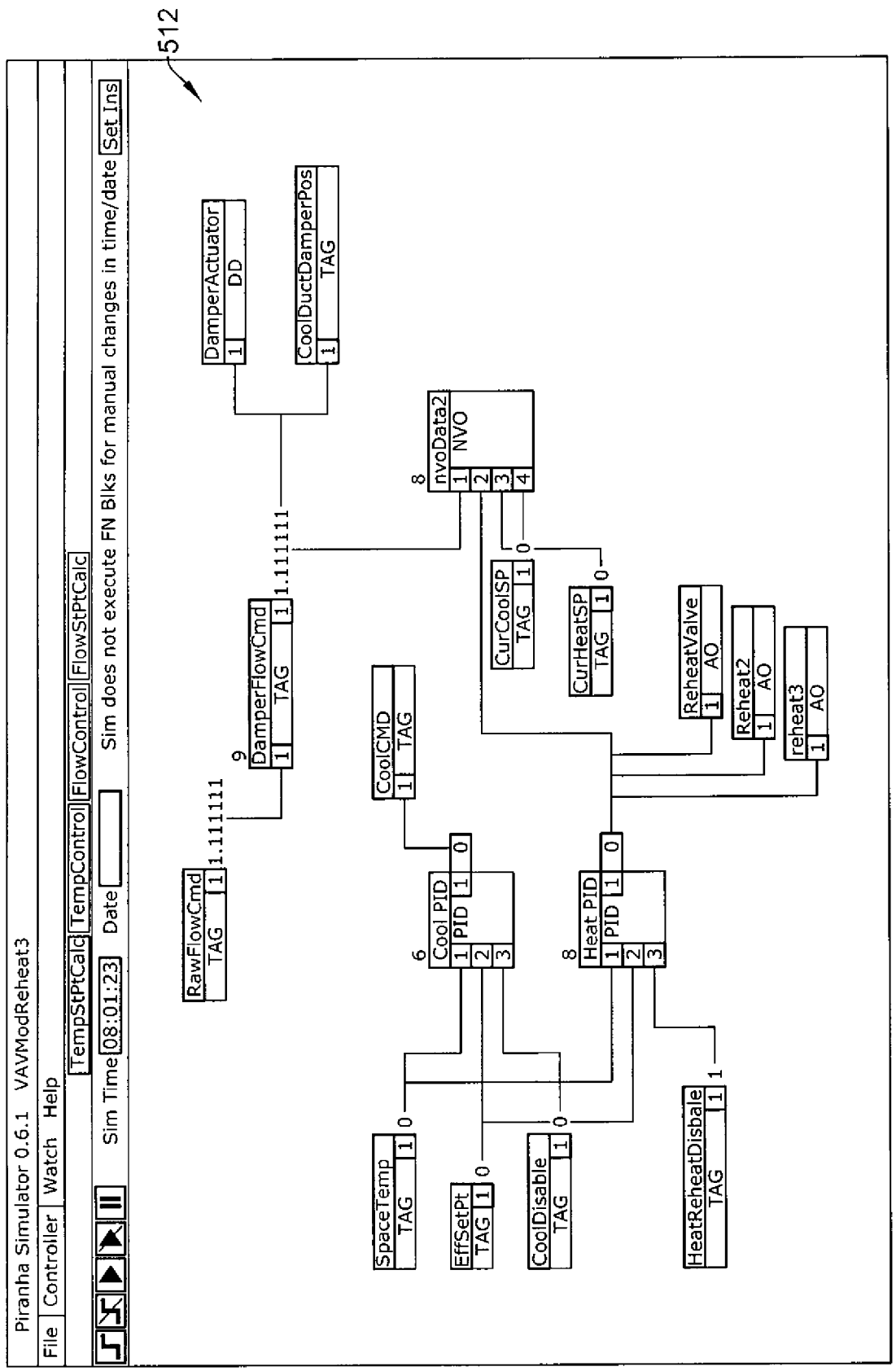
Figure 29C:
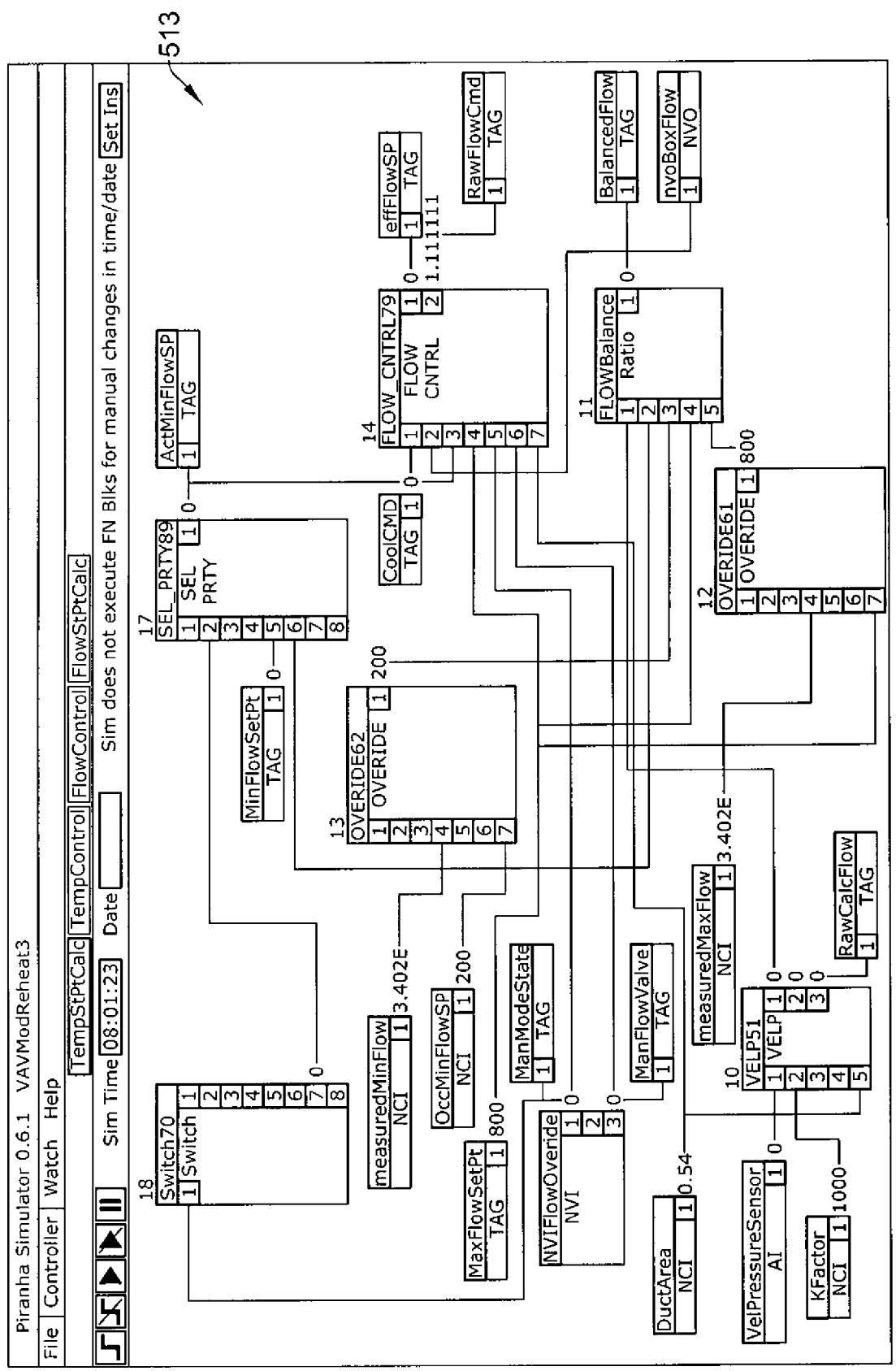
Figure 29D:
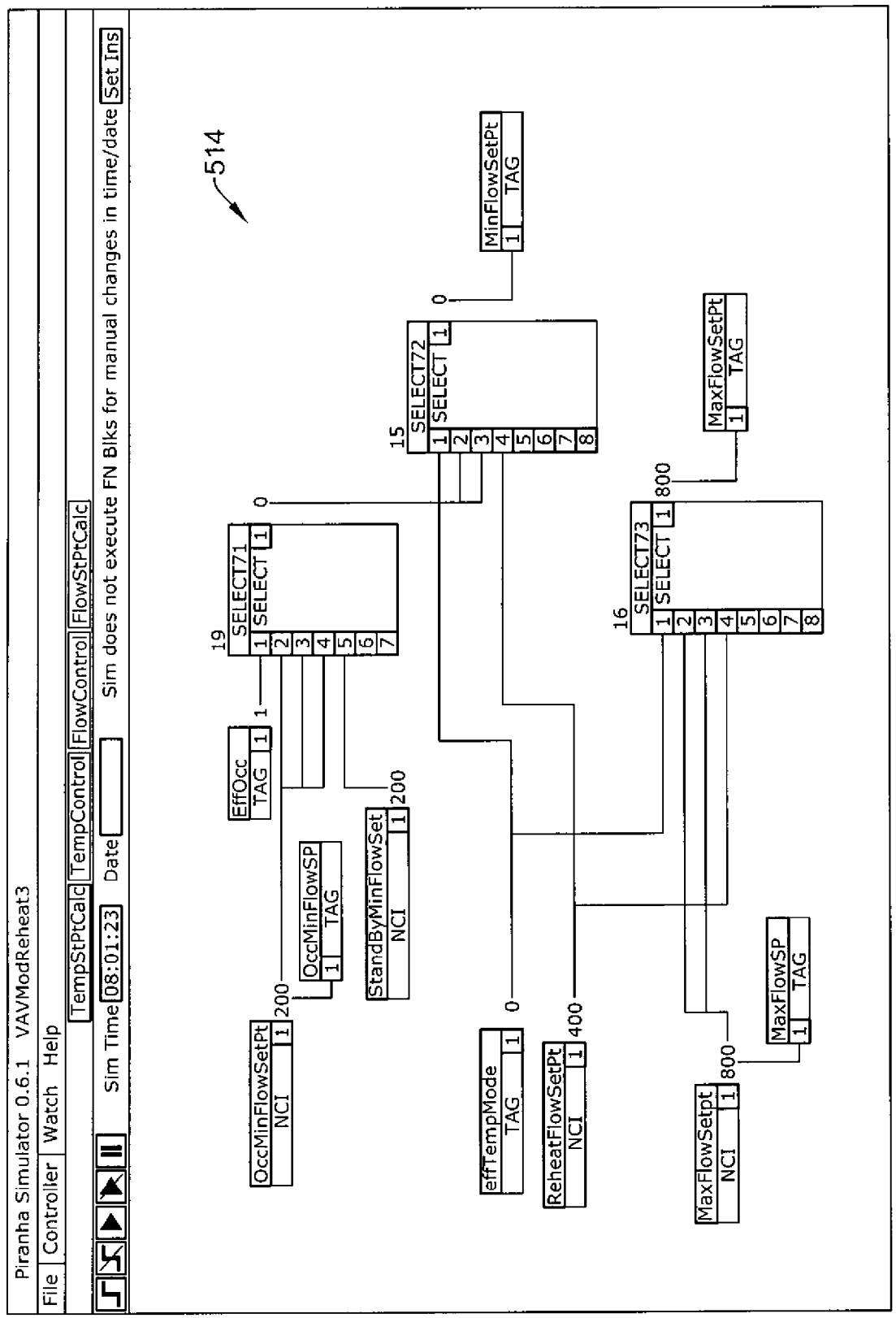

FIG. 22 is a diagram that may relate to the FishSim control framework of module 401 of FIG. 20. Module 401 may provide a replication of the real world as it relates to a function block control design. A FishSim application may be noted at module 455, which may provide an output to a user interface mode for design module 456. Here, Fish may read a function block library into a LoopDefs(i) array. A LoopDef.h file is noted in module 414 of FIG. 20. There may be a two-way interaction or connection by module 456 with a function block memory module 457. Module 457 may relate to allocation space and IO's. There may be an allocation of memory relative to float RAM (floating point values, 4 bytes, volatile storage), floating non-volatile (4 bytes), digital RAM (1 byte volatile RAM), and constant float (read only floating non-volatile storage). This allocation may relate to the allocation of resources at a sim mode as indicated in module 412 of FIG. 20. The resources may be kept track of as blocks or things are dragged on to the screen of a display of modules 411 and 410. One may work with RAM not necessarily files as files may be one time things. Information or files may be put into the RAM to work on from there.

There may be a two-way interaction or connection between module 456 and module 458 which may relate to a function block library (FnBlock.mdb) of module 413 where available function blocks may be read in as at the first step with module 441 (FIG. 21). Other information read in may include Piranha engineering unit (csv) and AI counts conversion. "csv" is a format which refers to comma separated value. It may represent a layout of the spreadsheet.

There may be a two-way connection or interaction between module 456 and module 459 concerning function block configuration information, relating to configuration mode module 444. Such information may include type, IO mapping, configuration and linking. Module 459 may include spreadsheet information.

One may drag one or more function blocks on a screen. When a function block is dragged on the screen, about 150 columns new data are treated. These data may be placed on a spreadsheet in a comma separated format (csv). An example may have a device name, loop type, function block name, work parameter values for a number of columns, word parameter IO types, IO index, byte parameter values, schedule for a number of columns, remote source output number, source block numbers, block coordinates, loop names, tag loops, execution order, and so on.

One may take a function block from a menu and place it in the screen for the circuit to be designed. There may be nine total inputs and outputs, which may be set up according to the function block. One may note that WalMod (wall module) is not a function block. It may be noted that only function blocks have or get an execution order. One may note often that only about 20 of the 80 blocks on the screens might be function blocks. Any item with a name on the list in the csv spread sheet or table is a function block. There may be type numbers in a column for both the function blocks and the non-function blocks. For instance, number 19 is a Temp_Mode function block, and numbers 130 and 131 are a scheduler and wall mod non-function blocks, respectively. Number 41 is a temp_scale, number 39 indicates overrides 61 and 62 function blocks, numbers 241 indicates several tag_out non-function blocks, and so on.

A row of a function block or other item information, in a csv format, may include a device name, mechanism or loop the device is associated with, loop type, function block name, word parameter value (0), word parameter value (1) and so on. The row may also have input and output types and index, connection information, source information, location, name of the function block or other item, a function block execution order, macro values, and so forth. This information may be typical of other rows of the csv format.

Example formats of portions of data for the present system may be shown in FIGS. 23-28. FIG. 23 shows an illustrative example of a spreadsheet 501 for data in a csv format data. FIG. 24 reveals an example of an intermediate file 502 for a function block system. FIG. 25 is an example of a summary file 503 of the spreadsheet 501. FIG. 26 is an example of a configuration (CFG) file 504. FIG. 27 is an example of a Piranha™ parameter file 505. FIG. 28 is an example of a text file 506 of Piranha™ related information.

Examples of the data shown herein relate to a reheat (VAV-ModReheat3) mechanism. An example function block layout of this mechanism may include displayed portions 511, 512, 513 and 514 which are shown in FIGS. 29*a*, 29*b*, 29*c* and 29*d*, respectively. The essentials of the layout in these Figures are noted herein.

The language compiler may take blocks, connections and so forth on the screen, converts and places the information into the tool (fishsim). The tool does pre-work or work ahead of time. The Piranha side with the function block engine is lighter and the burden is added to the tool side. The compiler is a graphical compiler that converts and moves information from the graph to the tool. The spreadsheet or table is like a chart that does not exist until saved. It is the save that creates the chart or file. The table is a direct snapshot of what is in the RAM of the graphical.

The compiling here amounts to taking graphical objects in to the parameter file and to the configure file in FLASH. The table represents current work in progress, before going into a simulate and test mode. One may design (graphical), simulate, build and download. A setpoint change for example may be saved in the memory and shown in the table.

Function blocks get converted during the present compiler process. The compiler now can take the table information and put it into download files.

A byproduct of the present approach (compiling) could be a trouble shooting tool. One may "look under the hood" at an intermediate view of what is occurring. The compiler may generate hex, e.g., 8200 in a hex file. Hex 8000 may represent floating values, 8100 for setpoints, 8200 for digital values, 8300 for fixed control constants, 9000 for analog in, 9100 for IO filtered analog in, 9200 for universal input calibration offset, 9300 for digital in, 9400 for analog out, 9500 for digital out, 9A00 for floating digital out, with other hex values for other items. Decimal equivalents might be used. The hex language may be intermediate in a compiled configuration version. One may compile a new table (after a design) to a project summary intermediate output for debugging. Then one may go to a configuration file which in a language which represents hex but is not in hex. The numbers and letters may be in an ASCII (American Standard Code for Information Interchange) string format that represents the hex configuration. This file is not necessarily executable in itself. It is not an actual code which is in the controller for execution.

The control framework 401 (FIG. 20) is for taking things on the screen. As to the list of function blocks 414, the database should be matched up with the function block code 415.

The function block list should be defined before a start. A new function block may be defined with writing a code in for the block.

The end product of the compiler is a hex-like file. The network variables may be configured. A network piece may be a download. A short stack of Echelon™ may be utilized. The configuration and parameter file may have network information. There may be a network configuration file.

Niagara may have its own download file. It may be a Niagara XM filed or an XIF file. The download tool 421 may be in nodemon which may be a hex-like file. A network configuration file may be in an nm.txt file.

Configuration and parameter files are specifically for physical (i.e., real) control. A summary file (of Echelon™) may be used for debugging. The needed network tool and database may be an intermediate file. The configuration may be on the screen. In the simulate mode, a PVID is assigned. Examples are 8000 for RAM and 8200 for control digitals. A table is to an intermediate file, and to hex-like configuration files. An execution order on a control loop may be an intermediate file. There may be a parameter file and a debug file.

The present approach may involve taking the control block functionality and loading into memory structures. It appears critical that the control block functionality be defined in conjunction with the algorithm listed. The control loops structures may be instantiated in memory.

Next, the "configuration mode" may allow a control block design to be individually configured with fixed memory structures to create standard HVAC control software functionality. Next the block may be interconnected and connected in a way to perform control functions. Resource usage such as RAM, NV Ram, Digital, Constants, Setpoints, and IO may be allocated and tested against limits. The information may be encoded into a Control Block structure corresponding to the structure recorded. Additionally, a simulation and test mode can be added. The final algorithm may produce a custom configuration structure that is linked specifically to the control block. Only the needed control blocks are configured and necessary details of the files sections are created in packed structures.

An example configuration file may include the following.

```
07 AnalogInputLinearizatioConfigurationStore
CountsIn CountsOut
0 0 0
1 968 6594
2 1546 9786
08 AnalogInputConfigurationStore
rawUnits aiType linearizationIndex
0 2 8 255
1 18 21 255
3 19 22 0
5 20 23 255
6 2 8 255
7 2 8 255
13 UnitConfigurationStore
low high lowLim upperLimit
3 0 1 -163.84 163.83
4 0 1 -3.4E+38 3.4E+38
5 0 100 -273.17 327.66
6 32 212 -459.67 3.4E+38
14 ScalarDataTypeConfigurationStore
Scaling BaseType units
8 1 0 255
9 1 2 255
10 1 3 255
11 0.005 2 3
1
26 0 255 0
```

-continued

```
15 StructuredDataTypeFieldconfigrationStore
type numElem last
158 8 1 0
178 8 1 0
179 8 1 1
180 11 10
181 11 10
```

An example project file may include the following.

```
Device Name VAVModReheat3-102-h
Resource Useage
#Control Floats = 23
#Control Digitals = 14
#Control NonVolatiles = 16
#Flash Constants = 6
Bytes RAM pool Used = 194
Bytes Loop Static = 34
#Function Blocks = 20
#User NVIs = 14
#User NVOs = 10
Function Block Data
Type Name
OCC_ARB OCC_ARB3
Wrd Name PVID(hex) PVID(dec) Value
0 schedCurrentState 8201 33281 0
1 wmOverride 8202 33282 0
2 networkManOcc 0000 00000 0
3 occSensorState 0000 00000 0
4 effoccCurrentState 8205 33285 0
5 mauOverrideState 8200 33280 0
6 unused1 0000 00000 0
7 unused2 0000 00000 0
8 unused3 0000 00000 0
Byt Name Value
0 netLastInWins 0
1 occSensorOper 0
2 spare 0
Type Name
TEMP_SPCALC TEMP_SPCALC4
Wrd Name PVID(hex) PVID(dec) Value
0 effOccCurrentState 8201 33281 0
1 schedNextState 8203 33283 0
2 schedTuncos 8001 32769 0
3 setpoint 0000 00000 0
4 heatRampRate 0000 00000 0
5 coolRampRate 0000 00000 0
6 manOverridestate 8200 33280 0
7 effHeatSP 8003 32771 0
8 effCoolSP 8004 32772 0
Byt Name Value
0 0
1 0
2 spare 0
\
Type Name
SWITCH SWITCH70
Wrd Name PVID(hex) PVID(dec) Value
0 sensor 820C 33292 0
1 out0 0000 00000 0
2 out1 0000 00000 0
3 out2 0000 00000 0
4 out3 0000 0~000
5 out4 0000 00000 0
6 out5 0000 00000 0
7 out6 820D 33293 0
8 out7 0000 00000 0
Byt Name Value
0 offset 0
1 negout 0
2 spare 0
Type Name
SELECT SELECT71
Wrd Name PVID(hex) PVID(dec) Value
0x 8205 33285 0
1 inputDefault 810C 33036 0
2 input0 810C 33036 0
3 input1 8300 33536 0
4 input2 810C 33036 0
5 input3 810E 33038 0
6 input4 0000 00000 0
7 input5 0000 00000 0
```

-continued

```
8 output 8012 32786 0
Byt Name Value
0 offset 0
1 0
2 spare 0
Type Name
OVERIDE OVERIDE92
Wrd Name PVID(hex) PVID(dec) Value
0 priority1val 10000 00000 0
1 priority2val 8016 32790 0
2 priority3val 9001 36865 0
3 priority4val 0000 00000 0
4 priority5val 0000 00000 0
5 priority6val 0000 00000 0
6 cntrlInput 0000 00000 0
7 defaultValue 8304 33540 90
8 effOutput 8000 32768 0
Byt Name Value
0 0
1 0
2 spare 0
User NV Configuration Data
NV Name Field Name PVID(hex) PVID(dec) Value
nciSetpoints occupied_cool 8100 33024 76
nciSetpoints standby_cool 8101 33025 78
nciSetpoints unoccupied_cool 8102 33026 80
nciSetpoints occupied_heat 8103 33027 72
nciSetpoints standby_heat 8104 33028 70
nciSetpoiuts unoccupied_heat 8105 33029 60
nviFlowOverride state 820C 33292 0
nviFlowOverride percent 0 0 0
nviFlowOverride flow 800E 32782 0
nciKFactorCool Fieldl 8107 33031 1000
nciMeasMinflowC Fieldl 810A 33034 3.4028233+38
nciMeasMaxFlowC Fieldl 8109 33033 3.4028233+38
nciDuctAreaCool Fieldl 8108 33032 0.54
nciOccMinFtowCSP Fieldl 810C 33036 200
nciStbyMinFlowSP Fieldl 810E 33038 200
nciMaxFlowCoolSP Fieldl 810B 33035 800
nciReheatFlowSP Fieldl 810D 33037 400
nviAutoOffsetC Fieldl 820A 33290 0
nviClearOffsetC Fieldl 820B 33291 0
nciRef Fieldl 0 0 0
nciRef Field2 810F 33039 0
nviSpaceTemp Fieldl 8016 32790 0
uvoBoxFlowCool Fieldl 800D 32781 N/A
nvoVelSenPressC Fieldl 8009 32777 N/A
nvoEffectSetpt Fieldl 8005 32773 N/A
nvoEffectOccup Fieldl 8205 33285 N/A
nvoSpaceTemp Fieldl 8002 32770 N/A
nvoEffectFlowCSP Fieldl 800F 32783 N/A
nvoCmdCoolDmpPos Fieldl 8006 32774 N/A
nvoReheatPos Fieldl 8008 32776 N/A
nvoUnitStatus mode 8204 33284 N/A
nvoUnitStatus heat_output_prim 8008 32776 N/A
nvoUnitStatus heat_output_secon 810F 33039 N/A
nvoUnitStatus cool_output 8011 32785 N/A
nvoUnitStutus econ_output 810F 33039 N/A
nvoUnitStatus fan_output 810F 33039 N/A
nvoUnitStatus in_alarm 810F 33039 N/A
nvoPressOffsetC Field1 8106 33030 N/A
Control Constants
PVID(Hex) PVID(Dec) Value
8300 33536 0
8301 33537 3
8302 33538 2500
8303 33539 100
8304 33540 90
8305 33541 0
```

There appears to be a significant need for networked HVAC zone controllers to be programmable so that a control sequence can be customized to meet the particular requirements specified for certain commercial building operations. Along with changing the control logic, the network interface also needs to be changed in order to communicate the new point data that was created. One of the major "open" protocols for commercial building integration is LonTalk™ defined by the Echelon Corporation and supported by one or more microprocessors called "Neurons™", that have a built-in LonTalk™ protocol stack and an application engine that can be programmed in the "Neuron™ C", language. Currently, the standard method that is provided by Echelon to allow the network image to be changed is the creation of "changeable" network variables (NV's) which requires much overhead and therefore is limited as a strategy for low cost zone controllers. Echelon provides an application called "ShortStack™", which runs on a Neuron™ that allows it to act as a LonTalk™ protocol driver for a separate application microprocessor. Since the application capabilities of the Neuron™ are significantly less than other cheaper microprocessors, one may utilize a ShortStack™ on the Neuron™ as a separate slave communication processor and put the application in a separate microprocessor. Echelon provides a tool that creates an initialization file based on the desired network interface for the other microprocessor to set up the ShortStack™ for proper operation. This procedure is meant to be performed once at the creation of the ShortStack™ application.

The present system may provide users with a tool that will allow them to not only create custom application logic for the zone controller but also allow creation of new network variables (network image) to communicate desired information efficiently. This may be done by recreating a new custom short stack initialization file and sending it over LonTalk™ through the current ShortStack™ to the application processor. The initialization file section which allows for basic file sending, may remain the same while other parts that describe the application specific network variables are changed. The application processor may then do a reset of the Neuron™ and cause a re-initialization on the fly to bring up the Neuron™ with the new network interface from the downloaded file.

ShortStack™, Neuron™ and LonTalk™ may be regarded herein as trademarks of and refer to items by Echelon Corporation. Such items may used in one or more illustrative examples of the present system. The terms "short stack" or "stack", "neuron" or "processor", and "lon talk" or "protocol", which may be used in this description to indicate items or elements of the system, can refer to or include ShortStack™, Neuron™ and LonTalk™, respectively. However, short stack, neuron and lon talk items or elements noted herein may be substituted with equivalent other items or elements.

Figure 30:
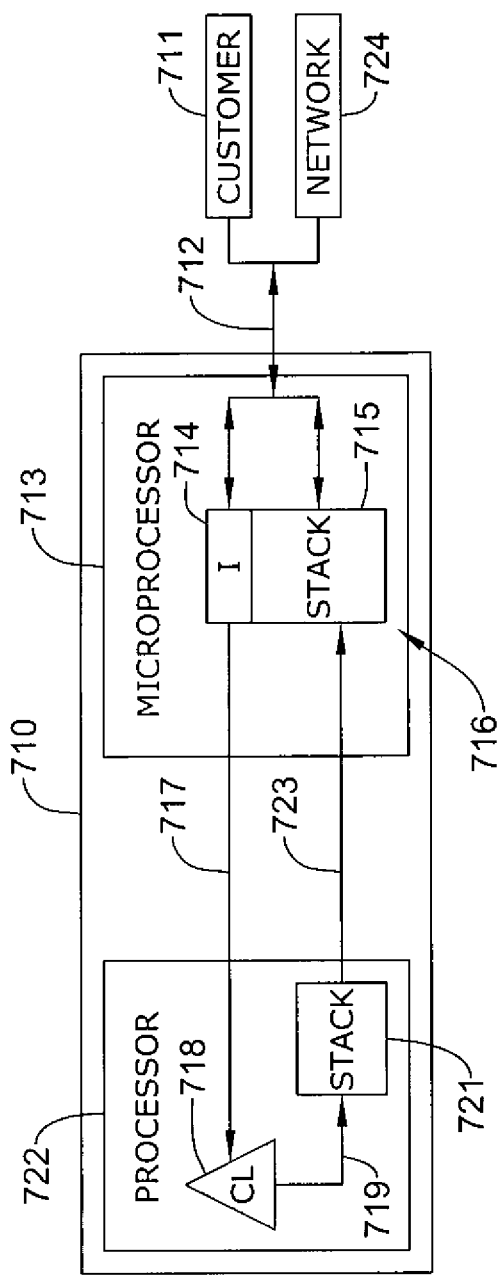
FIG. 30 is a diagram of a low-cost controller having a dynamically changeable network interface.

FIG. 30 illustrates an application of a system with an illustrative a system 710. System 710, for example, may be an HVAC zone controller; however, just the basic elements of the presentation are shown. System 710 could be some other kind of controller.

A customer 711 may send signals to a microprocessor 713 which contains an interface 714 (I) having network variables needed for communication by the customer 711 or network 724 with the system 710 via a line 712. These variables may be situated in a portion 714 of a short stack (stack, memory) 716. These variables are not intended to be changed. Also, signals may be sent to a portion 715 of the short stack 716 via line 712 by the customer 711 or network 724 to utilize network variables in the short stack 716. These network variables may be used in conjunction, for instance, with sensing certain parameters. The network variables may be entered into the short stack 716 at the time of design and fabrication of the system 710. The network variables are chosen by the designer of system 710. These network variables are meant to stay as they are in the device when the customer 711 uses it in the field. The present system 710 may circumvent that issue of non-changeability of the network variables in portion 715 of the short stack 716.

Signals from the customer 711 or network 724 may travel via the line 712, interface 714 and line 717 to a control logic (CL) module 718 of a microprocessor 722. However, signals from the customer and/or network may go directly to processor 722. Processor 722 may be a higher end processor than processor 713. The control logic module 718 may be connected to a short stack (stack, memory) 721 via a line 719. Signals to module 718, ultimately from the customer 711 or network 724, may provide a basis for developing a set of network variables different from the set of network variables in the short stack 716 portion 715. The different set of variables may be those later preferred by the customer 711 at that moment. The set of network variables initially in the short stack 716 portion 715 may be regarded as a first set, and the different set of network variables may be regarded as a second set for purposes of this description.

The second set of network variables may be impressed or flashed into the short stack 721 by module 718 via the line 719. Then this set of variables may be provided via line 723 to short stack portion 715 by reflashing the portion 715 memory with the second set to replace the first set of network variables. As noted herein, the original or first set of network variables may be chosen at about the time that the product was made. These variables may be regarded as initially selectable by a customer 711 if the latter was available at that time. However, when the stack 715 of this product is initially flashed with these network variables, the selection of variables is made to stay the same during and after the product is released into the field. It can be noted that the customer 711 might not always need all of the variables in the stack 715 when the device is in the field since the customer's needs may change from time to time. The customer may want variables that were not entered at the time of the product assembly and initialization of the stack 715 of short stack 716.

The system 710 may fulfill these desires and/or needs of the customer 711. It permits the customer 711 to change the set of network variables in the short stack 716, virtually at any time, even in the field. The network variables may be changed on the fly, that is, while the system 710 is operating. While a change of variables is being effected, that is, when the short stack portion 715 being reflashed or reinitialized by processor 722; there may be a temporary and very short suspension of normal communication and/or processing activity between system 710 and the customer 711 or network 724. This period of time may be so short in that it amounts merely to a glitch which is not necessarily disruptive of normal operation of system 710.

A change of network variables may be extensive involving many or all of the variables or it may be small perhaps involving only one variable, for example, effectively a replacing a temperature variable with a pressure variable. However, such a change may involve all of the variables being replaced, but with many of the same ones, due a complete reflashing of the short stack portion 715 with the contents of short stack 721.

Equivalent components may be implemented to replace ShortStacks™ 716 and 721, Neuron™ microprocessor 713 and the LonTalk™ protocol. In view of the inconvenience of a protocol development, the Echelon items along with their established protocol and compatible products may permit the present system controller 710 to provide convenience and advantages not known before. If there were actually an obviousness in implementing the system, it should have been implemented and became well known by others some time ago because of its superb advantages of providing a key to the flexibility of dynamically changing network variables on the fly by a customer in the field, and yet being an inexpensive approach and system.

Figure 31:
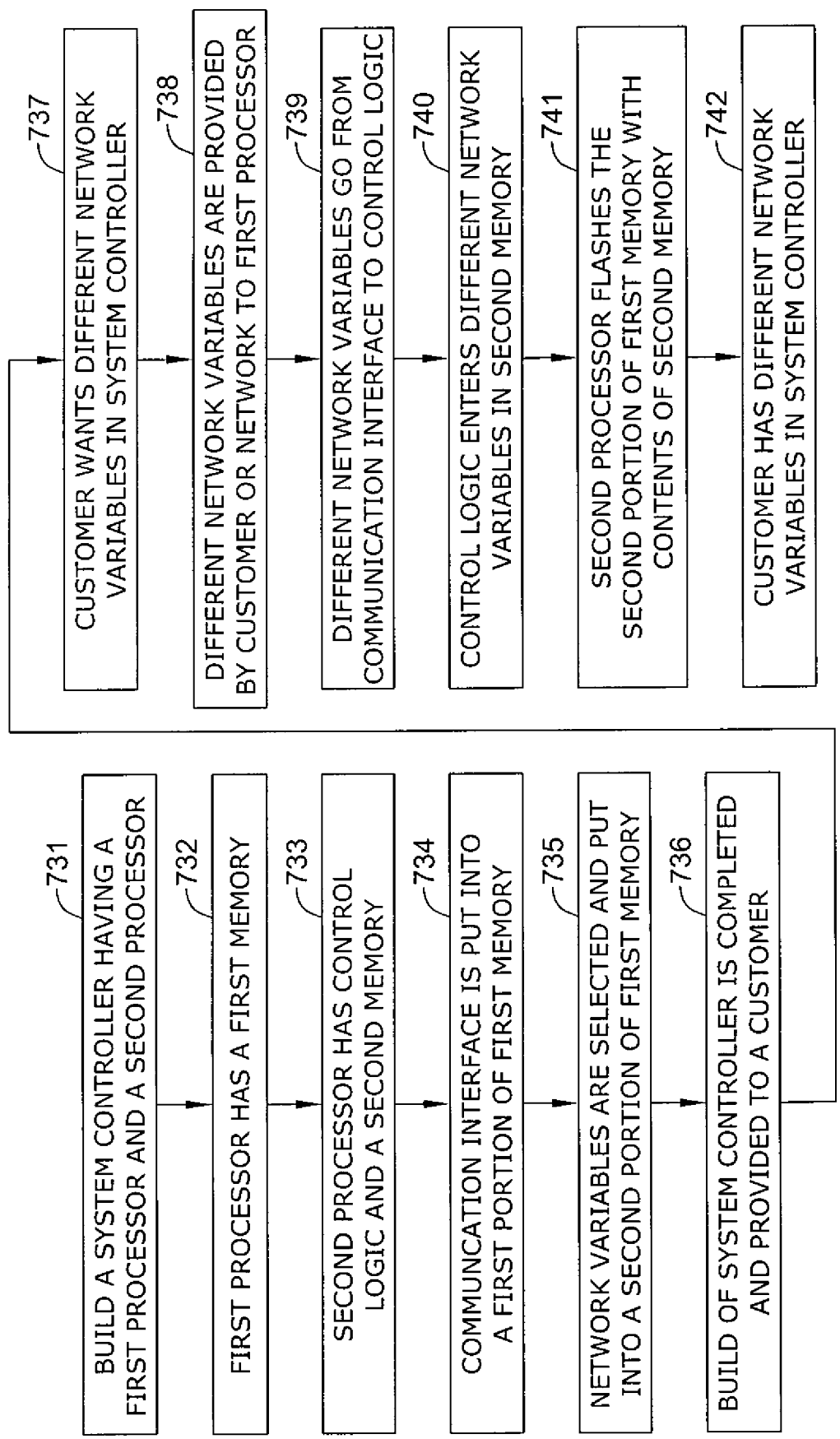
FIG. 31 is a sequence diagram of a dynamically changing of the network interface.

FIG. 31 is a diagram of a sequence of blocks showing an illustrative example of an approach for dynamically changing a network variable interface of the system controller 710. Block 731 is a building of the system controller 710 having a first processor 713 and a second processor 722. Block 732 indicates that the first processor 713 has a first memory 716. Block 733 indicates that the second processor 722 has control logic 718 and a second memory 721. Block 734 shows that a communication interface is put into a first portion 714 of the first memory 716. Block 735 indicates network variables being selected and put into a second portion 715 of the memory 716. Block 736 indicates a completion of building the system controller 710 and a providing of the controller 710 to a customer 711.

Block 737 indicates a situation where the customer 711 wants network variables different than those in the system controller 710 at the time of delivery to the customer. Normally with such controller, it would be sent back to the provider or manufacturer for reprogramming of the network variables interface. However, a block 738 shows the customer 711 or network 724 beginning the present approach realized by the system 710 by providing the different network variables to the first processor 713. Block 739 indicates the different network variables going from the communication interface of portion 714 of memory 716 to a control logic module 718 of the processor 722. Block 740 shows that the control logic 718 may appropriately enter the different network variables into the memory 721. Block 741 indicates that the processor 722 may flash the second portion 715 of memory 716 with the contents (i.e., different network variables) of the memory 721. Block 742 notes that the customer 711 then has different network variables in the system controller 710. The latter may be effected without the customer having to return the controller 710 to the manufacturer or provider.

The present system may implement the ShortStack file creation in a direct method from, for example, the HVAC control application to be graphically created and implemented that will allow testing and simulation of the complete design cycle in a control framework.

A framework of control blocks may be available on a menu to select and drag onto the page memory. The process of dragging may implement memory resources to perform control functions. By interconnection of these blocks, a control system of moderate complexity (in an implementation block) may be created and resources be monitored and allocated.

Dedicated logical functions may allow efficient use and integration with the n, graphical debugging, testing, and complete closed loop simulation with dedicated HVAC test model. The present system may reduce the time to market for control implementations and allow a high quality product to be created in short turn due to the advanced testing and simulation capability. A difference of the present system from the related art is that no other tool appears able to create the network file directly from a control test and simulate environment. These may depend on external tools and are not necessarily integrated with the control programmability.

There may be some design aspects of the Piranha programmable controller to note. It may have a 6 byte location code stored in memory may be used to identify the location of the node within a building. The controller may be pre-configured (configuration variables and binding) at the factory to a default configuration. The controller will not necessarily initiate explicit messages. Other controller may address network variables in this product using explicit messages.

The read/write memory file transfer mechanism may be used to store configuration parameters in one or more configuration files. Field installation may require a management node tool to configure the product and logically connect the network variables. The tool may save or be able to reconstruct from a data base the following information: the Neuron ID; network images (domain, address, and network variable table); the configuration files. During the manufacture of the node, the Neuron ID may be recorded on a label in bar code format and in alpha numeric so that an operator may manually enter the Neuron ID into the management tool with a wand or keyboard. Generally, it may be up to the user to use function blocks to handle illegal values on network variable inputs; and generally, it may be up to the management tool to insure the configuration downloaded to the Piranha Controller is valid.

All of the standard Lon Works Network Management features may be used by the device. Any network managers connected to the network should be capable of Lon Works Network management features. Echelon documentation may be checked for further details.

The following standard Lon Works firmware features will be used as network variable communications mechanisms. As to the input network variable (nvi), the control process may use the network variable directly and can accept a change in the network variable at any time in the control process cycle. This designation may be used for variables which can be changed "on-the-fly" without causing algorithm difficulties and without the need for a periodic update.

As to the output network variable (nvo), the network variable may be updated whenever one or more network variable fields are changed.

The control process may update the network variable whenever it has a new value, but the network variable is not necessarily sent to another node until it is requested by the other node.

Some new mechanisms (beyond what Echelon provides) may be required to provide the control nodes with a means to detect lost communications with other nodes. This may be important when a specific control variable is expected to be received via the network and the sending node is down. In this event, the receiving node may be expected to take an alternative action based on the loss of data. To cover this need, the following mechanisms may be implemented. If an input network variable with failure detect (FD) is not updated at least every certain number of seconds, then an error flag may be set, an alarm generated to indicate failure of an input network variable, the network variable set to an optional failed value, and the control process informed that the network variable input has failed. The control process may then decide on any action required.

An alarm may be generated only if the alarm was not sent previously, which is indicated by the error bit in nvoAlarmStatns being zero when the failure of the input variable was detected. A return to normal alarm may be generated when all of the input network variables with failure detect are normal and then the error bit in the nvoAlarmStatus may be cleared. Typically, these input network variables may be bound to output network variables having SGPU, The number of seconds that an input network variable may be updated can be fixed or variable as set by a configuration variable.

Whenever there is a significant change in one or more fields of an output network variable, the network variable may be updated. In addition, this output network variable may be updated at least every certain number of seconds (even if there is no change). When the data in an enumerated data type field changes, it may be always considered a significant change. When an "analog/counter" value changes more than a predetermined hysteresis amount, then the change may be considered significant. The hysteresis amount may be specified individually for each such variable. The number of seconds between each output network variable update may be specified individually for each network variable. The number of seconds for each output network variable may be may be coordinated with the updates of the corresponding input network variable with the failure detect of the receiving node to insure proper operation. Typically, the output network variables are bound to input network variables having a failure detect feature. The number of seconds may be fixed or variable according to a configuration variable.

The hardware interface between the Neuron and the Lon Works network may be described in Echelon's Engineering Bulletin, LonWorks Interoperability Guidelines.

As to a software interface, the Piranha controller will not necessarily be LonMark certified, and not necessarily follow a specific LonMark profile. The tool may be responsible for downloading the standard program identification (SPID).

The interface between the present node and other nodes via the LonWorks communications network may be noted. Certain aspects of the network variables table may have certain meanings. An object no. is the object number(s) (Functional Block) to which this network variable belongs. The reference to the text file may be for the macro in this document to create this for generating the NodeMon text file. This NodeMon text file may be a starting point as it would not contain any of the user defined variables.

An NV name is the name of the network variable. The network variable may also be the name found in the network variable self documentation. Due to space limitations in the LonS1Data file section, the names for fixed and user network variables may be stored in the NV configuration section. The mandatory network variable names are not necessarily stored since the tool should know these. The first few letters of the network variable may indicate the type of network variable. The letters may be upper or lower case. "nvi" may be a network variable input; "nvi" may be a network variable output; "nci" may be a configuration property network variable input saved in a non-volatile memory; and "nro" may be a network variable output stored in a non-volatile memory. "Nv no." may be the network variable index number for the network variable.

"Mech" may identify the mechanism used to communicate to/from the network variable. "Class" may be used to tell nodemon how to handle a parameter in that IN=input, OUT=output, CONST=constant (i.e., read only), CONFIG=configuration parameter (the tool may allocate non-volatile storage for these).

LonMark terms may include "Man" meaning a mandatory network variable for the associated profile, "Opt" meaning an optional network variable for the associated profile, and "None" meaning not required by the associated profile and may be a manufacturer defined variable.

"Service Type" may be the message service mechanism for outputs. Message services may include ackd, RR, unack and unack_rpt. "ackd" may mean acknowledged service. The host application would not necessarily take any action if an ackd is not received. The user should use unack service with a guaranteed periodic update (GPU). "RR" may mean request response service. "unack" may mean unacknowledged with no repeats. "unack_rpt" may mean unacknowledged repeated service.

Data type may list the data structure name. Standard network variable types may be listed by their SNVT name. Manufacturer specific structures may be listed by their structure names. NV Type may define the type of variable that it is according to the Piranha controller. "Mandatory" may mean that the variable is always present (mandatory) in the Piranha Controller. This NV may come from the factory with a code to handle the functionality of this NV. "Fixed" may mean that the Management Tool must always allocate this network variable for each instance of the controller. These network variables may be mapped to Public Variables and be part of the NV configuration files. The Management Tool may be responsible to map them to the correct Public variables. If it is a Public Variable, it is generally accessible to the Function Blocks. "Configurable" may mean that the user defines these variables. All network variables, including "Mandatory", "Fixed", and "Configurable", should be included in the Short Stack files downloaded to the controller. There are no configurable network variables shown because these may be added by the user through the Management Tool. "Self Doc Example may be an example self documentation applied to the network variable. The exact self documentation in the node may vary from this to account for arrays of network variables.

Piranha may be a programmable controller. The user may define network variable inputs and outputs. The tool may manage these network variables.

All network variable inputs may be initialized to Invalid on power up/reset. They may stay that way until a NV update is received.

Data type information may be noted. The fields may be defined for the big-endian (Motorola-style) Neuron processor. The data type, long, may be a two byte field with the most significant byte entered into the lower address in memory and the least significant byte entered at the higher memory address. The long data type may be either signed or unsigned. The data type, short may be a one byte field. The short data type may be either signed or unsigned. The data type char is a one byte field and may be either signed or unsigned. SNVT data types may be defined by Echelon in the "SNVT Master List and Programmers Guide". Generic data types may include UBIT, UBYTE, SBYTE, UNIT16, SINT16, UNIT32, SINT32 and FLOAT, with their respective value ranges.

Bit fields may be allocated left-to-right within a byte. The first bit field may be the most significant bit. The most significant bit may be numbered 7 and the least significant bit may be numbered 0. XIF files and DEF files number the bits differently. The most significant bit may be 0 and the least significant bit may be 7. Bit fields may be assigned from left to right on some machines and from right to left on others. In Neuron C, bit fields may be are allocated from left to right, i.e., from the high order bit to the low order bit.

The Endian format may refer to how multi-byte values are stored in memory of the microprocessor. The Big Endian format may store the most significant byte in the lowest memory address. The Little Endian format may store the most significant byte in the highest memory address. The Neuron may be based on a Motorola microprocessor. It may use the Big Endian. PCs may be based on the Intel microprocessor. They may use the Little Endian format for all multi-byte values including floats.

Definitions of product terms, acronyms and abbreviations may be noted. ASCII may be used in the present system. It is an American Standard Code of Information Interchange having a 7 hit code for representing the English alphabet, numbers, and special characters. "Binding" may be a process of logically connecting network variables in one node to network variable(s) in other node. Binding may be performed by a network management node that writes the binding information into the network image (located in the Neuron's EEPROM) of all of the Neuron's involved. A detailed description may be viewed in the Echelon references. A "channel" may be a physical transport medium for packets. A network may be composed of one or more channels. In order for packets to be transferred from one channel to another, a device called a router or repeater may used to connect the two channels. ECHELON is a trade name. EXCEL 10 is a family of Honeywell room and zone controllers based on Echelon communication technology.

Explicit Messages may be LonWorks messages addressed to other nodes using subnet/node, group, broadcast, or Neuron ID addressing. These messages may contain up to 228 bytes of data. LonWorks network may be a data network based on Neurons communicating with one another using the LonTalk™ protocol. General information about LonTalk protocol may include that it is a low level protocol which is Manchester encoded. Media access of it may be via an enhanced proprietary version of Carrier Sense Multiple Access (CSMA). All nodes may be peers on the bus. Routers and repeaters may be available to extend the network up to 32000 nodes. Using packets having one data byte and a 78 kilo baud rate, the media may be able to deliver up to 320 unacknowledged packets per second. For packets having 31 bytes of data (i.e., the longest network variable allowed), the packet rate may be 150 packets per second. Types of service available may include acknowledged, unacknowledged repeated, unacknowledged, and a request response. Addressing modes may include domain-subnet-node, domain-group, domain-broadcast, and domain-subnet-broadcast. The protocol may implements OSI levels 1 through 6. Excellent tools may be available to build application level programs. Further protocol details may be specified Echelon reference documents. A management node or tool may be a network management, engineering, or monitoring tool. An MIP (Microprocessor Interface Program) may include firmware for the Neuron chip that transforms the Neuron chip into a high performance communications processor for an attached host. Since Neuron C may have some restrictions, a naming convention may be adopted for an interface specification. The naming convention may include data types having prefixes appended before the name. These prefixes may include nvi, nvo, nci and nro.

A network management node may be a LonWorks node that is responsible for configuring the network, installation of nodes, binding of network variables between nodes, and general network diagnostics. Network variables may be a class of variables that allows them to be communicated over the LonWorks network to other nodes on the network. An output network variable in one node may be bound to corresponding input network variable(s) in other node(s). Changing the value of the output network variable in one node may cause the new value to be automatically communicated to the bound input network variable(s) in other node(s). When an input network variable is updated, an "nv update occurs" event may be posted at the receiving node(s) so that the application program can take action based on the change. Network variables may also be polled by a network management node that explicitly reads and/or writes the network variable. Network variables may contain one data field (one or two bytes) or contain multiple data fields (a structure). A neuron based node may have up to 62 network variables with up to 31 bytes each.

Neuron may be trade mark of ECHELON identifying a family of products. It may be a special purpose microprocessor chip that contains three processor units, an on chip RAM, an on chip EEPROM, a special purpose hardware input/output port, and a network interface port. The 3120 version model of the Neuron™ may contain an on chip RAM with firmware for communications and applications support software. The 3150 version of the Neuron may contain an interface to an external PROM, ROM or FLASH memory that contains the firmware and application software. The Neuron may programmed in Neuron C (an extended version of C) using a development station called NodeBuilder. Each Neuron connected on the network may be a node.

A Neuron ID may be a unique 48-bit identifier provided by each Neuron chip that is permanently written into the EEPROM during chip manufacture and is not be modified. A poll may be a process of reading or writing a network variable without being logically connected to the network variable by binding. The node doing the reading or writing may have access to the nodes network image in order to explicitly poll the network variable.

The router may be a device which connects multiple network segments and provides services up to the OSI Network Layer, sending messages transparently between networks. The ShortStack™ may enable any product that contains a microcontroller or microprocessor to quickly and inexpensively become a networked device. This may be an interface to use than Echelon's MIP, have a smaller host footprint, simpler host API, simpler driver, simpler hardware interface and improved tool support.

Some acronyms with their meanings in parentheses, may include API (Application Programmers Interface), CPU (Central Processing Unit), CRC (Cyclic Redundancy Check), CSMA (Carrier Sense Multiple Access), DLC (Demand Limit Control), EEPROM (Electrical Erasable Programmable Read Only Memory) EPROM (Erasable Programmable Read Only Memory), FD (Failure Detect), FTP (File Transfer Protocol), FTT (Free Topology Transceiver (Echelon)), GPU (Guaranteed Periodic Update), HVAC (Heating Ventilating and Air Conditioning), I/F (Interface) LED (Light Emitting Diode), LNS (LonWorks Network Services-Echelon terminology), MUX (Multiplexer), NV (Network Variable), PC (Personal Computer), PID (Proportional-integral-derivative control), PROM (Programmable Read Only Memory), PRS (Product Requirement Specification), PWM (Pulse Width Modulation), RAM (Random Access Memory), ROM (Read Only Memory), scaled integer (the number of bits that follow the imaginary binary point in fixed point variables), SCPT (Standard Configuration Property Type (Echelon terminology)), SDS (Software Design Specification), SFPT (Standard Functional Profile Type (Echelon terminology)), SGPU (Significant Change, Guaranteed Periodic Update), SGPUC (Significant Event Notification and Guaranteed Periodic Update with change field), SIS (Software Interface Specification), SNVT (Standard Network Variable Type (Echelon terminology)), SRS (Software Requirement Specification), and tuncos (Time until next change of state), UCPT (User (defined) Configuration Property Type (Echelon terminology)); UFPT (User (defined) Functional Profile Type (Echelon terminology)), UNVT (User (defined) Network Variable Type (Echelon terminology)), XL10 (Excel 10), and ZEB (Zero Energy Band).

A Variable Definition table may specify variables exposed over the LonWorks network. Some variables may be network variables and some variables may be variables within a file. Variables with a prefix "nvi" or "nvo" may generally be network variables, while variables with an "nci" may generally be network variables stored in a non-volatile RAM. The information in the Variable Definition table maybe entered into the data base of a PC based tool that displays and modifies network variables during node testing. The tool may display the NVName, NVField, Units, and present value using the DataType, Byteoffset, Bitoffset, Length, Scale2, Scale10 and ScaleOffset. The units given in the table may the units after scaling factors are applied.

A NodeMon Text File Generation Macro may be create a file for generating the NodeMon text file. The NodeMon text file may be a starting point as it will not contain any of the user defined network variables. To generate the NodeMon text file, one may go to Tools/Macro/Macros and run the ASave-PIRNM macro. Then three text files may be copied to a directory that contains the other NodeMon files needed for the product (ALL1DNV.TXT, ALL1IDE.TXT, ALL1DF.TXT and prrp.csv). The NodeMon may be started. One may go to the Tools/Make Node File, select the pirp.csv file, and press okay. The pirp.csv file may have a destination of c:\NodeMon\NodeLib for the NodeMon text file. If this is not the correct place, then one may move the PIR1.TXT file to the NodeLib directory of NodeMon. In NodeMon, one may select Tools/Make Node Library, select the PIR1.TXT file and any others desired, and press Okay.

The variables may be defined in tables. The meaning of the table headings and the information in the columns may be noted in the following. The VariableDescripfion&Notes column may give a brief description of the network variable. It may be note, this column may not have any semi-colons or carriage returns. The NvName column may indicate the network variable name as specified in the controller. The NvField column may indicated the name of the network variable field that as specified in the controller. The NvField names may be unique. Each NvField can occur once per node type. The LowLimit column may indicated the minimum allowed value of the field in engineering units. It is not necessarily a scaled value. If the network variable is an input, then the sender has the responsibility of range checking to ensure that the field value is not less than the LowLimit. If the network variable is an output, this node may ensure that the field value is not less than the LowLimit. If the field is an enumerated type, then only valid enumerated values for this field may be permitted. The sender node may have the responsibility of sending only valid enumerated values. If both a HighLimit and LowLimit are zero, then the limit may be the range of the data type specified. HighLimit may be the maximum allowed value of the field in engineering units and is not necessarily a scaled value. If the network variable is an input, the sender may have the responsibility of range checking to ensure that the field value is not greater than the HighLimit. If the network variable is an output, this node may ensure that the field value is not greater than the HighLimit. If the field is an enumerated type, then only valid enumerated values for this field may be permitted. The sender node may have the responsibility of sending only valid enumerated values. If both HighLimit and LowLimlt are zero, then the limit may be the range of the data type specified. With respect to units, the engineering units of the field may be displayed by an operator interface.

Some of the data types may include SIGNED (Signed Analog Value), UN (Unsigned Analog Value), FLOAT (Floating point), ASCII (Text), HEX (Hexadecimal Value), BIT (Bit Field), &other (Enumerated value based on bit fields), and other (Enumerated value based on a byte). It may be noted that "other" may be any word combination referring to enumerated type name. For example, if the Data Type is "ENUM_ TYPE", then the data may be an enumerated type whose values are listed under Enum Type ENUM_TYPE.

Several parameters may be noted. ByteOffset is a parameter that may locate the beginning of the field in the variable and specify the first byte of the field number. The first data byte sent or received in a variable may be the number "0". The second byte may be byte "1", and so on. For example, if ByteOffset is 10, then the first byte of the field is the eleventh byte sent or received.

As to Bitoffset, when the Data Type is "BIT" or "&other", then this parameter may locate the first bit in a bit field. The least significant bit of the field may be where 0 is the least significant bit of the byte. Bit fields should not go over a byte boundary.

Length may be the length of the field. If the Data Type is SIGNED, UN, ASCII, HEX, FLOAT, or "other", then the length may be the number of bytes in the field. If the Data Type is BIT or "&other", then the length may be the number of bits in the field (1 through 7 bits). Bit fields should not go over a byte boundary. An operator interface may always use a length of one for an "other" data type regardless of the value of Length. An operator interface may always uses a length of four for a FLOAT data type regardless of Length.

Scale2, Scale10, ScaleOffset parameters, when the Data Type is SIGNED, UN, or FLOAT, may be used to convert the scaled field value to an engineering units value. The analog value in engineering units for SIGNED or UN may be "Engineering_Units_Value=FieldValue*(2^-Scale2)* (Scale10)+ScaleOffset. The analog value in engineering units for FLOAT may be Engineering_Units_Value=FieldValue* (Scale10)+ScaleOffset. It may be noted that upon power up, a node reset, or a return from offline to online, the network variable outputs may generally read all zeros until the Piranha controller can initialize the network variables.

Some of the major network files may be noted. There may be a template file which is a configuration template file. It may be a read only file. This file may tell the PC the sizes and offsets of each SCPT section of the configuration file. Another network file may be a Config File which is a configuration value file. It may be a read/write file. This file may be the configuration file for the Piranha controller. It may be broken up into numerous sections. Writing to this file may cause the Piranha controller to reset after file completion. A third network file may be a Param file which is a parameter value file. It may be a read/write file. This file may be the parameter file. This file may be written "on the fly" without causing a rest of the controller. A fourth file may be a Proxy file which is a proxy value file. It may be a read/write file. The proxy file may hold file images destined for wall module bus devices. This file may be written to "on the fly" without causing a reset of the controller.

Definitions of the template file column names may be noted. "SCPT SECT#" may be a SCPT section number. "HEADER" may indicate a "0" which applies to the entire code, "1" applies to an object, and "2" applies to network variables. "SELECT" may specify what of the record applies in that "," means that it applies to the whole code, "x" means that the NVIndex applies to a single NV, "x-y" means that first-last indices apply to a range of NVs, and "x.y.z applies to a collection of objects. "FLAG" is a 2 digit hexadecimal number encoded in ASCII. "CONFIGURATION INDEX" may contain either the SCPT or UCPT index. Length may be the length of SCPT/UCPT in decimal bytes. "DIMENSION" may be the dimension of SCPT/UCPT in decimal bytes. "RANG MOD" may be the range modification lower and upper limits. None of the SCPT sections necessarily support this. "SIZE IN BYTES" may be length multiplied by the dimension. "DECIMAL OFFSET" may be the offset from the start of the SCPT beginning in decimal bytes. "HEX OFFSET" may be the offset from the start of the SCPT beginning in hexadecimal bytes.

Section number may be a Honeywell method of communicating information. The section number is not necessarily transmitted to the device since the device may work on offset. The structure column of a table may indicate the structure name used in the source code for an element of the file section. The structure name may be located in the source code (.h file) for further detail on the layout of information within the file section element. The files may include a two byte CRC and a two byte length, sent msbyte first, followed by the file data. The length may represents the length of the data, and is not included in the CRC. If the file is allowed to have fewer actual elements than the maximum, the length should still be a multiple of the structure size.

Items of the configuration file table may be noted, according to headings of SCPT Sect#, SCPT section name and structure, respectively, as: 1, Nv Configuration, and NvConfigurationDescriptor; 2, Nv Per Field Configuration, and NvConfigurationDescriptor; 3, Control Loop, and ControlLoop; 4, Control constants, and float; 5, ShortStack LonSiData, and UBYTE; 6, ShortStack LonAppinitData, and UBYTE; 7, AI Linearization Configuration, and AnalogInputLinearizationConfiguration; 8, AI Configuration, and AnalogInputConfiguration; 9, DI Configuration, and DigitalInputConfiguration; 10, AO Configuration, and AnalogOutputConfiguration; 11, DO Configuration, and DigitalOutputConfiguration; 12, Floating Motor Config, and FloatingMotorConfig; 13, Unit Configuration, and UnitConfiguration; 14, Scalar Data Type Configuration, and ScalarDataTypeConfiguration; 15, Structured Data Type Configuration, and FieldDescriptor; 20, Scheduler Configuration, and PublicVariableID(UINT16); 23, Wall Module Configuration, and WMParam; 26, Number Of Control Variables Configuration, and UBYTE; 30, Public Variable Group Table, and UBYTE; and 31, Public Variable Send Table, and PublicVariableSendTableConfigurationdescriptor. Other information of the configuration file table may be noted according to the headings of Hdr, Select, Flag, Config Index, Length in Bytes (incl CRC and length), Dim, Range Mod, Max # elements, Actual elements be less than max?, Struct Size, Decimal Offset, and Hex Offset.

Items of the parameter file table may be noted, according to headings of SCPT Sect#, SCPT section name and structure, respectively, as: 16, Control Nonvolatile, and float; 17, Analog Input Offset, and float; 24, Analog Input Mode, and UBYTE; 25, Analog Output Mode, and UBYTE; 18, ApplVerNew, and UBYTE; 19, Daylight Savings Specification; and DaylightSpec; 21, Schedule, and ScheduleEvent; 22, Holiday, and HolidaySchedule; 27, Heartbeat, and UINT16; 28, DeviceName, and UBYTE; and 29, AlarmDisable, and UNVT_error. Other information of the parameter file table may be noted according to the headings of Hdr, Select, Flag, Config Index, Length in Bytes (incl CRC and length), Dim, Range Mod, Max # elements, Actual elements be less than max?, Struct Size, Decimal Offset, and Hex Offset. There is not necessarily a SCPT template for this file.

The available pool for a given version of the firmware may be published in nvoConfigError.txt, which is part of the release package. Tools may be responsible for guaranteeing that the available pool is not exceeded. The amount of pool storage required for a given application may be determined by the following: 1 byte per NV configured as FDEnable, if the total is odd, add 1 byte; 1 byte per NV configured as GPUEnable, if the total is odd, add 1 byte; N bytes per NV configured as toSnapshot, where N is the size of the NV, in network format (no padding), if the total is odd, add 1 byte; 3 bytes times the howManyToOne specification for each NV, if the total is odd, add 1 byte; 6 bytes for each floating motor output configured for use (travelTime!=0); 4 bytes for each digital output configured for slowPWM behavior; the amount of loop static required by each function block, if the loop static required for any block is odd, add 1 byte; 4 times the number of control floats; and 1 times the number of control digitals, if the total is odd, add 1 byte.

An item of the proxy file table may be noted, according to headings of SCPT Sect#, SCPT section name and structure, respectively, as 32, Proxy File, and UBYTE. Other information of the proxy file table may be noted according to the headings of Hdr, Select, Flag, Config Index, Length in Bytes (incl CRC and length), Dim, Range Mod, Max # elements, Actual elements be less than max?, Struct Size, Decimal Offset, and Hex Offset.

The proxy file may be defined as a byte array for the purposes of the LON interface, but actually it may have an internal structure consisting of a variable length header and a variable length descriptor for each proxy file. The header may be a CRC and length, in BIG endian format, followed by an array of ProxyFileDescriptor structures, each of which is 2 bytes long and defines the desired polling frequency (1st byte 1snibble), destination address (1st byte 1snibble), and fileID (2nd byte) for the proxy file section. The CRC and length may be positioned as if they would represent the entire file, but actually represent only the header. Following the header may be a variable length ProxyFileData structure for each proxy file section, in the same order that they were defined in the proxy file header. Each ProxyFileData structure may have a CRC and length, both in LITTLE endian format and file data as a byte array. The file data format may be defined by the wall module bus device and should appear exactly as it should be transferred to the bus device. The source code wmconfig.h file may be noted for further details on the ProxyFileDescriptor and ProxyFileData structures.

An illustrative example involving the present system may exist in Visual Studio VB and C code algorithms. The device interface data for a Piranha configuration tool prototype may be generated by the FishSim tool.

In a NodeBuilder developer environment, the device interface data can be automatically generated by the ShortStack Wizard. In the Piranha configuration tool environment, the configuration tool must create its own Short Stack initialization files. The FishSim tool may provide field programming capability for a Piranha controller. After generating a control application, the FishSim tool may create custom device interface data that declares the network variable inputs and outputs specified for the application.

Relative to a ShortStack Wizard, a developer may create or modify device interface data used to initialize a ShortStack Micro Server. The device interface data for the Piranha configuration tool prototype may be generated by the FishSim tool. In the NodeBuilder developer environment, the device interface data may be automatically generated by the Short-Stack Wizard. In the Piranha configuration tool environment, the configuration tool must create its own ShortStack initialization files. The FishSim tool may provide field programming capability for a Piranha controller. After generating a control application, the FishSim tool may create custom device interface data that declares the network variable inputs and outputs specified for the application.

When one runs the Piranha configuration tool, the tool may generate device interface data that is contained in two separate file sections called "ShortStack LonSiData" and "ShortStack LonAppinitData". In the NodeBuilder developer environment, the ShortStack wizard may create LonAppinit Data[ ] and LonSiData[ ] arrays contained in the LonDev.c file. The LonAppinitData[ ] array may contain the Short Stack initialization data. The LonSiData[ ] array may contain the self-identification and self-documentation data for the application.

A sample ShortStack wizard file may be created from a simple NodeBuilder project.

In the following, an example project with 6 NVs was created. The ShortStack Wizard was run on the project to create the binary initialization files used to initialize a ShortStack Micro Server.

A device application may be divided into one or more functional blocks. In the example NodeBuilder project, let one create a device with four Functional block objects:

Object 0-Nodeobject uses SFPTnodeObject (0)
Object 1-Switch uses SFPTopenLoopSensor (1)
Object 2-Temperature uses SFPTopenLoopSensor (1)
Object 3-LED uses SPPTopenLoopActnatnr (3)

A standard profile number may be used in the range 1-19999 or greater than 25001. Manufacturers are free to assign any functional profile number to new non-inheriting profiles in the range of 20000 to 25000 inclusive as long as the number is unique for the program ID template and scope of resource file set containing the functional profile. The following objects have already been defined in the LCBSSysArch-0005.doc "Device Class & Device Type (Model Number) and Object Types for EBus Devices" document. For example, the object type numbers 20000, 20010, 20020, 20030, 20040, 20050, 20060 and 20070, may have respective descriptions TOD scheduler object, control loop object, start stop loop object, logic loop object, boiler control object, start stop loop object, flex therm loop object and Piranha controller. As noted, 20070 may be assigned for the Piranha Programmable Object number. This approach may be subject to change by the Global Architecture team.

The example NodeBuilder project may contain the following NVs:

nviNodeRequest - uses SNVT_obj_request (92)
nvoNodeStatus - uses SNVT_obj_status (93)
nvoFiledirectory - uses SNVT_address (114)
nvoValue -uses SNVT_switch (95)
nvoTemp -uses SNVT_temp_p (105)
nvivalue - uses SNVT_switch (95)

In addition, the self doc string from the resource files used in the NodeBuilderproject may contain the following self doc strings:

nviNodeRequest - object 0 - @0|1
nvoNodeStatus - object 0 - @0|2
nvoFiledirectory - object 0 - @0|8
nvoValue - object 1 - @1|1
nvoTemp - object 2 - @2|1
nviValue - object 3 - @3|1

One may see LonMark Interoperability Guidelines 3.4 (www dot lonmark dot org) for more information. NVs that use SNVTs can start at |1 and user defined NV's may start at #101. For example, if an 8010 VAV LonMark Functional Profile is used as object 1, then @1|1 is nviSpaceTemp, @1|5 will be nviApplicMode and @1|19 may be nvoTerminalLoad. nciSetpoint may be &1,1,0\x80,60. nviTodEvent would be @1#107, and nvoData would be @1#119. uciDeviceName will be &1,0,6x80,1.

Piranha object may have an object ID 0 for the Node Object and an object ID 20070 for the Piranha Object, with all the NVs stating at #101 for the Piranha Object.

Configuration Property self documentation may use the following:

```
&header, select, flag, index, dim, rangeMod[,?]; selfDocText.
For nciDeviceName &1, 0, 6\x80, 1
Header = 1 - always use 1 for a configuration property applies
to functional blocks.
Select = 0 - this may refer to function block #0 (the node
object).
Flag = 6\x80 - this two byte value has two parts. Byte 1 (6)
refers to specific SPID and single device type. The second byte
(\x80) refers to No restrictions used for when a tool can change
this config property. Other choices that are not recommended
are \x82 (changes offline only) and \x90 (manufacturing only).
Index = 1 - this may refer to the configuration property index.
```

Since Device name is a UCPT (custom defined), this may refer to UCPT 1 for this node.

Here is another example:

```
For nciSndHrtBt &1, 1, 0\x80, 49
Header = 1 - always use 1 for configuration property applies to
functional blocks
Select = 1 - this refers to function block #1 (the piranha
object 20070)
Flag = 0\x80 - this two byte value has two parts. Byte 1 (0)
refers to standard resource file set so the index will refer to
a SCPT number.
Index = 1 - this refers to the Standard configuration property
index. Since Device name is SCPT (std config prop.), this
refers to SCPT 49 = SCPTmaxSendTime (equivalent to SNVT_time_sec
for an NV).
```

In addition, the following information about the NVs is known. nviNodeRequest—not a synchronous NV, is not polled, device not taken offline before update, service type may not be modified by a network management message, priority configuration may be modified by a network mgmt message, authentication may be modified by a network management message, configuration class (EE) is false (does not store value in EE), the SNVT number for SNVT_obj_request is 92. Not a priority NV, NV direction is input, nv_service (used only for NV outputs) is not used and authentication is not used. One should only use name and use self documentation extension records present.

nvoNodeStatus—is a synchronous NV, is not polled, device not taken offline before update, service type may not be modified by a network management message, priority configuration may be modified by a network management message, authentication may be modified by a network management message, configuration class (EE) is false (does not store value in EE), the SNVT number for SNVT_obj_status is 93.

Not a priority NV, NV direction is output, nv_service (used only for NV outputs) is acknowledged and authentication is not used. Only use name and use self documentation extension records present.

nvoFiledirectory—not a synchronous NV, is polled, device not taken offline before update, service type may not be modified by a network management message, priority configuration may be modified by a network management message, authentication may be modified by a network management message, configuration class (EE) is false (does not store value in EE), the SNVT number for SNVT_address (114).

Not a priority NV, NV direction is output, nv_service (used only for NV outputs) is acknowledged and authentication is not used. Only use name and use self documentation extension records present.

nvoValue—not a synchronous NV, is not polled, device not taken offline before update, service type may not be modified by a network management message, priority configuration may be modified by a network management message, authentication may be modified by a network management message, configuration class (EE) is false (does not store value in EE), the SNVT number for SNVT_switch (95).

Not a priority NV, NV direction is output, nv_service (used only for NV outputs) is acknowledged and authentication is not used. Only use name and use self documentation extension records present.

nvoTemp—not a synchronous NV, is not polled, device not taken offline before update, service type may not be modified by a network management message, priority configuration may be modified by a network management message, authentication may be modified by a network management message, configuration class (EE) is false (does not store value in EE), the SNVT number for SNVT_temp_p (105).

Not a priority NV, NV direction is output, nv_service (used only for NV outputs) is acknowledged and authentication is not used. Only use name and use self documentation extension records present.

nviValue—not a synchronous NV, is not polled, device not taken offline before update, service type may not be modified by a network management message, priority configuration may be modified by a network management message, authentication may be modified by a network management message, configuration class (EE) is false (does not store value in EE), the SNVT number for SNVT_switch (95).

Not a priority NV, NV direction is input, nv_service (used only for NV outputs) is acknowledged and authentication is not used. Only use name and use self documentation extension records present. If a non-standard NV or UNVT is used, then the SNVT# is 0.

A table for NV's is shown in FIG. 32. The tool should allow the user to select NVs for Polled, Direction, Service such as acknowledged, repeated, or unacknowledged (only for output NVs). It is proposed that the nv_service_type_config, nv_priority_config, and nv_auth_config always be set to 0. This is due to the fact that it is not desired to have network messages change the service type, priority or authentication. nv_config_class should not be 1 since ShortStack should not use EE in the neuron chip. The tool should not allow users to select priority type since it should always be 0.

A maximum of 62 NVs total may be allowed.

To assist in the use of configuration of NVs, the tool software designer should be familiar with the selections available in the resource file editor for using and modifying functional blocks, NVs, and configuration properties for standard LonMark profiles such as SCC and VAV. The resource file also allows selection of polled, Service, and other settings.

The tool software designer will need to use NodeBuilder, LonMaker, the Code Wizard in NodeBuilder, the resource file editor, and the ShortStack Wizard operation to test their ShortStack files configuration files.

The final Piranha configuration tool will need to generate XIF and resource files as a way to test interoperability for LonMaker LNS environments for third party applications.

Self-identification Data (LonSiData[ ]) Example Generation of this file may be noted. The maximum size of LonSI-Data is limited to 1000 bytes for a ShortStack micro server running on a 4K 3120 chip. To allow the maximum number of network variables to be configured, the Tool should eliminate all network variable names from the self identification data. That is, set the name to null. A separate section may be allocated to store the NV names.

If any change is made to the LonSiData or LonAppInitData sections, the host may calculate a new signature word. If the signature is different than before, the Neuron may set the NV table to the default values. This means the bindings need to be downloaded.

```
// si_data_struct self-identification data.
typedef struct
{
Si1 snvt_struct snvtHeader; // Offset 0x00 - 0x04 Use version 0
format
Si2 snvt_desc_struct snvtDescriptorTable //Offset 0x05
Si3 char devSDstring[DEV_SD_LEN]; // Null-term text string
contain selfdoc
Si4 ext_rec_struct extRecords[EXT_REC_COUNT]; //external record
Si5 alias_field aliasInfo; // Used for binding and status
information
} si_data_struct;
si_data_struct siData;
Use Big-Endian format
Si1 is 5 bytes
Bytes 0 & 1 are length (00 61) = 97 bytes total, byte 2 is
number of NVs (06) = 6 NVs, byte 3 is version (00) = version 0,
byte 4 is mtag_count (00) = 0 for version 0. So one may have 00
61 06 00 00 for the first part of LonSiData.
Si2 is the snvtDescriptorTable. This is a variable length
depending on the number of NVs. Each NV may have 1 byte for the
NV configuration information and 1 byte for the snvt_type_index.
        Here are the fields in general declaration form;
// table of SNVT descriptors
be modified),
NVs can be polled))
// ext_rec, (1 means there is more self doc. One may have this
for all NVs)
// nv_sync (always zero - FPC has no synchronous variables),
// nv_polled, (See SIS for individual settings -
// nv_offline, (must take offline before changing)
// nv_service_type_config (always 0-doesn't allow service type
be modified)
// nv_priority_config (always 0-doesn't allow priority be
changed)
// nv_auth_config (always 0-doesn't allow authen to be changed)
// nv_config_class (stored in EEPROM=1),
// snvt_type_index
//
{
{ 1, 0, 0, 0, 0, 0, 0, 1, 0x5c), // nviNodeRequest
```

Although this example allows the service type, priority, and authorization to be changed by network messages, in general these items will all be 0 or not allowed. See individual examples in the SIS for Sync and polled settings. NV offline will be 0 for Piranha NVs.

From the table above that gives:

```
nv1: 8e 5c
nv2: ce 5d
nv3: ae 72
nv4: 8e 5f
nv5: 8e 69
nv6: 8e 5f
```

Si3 is the device self doc string. From the information above for the objects one may get &3.4@

```
0NodeObject,
1Switch,
1Temperature,
3LED<null>
```

Si4 is the external record structure which is defined for each NV. Each NV has a single byte giving mre,re,nm,sd, and nc info and then the info separated by nulls. Because only sd is specified, that means only the self doc is included so here are the bytes:

```
10 40 30 7c 31 00 (self doc info only = 10) @0|1<null>
10 40 30 7c 32 00 (self doc info only = 10) @0|2<null>
10 40 30 7c 38 00 (self doc info only = 10) @0|8<null>
10 40 31 7c 31 00 (self doc info only = 10) @1|1<null>
10 40 32 7c 31 00 (self doc info only = 10) @2|1<null>
10 40 33 7c 31 00 (self doc info only = 10) @3|1<null>
```

If the name bit and self doc were both set then 10 would be 30 and then for example the first entry would be 30 6e 76 69 52 65 71 75 65 73 74 00 40 30 7c 31 00 (name+self doc=30) nviRequest<null>@0|1<null>.

Here is an example of the first byte 30:

```
// nm = 1 means the extension record contains the name of the
NV.
// sd = 1 means the extension record contains the self
documentation string of the NV.
// nc = 1 means the extension record contains a 16 bit count of
the number of NVs of this type.
// The fields follow in the order of the bits in the mask
defined here
//
// mre // max rate estimate (MSB) ext record present
// re // rate estimate ext record present
// nm // variable ext name present
// sd // self-documentation ext string present
// nc // array count ext record present
// unused ILSBS)
// { 0, 0, 1, 1, 0, 0, 0, 0 } = 0x30
```

Si5 gives one byte for binding and status info—(48)

In the example herein, the following LonSiData[ ] may be generated.

```
00 61 06 00 00 8e 5c ce 5d ae
72 8e 5f 8e 69 8e 5f 26 33 2e
33 40 30 r3 6f 64 65 4f 62 6a
65 63 74 2c 31 53 77 69 74 63
68 2c 31 54 65 6d 70 65 72 61
74 75 72 65 2c 33 4c 45 44 00
10 40 30 73 31 00 10 40 30 7c
32 00 10 40 30 7c 38 00 10 40
31 7c 31 00 10 40 32 7c 31 00
10 40 33 7c 31 00 48
```

ShortStack Initialization Data (LonAppInitData[ ]) Example Generation may be noted with the generation of the LonAppInitData file. If any change is made to the LonSiData or LonAppInitData sections, the host may calculate a new signature word. If the signature is different than before, the Neuron will set the NV table to the default values. This means the bindings must be downloaded.

```
// app__init__struct.
typedef struct {
In1 Byte hdr__len; // Length of payload
In2 Byte hdr__cmd; // Network interface command
In3 Word signature; // May be any value, but must be changed.
// if any part of LonAppInit or siData is changed.
// Start of the payload
In4 Byte id__string[8]; // Program ID (One can note that the
payload may include the signature word)
In5 comm__param__struct comm__para; // Communication parameters
In6 app__init__misc__field misc; // Miscellaneous field
In7 Byte NV__count; // Network variable count
In8 Byte NV__init[NV__COUNT]; // NV initialization data, one byte
for each NV
} app__init__struct;
// LonAppInit ShortStack server initialization data.
```

One may use Big-Endian format.

Note In1, In2, In3 are not part of the file sent to the Piranha controller. The Piranha host µP may create these fields and download to the Neuron.

In1 is one byte for the length of the payload which is total length minus 2. Payload in this example is (22)=34 bytes. The total length is 36 bytes.

In2 is one byte for the network interface command which is (08).

In3 is two bytes for the signature which can be any value, but must change if any part of LonAppInit or siData is changed. (FA B3). The current proposal is as follows: the first 4 bytes of the LonAppinitData are length (1 byte), command (1 byte), and signature (2 bytes). The controller would lay out the entire structure in memory, but use only the data following the signature as the file section. Based on the file section data, the Piranha controller would then manufacture the length and signature and the (canned) command. The tool would not need to calculate the signature. The tool would see the file section get smaller by 4 bytes from what it has been. Therefore for Piranha controllers, the tool will download and read back only the payload section which is the LonAppInit file minus the first 4 bytes.

In4 is 8 bytes for the program ID string for the node. In this example, a program ID of 45 58 41 4D 50 4C 45 31 may be used.

as an another example, in the VAV2 controller the program ID may be 80 00 0c 50 1a 03 04 03.

The Piranha controller will not be LonMark certified. It will not follow a specific LonMark profile. The tool is responsible to download the SPID. See SPID herein. The SPID for Piranha may be 90 00 0c 52 00 03 04 38.

The Model numbers and Device classes that have already been assigned are listed in the LCBSSysArch-0005.doc "Device Class & Device Type (Model Number) and Object Types for E-Bus Devices" document.

In5 is 16 bytes for the comm. Parameter structures. Examination of ShortStack wizard examples has led to the values of 25 2e 08 05 0c 0e 0f 00 04 00 00 00 00 00 00 00 as appropriate for the Piranha controller. (The last 7 bytes of this structure are the xcvr_params).

In6 is 1 byte for the miscellaneous field. This sets the explicit address enable and also the service pin notification interval. Careful examination of this value has led to the conclusion that (2A) is an excellent choice.

In7 is 1 byte for the NV count. Since one may have 6 NVs, the number is (06).

In8 is the NV init data which uses one byte per NV. The NV init bits are as follows.

```
Msb: 1 nv__priority - 1 for priority nvs
Bit: 1 nv__direction - 1 for output nv
Bit: 2 nv__service - 00 for acknowledged, 01 for repeated, 10 for
unacknowledged - used only for outputs - set to 00 for inputs.
Bit: 1 authentication - 0 for no authentication.
Bit: 3 not used.
// nm = 1 means the extension record contains the name of the NV
// The fields follow in the order of the bits in the mask
defined herein
// nv__priority // 1 if a priority nv
// nv__direction // 1 if a nv output
// nv__service upper bit // nv__service valid for outputs only
// nv__service lower bit //
00=ack, 01=rpt, 10=unack;unspecified=ack)
// authentication // 1= use nv authentication
// unused (LSBs)
// { 0, 1, 0, 0, 0, 0, 0, 0 } = 0x40
```

In general, nv_priority is set to 0 for these NVs. nv_direction is 1 for output NVs and 0 for input NVs. So in this example of input NVs, the value is 00, and for output NVs, value is 40. So for the present example, each NV may get 1 byte: 00 40 40 40 40 00

In general, nv_service would typically be unacknowledged for outputs so one should use 60 for unacknowledged. Authentication is not used so set it to 0.

In the example herein, the following LonAppinitData[ ] may be generated.

```
22 08 fa b3 45 58 41 4d 50 4c
45 31 25 2e 08 05 0c 03 0f 00
04 00 00 00 00 00 00 00 2a 06
00 40 40 40 40 00
```

Figure 33:
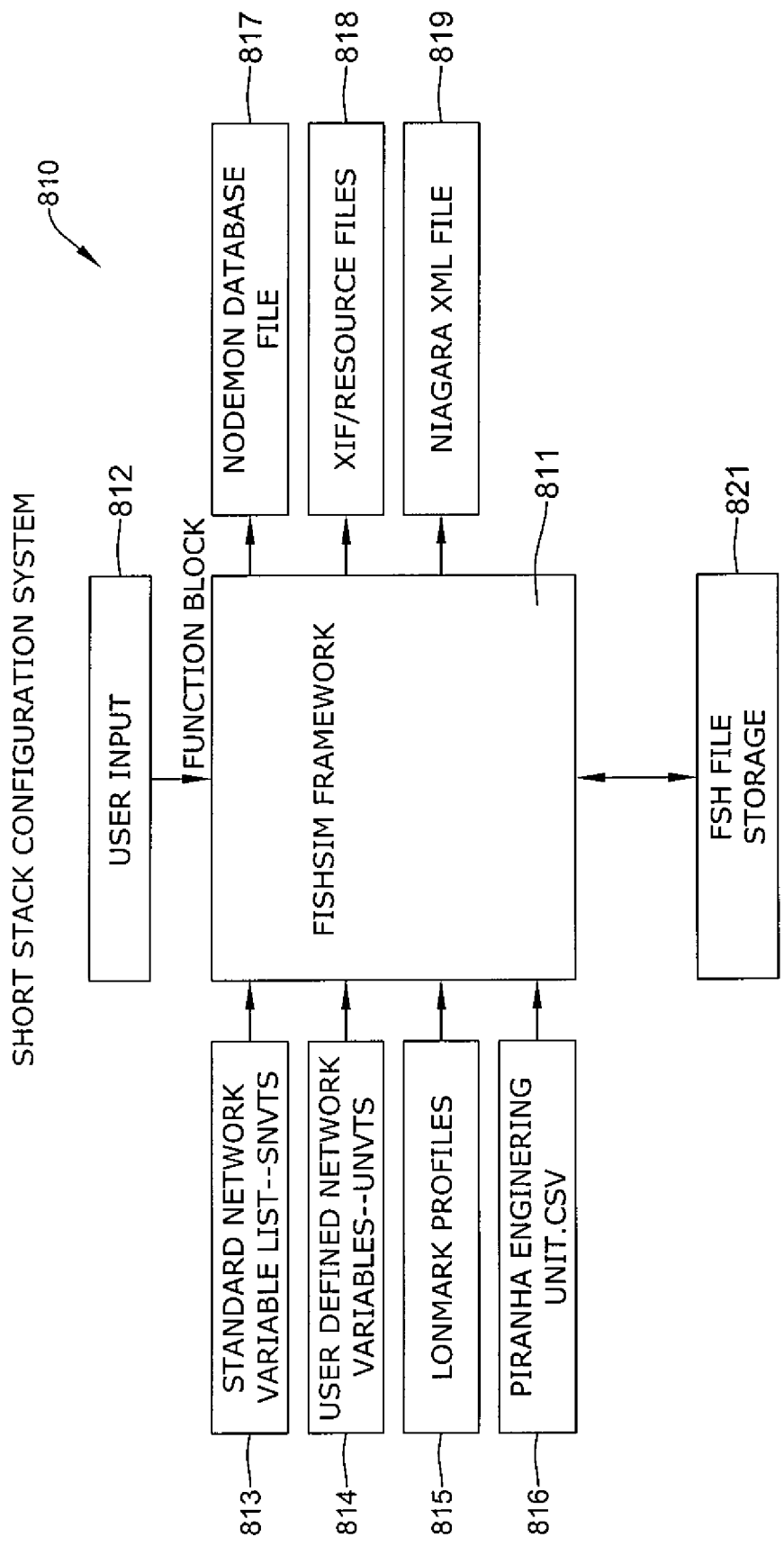
FIG. 33 is a diagram of a short stack configuration system.

FIG. 33 is a diagram of a short stack configuration system 810. A fishsim framework module 811 may be regarded as an element of the function block engine. There may be a user input module 812 connected to module 811. Several modules 813, 814, 815 and 816 with inputs may be connected to framework module 811. Module 813 may provide SNVTS from a standard network variable list to framework module 811. Module 814 may provide UNVTS from a list of user defined network variable to framework module 811. Lonmark profiles may be provided by a module 815 to framework module 811. Module 816 may provide conversions from Piranha engineering unit CSV to framework module 811.

Framework module 812 may provide information as indicated by modules 817, 818 and 819. Module 817 may have information which is in the form of a nodemon database file. This file has information which may be in a proprietary form of a company managing system 810. Module 818 may have similar information as that of module 817 but in the form of XIF/resource files. These files may be compatible with the Echelon-Lonmaker protocol and files. Module 819 may have information from framework module 811 which is similar to that of modules 817 and 818 but in the form of a Niagara XML file. These files may be multi-vendor compatible and work with various protocols.

A fsh file module 821 may be connected to the fishsim framework module 811. Module 821 may provide storage for a control system, function blocks and framework configurations including nv configurations and network communications. Also, module 821 may set up information in editable form for framework module 811.

Figure 34:
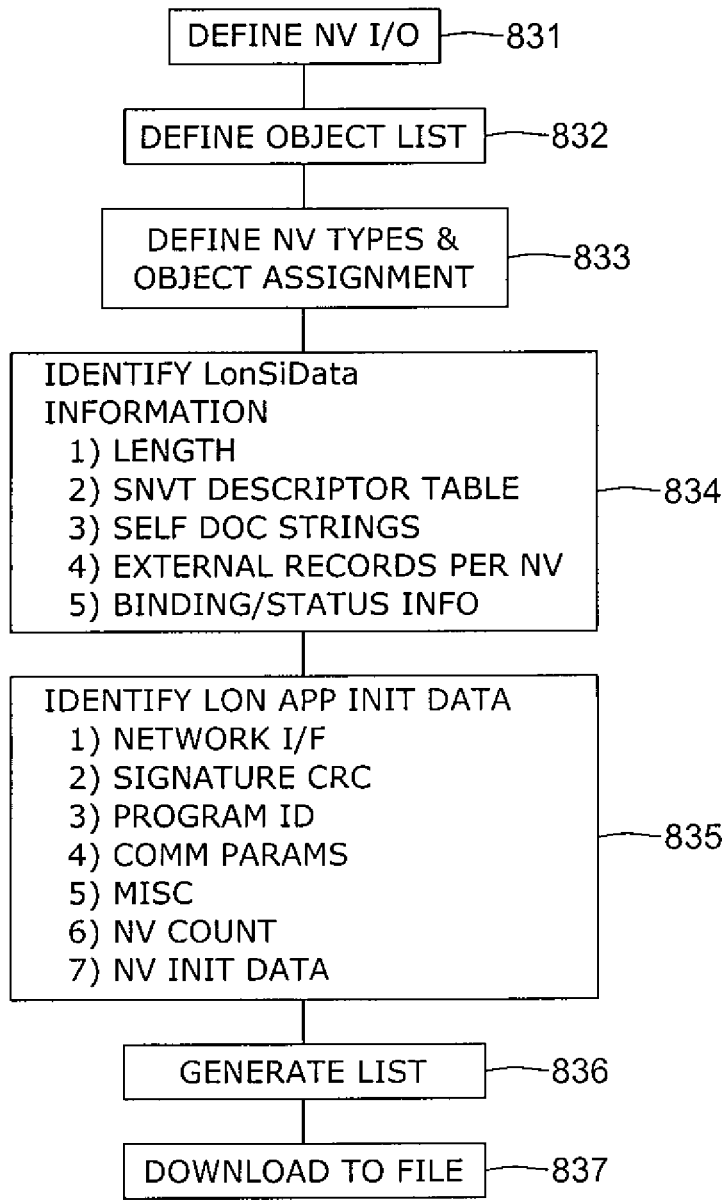
FIG. 34 is a flow diagram of some aspects of an interoperable network programmable controller generation mechanism.

FIG. 34 is a flow diagram of some aspects of the interoperable network programmable controller generation mechanism. A scenario may first indicate that a network variable (NV) I/O (input/output mechanism) be defined in step or block 831. Next, an object list may be defined in block 832. In block 833, NV types and object assignment may be defined. LonSiData information may be identified in block 834. Some of the items in block 834 may include: 1) length; 2) SNVT descriptor table; 3) self doc strings; 4) external records per NV; and 5) binding/status information. Lon app init data may be identified in block 835. Some of the data may include: 1) network I/F; 2) signature CRC; 3) program ID; 4) communication parameters; 5) miscellaneous; 6) NV count; and 7) NV init data. In block 836, a list may be generated. It may be downloaded to a file in block 837.

Figure 35:
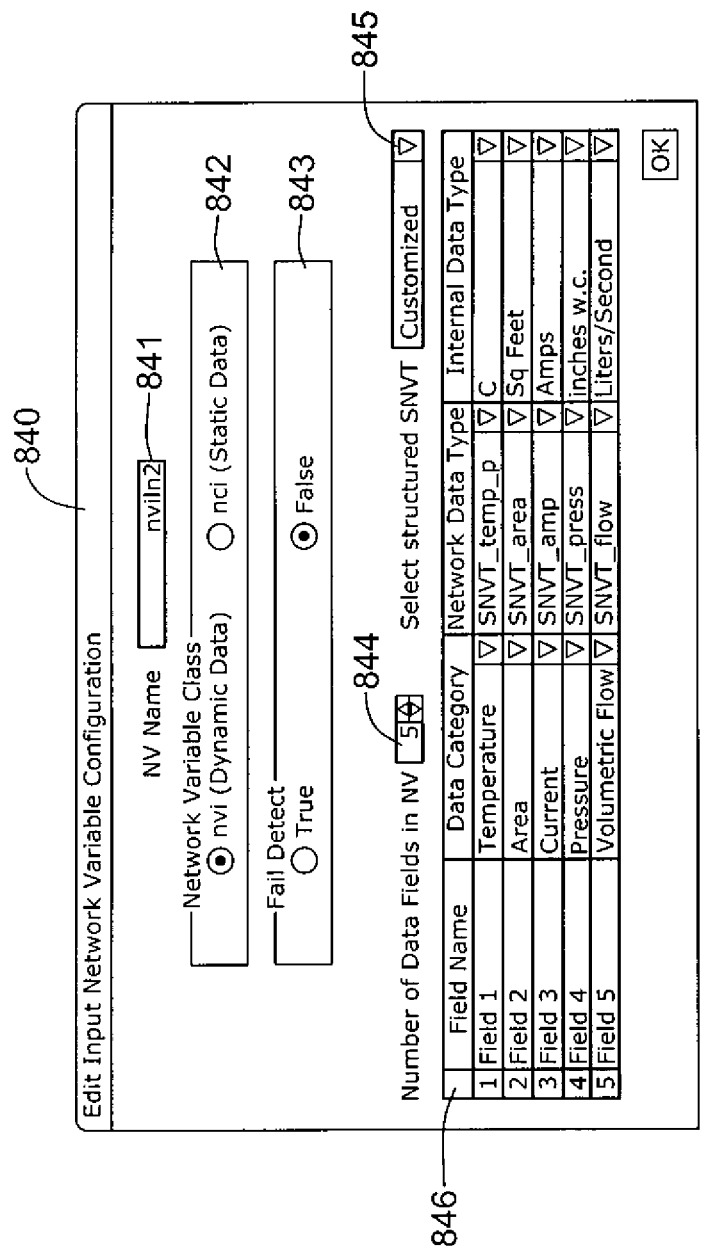
FIG. 35 is a diagram of a displayed layout for designing or editing a user network variable for an input network variable configuration.

In FIG. 35, a layout 840 may be for designing or editing a custom UNVT (user network variable) for an input network variable configuration. This layout 840 may be a tool with an example of a UNVT which is a customized NV. There may be a box for editing an input network variable configuration. The NV name may be "nviIn2" or some other designation as shown in box 841. In nvi (Dynamic Data) of the network variable class box 842 may be selected. The fail detect box 843 may be indicated as false. A number of data fields in the NV may be selected with box 844. A box 845 may be for selecting a structured SNVT which in the present layout can be a "customized" one, and referred to as a UNVT. A standard network variable may instead be selected from a list. That a SNVT is to be selected may be indicated in box 845.

Names of the five fields selected in box 846 may in the present example be Field 1, Field 2, Field 3, Field 4 and Field 5, having data categories of temperature, area, current, pressure and volumetric flow, respectively. The network data types for fields 1-5 may be SNVT_Temp_P, SNVT_area, SNVT_amp, SNVT_press, and SNVT_flow, respectively. The internal data type may indicate the kinds of units for fields 1-5. The units selected may be C, sq feet, amps, inches, and liters/second, respectively. Unit conversions may be obtained from the Echelon chip.

One may note that for field 1 of the NV, the SNVT_temp_p is stored in degrees C. times 100 as shown in box 847. An example may be 2000. The output may go to a box 848 with a Piranha for limiting conversion and/or scaling. It may convert the temperature to F. which in this case would be (2000/100×9/5)+32=68. The output may go to a function block box 849 and become a public variable. There may be a temperature of 48 degrees F. in the Piranha I/O block 851 for possible conversion to degrees C. The network data type may be SNVT_temp_p. The conversion may be to 888 as the conversion may be (48−32)×5/9×100=888. The conversion to C degrees may be 888/100=8.88 degrees C.

The limiting, conversion and scaling information may be stored in the Piranha engineering unit.CSV module 816 of short stack configuration system 810 shown in FIG. 33.

In the present specification, some of the matter may be of a hypothetical or prophetic nature although stated in another manner or tense.

Although the invention has been described with respect to at least one illustrative example, many variations and modifications will become apparent to those skilled in the art upon reading the present specification. It is therefore the intention that the appended claims be interpreted as broadly as possible in view of the prior art to include all such variations and modifications.

What is claimed is:

1. An adaptable network interface configuration system comprising:
 a processor;
 a memory connected to the processor;
 an input interface connected to the processor;
 an output interface connected to the processor; and
 a graphical user interface configuration editing module connected to the processor;
 wherein:
 the processor comprises a function block engine;
 the function block engine includes design mode and a simulation mode;
 an application is constructible with the function block engine in the design mode;
 the memory is for storing function blocks, framework configurations, and network communications setup information in editable form;
 the function blocks are configured to be displayed on the graphical user interface and interconnected by a user to form the application in the design mode; and
 the application is simulated in an operational-like scenario in the simulation mode.

2. The system of claim 1, further comprising:
 a standard network variable module connected to the processor; and
 a user defined network variable module connected to the processor.

3. The system of claim 1, further comprising:
 a LonMark$^{TM}$ profile module connected to the processor; and
 a Piranha engineering unit module connected to the processor.

4. The system of claim 1, wherein the processor is capable of providing information to any of:
 a nodemon database file module;
 a Niagara database file module; and/or
 an XIF resource file module.

5. A method for configuration and/or programming of a network interface, comprising:
 providing a computing device that provides a function block engine configuration tool, the function block engine configuration tool including function blocks configured to be displayed on a graphical user interface and interconnected by a user to form a control system;
 using the configuration tool for:
  defining a network variable input/output mechanism;
  defining an object list;
  defining network variable types;
  defining object assignments;
  identifying a set of self-identification data, including network variable descriptors;
  identifying a set of shortstack initialization data; and/or
  generating a list; and
 wherein the network variable types are changeable by the user while the control system is in operation.

6. The method of claim 5, wherein the set of self-identification data comprises:
 length;
 a standard network variable description table;
 self documentation strings;
 external records per network variable; and/or
 binding/status information.

7. The method of claim 6, wherein the set of shortstack initialization data comprises:
 network I/F;
 signature CRC;

program identification;
communication parameters;
a network variable count; and/or
network variable init data.

8. The method of claim 5, further comprising generating a list of objects.

9. The method of claim 8, further comprising downloading the list of objects from the computing device to a file on a computer readable medium.

10. The method of claim 5, wherein the function block engine configuration tool includes a graphical user interface.

11. An HVAC controller configuration and implementation system, comprising:
a reconfigurable HVAC controller including:
a processor;
a reprogrammable non-volatile memory connected to the processor; and
a network interface configured to provide communication between the processor and an HVAC bus; and
a computing device that provides a HVAC controller development environment configured to provide:
interactive graphical prototyping of an HVAC controller configuration;
simulation of the HVAC controller configuration in an HVAC system; and
output of HVAC controller configuration instructions downloadable to the reprogrammable non-volatile memory of the reconfigurable HVAC controller in the field;
wherein the HVAC controller configuration instructions include:
an input configuration, wherein the input configuration comprises input network variables;
a command module connected to the input configuration; and
an output configuration connected to the command module, wherein the output interface configuration comprises output network variables.

12. The system of claim 11, wherein the HVAC controller configuration instructions include firmware downloadable to the network interface.

13. The system of claim 11, wherein the command module provides a function block engine, and the command module includes an application comprising a block execution list that references function blocks executable by the function block engine.

14. The system of claim 13, wherein the HVAC controller configuration instructions change the application of the command module when downloaded to the reconfigurable HVAC controller.

15. The system of claim 13, wherein the HVAC controller configuration instructions change at least one of the function blocks executable by the function block engine when downloaded to the reconfigurable HVAC controller.

16. The system of claim 11, wherein the HVAC controller configuration instructions change at least one of the input network variables and/or output network variables available to the command module when downloaded to the reconfigurable HVAC controller.

17. The system of claim 11, wherein:
the input configuration is configurable for various HVAC bus protocols; and/or
the output configuration is configurable for various HVAC bus protocols.

\* \* \* \* \*